(12) United States Patent
Douglas

(10) Patent No.: US 7,127,865 B2
(45) Date of Patent: Oct. 31, 2006

(54) MODULAR STRUCTURE FOR BUILDING PANELS AND METHODS OF MAKING AND USING SAME

(76) Inventor: Robert B. Douglas, 4212 Bolton Rd., Gasport, NY (US) 14067

( * ) Notice: Subject to any disclaimer, the term of this patent is extended or adjusted under 35 U.S.C. 154(b) by 0 days.

(21) Appl. No.: 10/683,229

(22) Filed: Oct. 10, 2003

(65) Prior Publication Data

US 2004/0134162 A1 Jul. 15, 2004

Related U.S. Application Data

(60) Provisional application No. 60/417,904, filed on Oct. 11, 2002.

(51) Int. Cl.
*E04B 1/00* (2006.01)
(52) U.S. Cl. .................. 52/745.13; 52/293.3; 52/270; 52/300
(58) Field of Classification Search ............... 52/270, 52/272, 281, 284, 300, 309.1, 584.1, 729.1, 52/745.2, 749.11, 783.19, 274, 282.3, 293.3, 52/741.11, 741.13, 745.1, 169.1, 169.2, 169.6, 52/169.7, 169.11, 794.1, 745.13, 745.12, 52/745.09
See application file for complete search history.

(56) References Cited

U.S. PATENT DOCUMENTS

| | | | |
|---|---|---|---|
| 2,365,579 A | | 12/1944 | Mulligan |
| 2,915,150 A | * | 12/1959 | Weidler ................ 52/269 |
| 2,934,180 A | * | 4/1960 | Hammit et al. ........... 52/781 |
| 3,253,849 A | * | 5/1966 | Hansen .................... 294/16 |
| 3,662,507 A | * | 5/1972 | Espeland ................ 52/270 |
| 3,729,889 A | | 5/1973 | Baruzzini |
| 3,783,563 A | | 1/1974 | Moore |
| 3,791,912 A | | 2/1974 | Allard |
| 3,921,355 A | | 11/1975 | Pennecol |
| 4,074,489 A | | 2/1978 | Eckel |
| 4,078,348 A | | 3/1978 | Rothman |

(Continued)

FOREIGN PATENT DOCUMENTS

EP 0058237 A1 8/1982

(Continued)

OTHER PUBLICATIONS

"Plastic Recycling", 1997, Texas Society of Professional engineers, http://www.lotfi.net/recycle/plastic.html#1.*

(Continued)

*Primary Examiner*—Naoko Slack
(74) *Attorney, Agent, or Firm*—Basch & Nickerson LLP; Duane C. Basch

(57) ABSTRACT

The present invention is a polymeric panel system and method for production and use thereof, enabling the rapid construction of a building foundation wall or other structure and in particular a below-grade foundation. The polymeric foundation system includes polymeric wall panels and other components suitable for withstanding lateral and end compression loads. The walls include two parallel faces separated by a series of webs or ribs, where the webs and faces of the wall panels may be formed of a similar polymer material such as polyvinylchloride (PVC). The wall panels and/or other components may be extruded so as to enable the rapid production of sections of wall panels, where the panels may be cut to length and then affixed to adjacent panels to form a foundation wall. The method of affixing adjacent panels may include welding, gluing or other techniques and may be performed on the job site or in a pre-fabrication facility. Furthermore, the wall panels may be co-extruded with an insulating material inserted in the voids between the parallel faces so as to provide improved thermal performance of the foundation as well.

71 Claims, 69 Drawing Sheets

U.S. PATENT DOCUMENTS

| | | | | |
|---|---|---|---|---|
| 4,263,762 | A | * | 4/1981 | Reed ................. 52/293.3 |
| 4,282,697 | A | | 8/1981 | Spielau |
| 4,455,793 | A | | 6/1984 | Nania |
| 4,557,091 | A | * | 12/1985 | Auer ................. 52/282.3 |
| 4,615,155 | A | | 10/1986 | Chamberlain |
| 4,621,467 | A | | 11/1986 | Golden |
| 4,689,926 | A | | 9/1987 | McDonald |
| 4,754,587 | A | | 7/1988 | Glaser |
| 4,777,774 | A | | 10/1988 | Smalley, III |
| 4,802,319 | A | | 2/1989 | Lafleur |
| 4,924,641 | A | | 5/1990 | Gibbar, Jr. |
| 4,974,383 | A | | 12/1990 | Derr |
| 5,007,222 | A | | 4/1991 | Raymond |
| 5,285,607 | A | | 2/1994 | Somerville |
| 5,287,675 | A | | 2/1994 | McGee |
| 5,331,782 | A | | 7/1994 | Wohlgemuth |
| 5,353,563 | A | | 10/1994 | White |
| 5,412,918 | A | | 5/1995 | Wendel |
| 5,416,139 | A | | 5/1995 | Zeiszler |
| 5,594,202 | A | * | 1/1997 | Tobias ................. 174/48 |
| 5,676,486 | A | | 10/1997 | Keith |
| 5,685,124 | A | * | 11/1997 | Jandl, Jr. ................. 52/783.11 |
| 5,706,620 | A | * | 1/1998 | De Zen ................. 52/220.2 |
| 5,735,090 | A | * | 4/1998 | Papke ................. 52/220.2 |
| 5,792,539 | A | | 8/1998 | Hunter |
| 5,890,334 | A | | 4/1999 | Hughes, Jr. |
| 6,006,480 | A | * | 12/1999 | Rook ................. 52/309.12 |
| 6,037,033 | A | | 3/2000 | Hunter |
| 6,044,603 | A | | 4/2000 | Bader |
| 6,092,862 | A | | 7/2000 | Kuwahara |
| 6,122,877 | A | | 9/2000 | Hendrickson |
| 6,178,709 | B1 | | 1/2001 | Hertz |
| 6,250,037 | B1 | | 6/2001 | Ezumi |
| 6,256,959 | B1 | | 7/2001 | Palmersten |
| 6,256,960 | B1 | * | 7/2001 | Babcock et al. ................. 52/592.1 |
| 6,314,704 | B1 | * | 11/2001 | Bryant ................. 52/745.1 |
| 6,378,264 | B1 | | 4/2002 | Kawasaki |
| 6,412,243 | B1 | | 7/2002 | Sutelan |
| 6,413,610 | B1 | | 7/2002 | Nakamura |
| 6,438,923 | B1 | | 8/2002 | Miller |
| 6,455,131 | B1 | | 9/2002 | Lopez-Anido et al. |
| 6,481,172 | B1 | | 11/2002 | Porter |
| 6,493,995 | B1 | * | 12/2002 | McKenzie ................. 52/36.4 |
| 6,514,368 | B1 | | 2/2003 | Holtslag et al. |
| 6,564,521 | B1 | | 5/2003 | Brown et al. |
| 6,568,582 | B1 | | 5/2003 | Colligan |
| 6,571,523 | B1 | | 6/2003 | Chambers |
| 6,574,938 | B1 | | 6/2003 | Francesco et al. |
| 6,584,740 | B1 | | 7/2003 | Record |
| 6,584,742 | B1 | | 7/2003 | Kligler et al. |
| 6,591,558 | B1 | * | 7/2003 | De Zen ................. 52/91.3 |
| 6,591,567 | B1 | | 7/2003 | Hota et al. |
| 6,729,097 | B1 | * | 5/2004 | Patel et al. ................. 52/665 |
| 2003/0182886 | A1 | * | 10/2003 | Parrish ................. 52/293.3 |

FOREIGN PATENT DOCUMENTS

| | | | |
|---|---|---|---|
| JP | 2000-274080 | | 10/2000 |
| JP | 274080 | * | 10/2000 ................. 52/749.1 |
| WO | WO8801327 | | 2/1988 |
| WO | WO9311316 | | 6/1993 |

OTHER PUBLICATIONS

"Perma-LOC vs. Steel Piling"; The Perma-LOC Story: May 13, 2002 www.perma-loc.com/vs_steel.html; Crane Products Ltd., PO Box 1898, Columbus, OH 43216-1898, Phone 866-867-3762.

HL Plastics Extrusions; www.zh9I.dial.pipex.com/pilingeng.html; May 24, 2002; Typical Engineering Values For Recycled PVC Sheet Piling; sales@hlplasticsltd.co.uk; Tel: +44 (0) 1332 832389.

"The GeoGuard Advantage"; Tec-Wood Premium Decking; May 24, 2002; www.geo-guard.net/products.html; Materials International: 4501 Circle 75 Parkway Suite E-5370, Atlanta, GA, 30339; Tel: 1-800-256-8857.

C-LOC Model CL-9000; "Flexible Anchored Wall Installation Specifications"; www.c-loc.com/9000_flex.html; May 24, 2002; Crane Products Ltd. PO Box 1898, Columbus, OH 43216-1898; Tel. 1-800-690-C-LOC; cloc@craneproducts.com.

C-LOC Model CL-9000; "Designed for larger scale deep water applications including hulkheads and marinas"; May 24, 2003; www.c-loc.com/9000_flex.html; May 24, 2002; Crane Products Ltd. PO Box 1898. Columbus, OH 43216-1898; Tel. 1-800-690-C-LOC; cloc@craneproducts.com.

C-LOC Model CL-4500; Designed for smaller scale, single-wale, light dty, shallow water applications and larger multiple-wale medium-duty applications including residential, golf course, and park use; May 24, 2003; www.c-loc.com/9000_flex.html; May 24, 2002; Crane Products Ltd. PO Box 1898, Columbus, OH 43216-1898; Tel. 1-800-690-C-LOC; cloc@craneproducts.com.

C-LOC Model CL-4500 Flexible Anchored Wall Installation Specifications; May 24, 2002; www.c-loc.com/9000_flex.html; May 24, 2002; Crane Products Ltd. PO Box 1898, Columbus, OH 43216-1898; Tel. 1-800-690-C-LOC; cloc@craneproducts.com.

"The Ultimate Wall System"; Royal Building Systems; www.rbsdirect.com/build.htm May 29, 2002; rbsdirect.com/images/buildp.jpg May 29, 2002; rbsdirect.com/images/residentialprobasement1p2.jpg May 29, 2002; rbsdirect.com/images/residentialprobasement1p1.jpg May 29, 2002.

AP Confinement Systems; www.automatedproduction.com/english/swine/confinement/confine.htm; Jun. 10, 2002 PVC Ceiling,Fencing, wall Panels , Steel Products; PVC Planking, Farrowing Crates, Gestation Stalls and Penning Jun. 10, 2002.

* cited by examiner

MODULAR STRUCTURE FOR BUILDING PANELS AND METHODS OF MAKING AND USING SAME

CROSS REFERENCE TO RELATED APPLICATION

Priority is claimed from the following related application, which is hereby incorporated by reference in its entirety for its teachings;

"MODULAR STRUCTURE AND MANUFACTURING METHOD FOR BUILDING PANELS," by Robert B. Douglas, filed Oct. 11, 2002, Application No. 60/417,904.

This invention relates generally to the structure and manufacture of building panels and components, as well as methods of using such panels and components, and more particularly to building panels produced primarily of a polymeric material and being suitable for use in the construction of buildings and structures such as below-grade and load-bearing construction and building foundations.

BACKGROUND AND SUMMARY OF THE INVENTION

The present invention is directed to an improved structural and foundation system employing building panels and associated components (e.g., corners, plates, joints) made of a polymeric material and designed, in particular, for use in below-grade applications such as building foundations. The invention includes not only a system of wall panels and related components, but also the method of manufacturing the panels and components and methods of constructing a foundation using the present invention.

The use of structural components incorporating polymeric elements is known in the prior art. However, use as structural components that are suitable for withstanding or bearing lateral loads as below-grade foundations, as well as concurrent, compressive end loads (i.e., applied along the longitudinal length of the structure) does not appear to be taught in the prior art. While known components fulfill their particular objectives and requirements, the prior art components do not appear to provide an integrated system capable of withstanding the required loads for an extended period of time without failure or unacceptable deflection, or a method of manufacture and use of such a system, or the associated components, particularly as load-supporting foundation elements. In these respects, the polymeric material foundation system of the present invention substantially departs from the conventional concepts and designs of the prior art, and in so doing provides an improved system, method of manufacture and method of use primarily developed for the purpose of easily producing, shipping and assembling a below-grade structural foundation for residential or similar structures.

Building industry data collected by the U.S. Government indicates that privately-owned housing starts in the U.S. run at or above an annual rate of approximately 1.5 million, with single-family residences being well over a million of those homes. As builders and others struggle with the increasing costs of residential and other construction, improved materials and ease of construction are key factors in a builder's ability to remain competitive.

Heretofore, a number of patents and publications have disclosed particular structural configurations and the use of polymeric materials in buildings or other structures, the relevant portions of some of which may be briefly summarized as follows and are hereby incorporated by reference in the present application for their teachings:

U.S. Pat. No. 6,413,610 to Nakamura, issued Jul. 2, 2002, discloses an aluminum, hollow frame for a rail car member constituted by joining a pair of face plates with truss-shaped ribs.

U.S. Pat. No. 6,178,709 to Hertz, issued Jan. 30, 2001, teaches a foundation system utilizing plastic components. The foundation system includes plastic components having heating elements selectively embedded therein for fusing abutting portions of adjacent components to hold them together.

U.S. Pat. No. 6,591,567 to Hota et al. teaches a lightweight fiber reinforced deck panel (FRP) having two surfaces and perpendicular ribs therebetween, along with female and male ends for mating with one another.

U.S. Pat. No. 6,574,938 to Francesco et al. teaches a panel construction system having a metal-alloy web and at least one plate element to provide rigidity to the panel. Also disclosed are profiled elements that provide corner or angled transitions.

Prior art foundation systems generally preclude easy shipping and assembly of foundations, or are labor intensive. The present invention seeks to overcome these problems, while providing a polymeric material that will withstand the peculiar loading requirements of a foundation—as opposed to above-ground structures. In particular, the present invention is particularly adapted to provide a wall structure that is capable of supporting traditional compressive loads directed vertically down through the wall structure, as well as resist the lateral loading of the wall due to excavation fill, ground water and other elemental factors that bear against a foundation.

In accordance with the present invention, there is provided a method for constructing a foundation, comprising: providing a pre-fabricated wall panel having a hollow frame member with first and second faces generally parallel to one another and connected by a plurality of ribs spanning a space therebetween; anchoring, at least temporarily, a lower portion of the wall panel at a footer; and affixing to a top of the wall panel a sill plate for attaching additional structural elements at a top thereto.

In accordance with a further aspect of the present invention, there is provided a wall panel system for use belowgrade, comprising: a first face; a second face; and a plurality of ribs spanning a space between said first and second faces and holding said first and second faces in a generally parallel relationship, said wall panel faces and ribs being formed of the same polymeric material, wherein said panel system is capable of withstanding a lateral load applied to at least one face thereof and a compressive end load.

In accordance with another aspect of the present invention, there is provided a method for producing a wall, comprising: providing a first wall panel, the first wall panel including a hollow frame member with first and second sheet faces generally parallel to one another and connected by a plurality of ribs spanning a space there between; positioning a second wall member adjacent a side edge of the first wall panel; and permanently affixing (e.g., solvent welding, ultrasonic welding, gluing) the second wall member to the side edge of the first wall panel.

In accordance with another aspect of the present invention, the wall panel is formed using an extrusion process, and where an extruded hollow frame member is cut to produce wall panels of varying heights.

In accordance with yet another aspect of the present invention, there is provided a wall system comprising: at least one wall panel, said wall panel including a hollow frame member with first and second sheet face plates generally parallel to one another and connected by a plurality of ribs spanning a space therebetween, said wall panel face plates and ribs being formed of a polymeric material; and a polymeric foundation component positioned adjacent to said at least one wall panel to form a structural foundation, wherein the polymeric foundation component is permanently affixed to the wall panel.

One aspect of the polymeric foundation invention deals with a basic problem of the cost-effective construction of foundations, particularly in residential and other new construction. This aspect is further based on the discovery of a technique that alleviates this problem. The technique utilizes a novel structural design and polymeric material such as fiber reinforced polyvinyl chloride (PVC) to produce wall panels and other components for the assembly of foundations.

One aspect of the invention is also based on the discovery that the structural wall panels and related components may be readily extruded so as to enable various foundation dimensions and sizes readily producible with little post-extrusion processing. Moreover, because the foundation system utilizes PVC or similar polymers, a complete foundation may be shipped at a far lower cost than conventional concrete or block materials. This discovery avoids problems that arise in the cost-effective construction of homes and other buildings or structures (e.g., retaining walls, abutments, etc.).

The techniques described herein are advantageous because they are efficient and simple compared to other approaches to the construction of foundations and similar below-grade structures. Other advantages that may be achieved over conventional foundation construction techniques include: (a) resistance to thermal loss or gain, (b) resistance to water penetration, (c) resistance to vapor or gas penetration (radon), (d) resistance to microbe growth, and (e) ease of maintenance. Furthermore, aspects of the present invention result in a foundation system having finished surfaces on both the interior and exterior wall surfaces such that little or no finishing steps are required for the foundation itself—providing usable living space (depending on the local codes). When installed this system allows a homeowner to have a bright, dry, and easily maintained interior—a significant departure from conventional foundation systems.

The techniques described herein also make it unnecessary to have significant labor involved in the foundation construction process for long periods of time, and they can be adapted to any of a number of building uses, including above-grade construction. The techniques of the invention are advantageous because they permit efficiencies in what has traditionally been a very labor and cost-intensive part of new construction. As a result of the invention, it is believed that the techniques may be used to pre-manufacture foundation components for use in new construction, and that the resulting structures will provide equal or improved performance over their life, including improved thermal performance (resistance to heat loss), water resistance, vapor resistance, etc.

Figure 1:
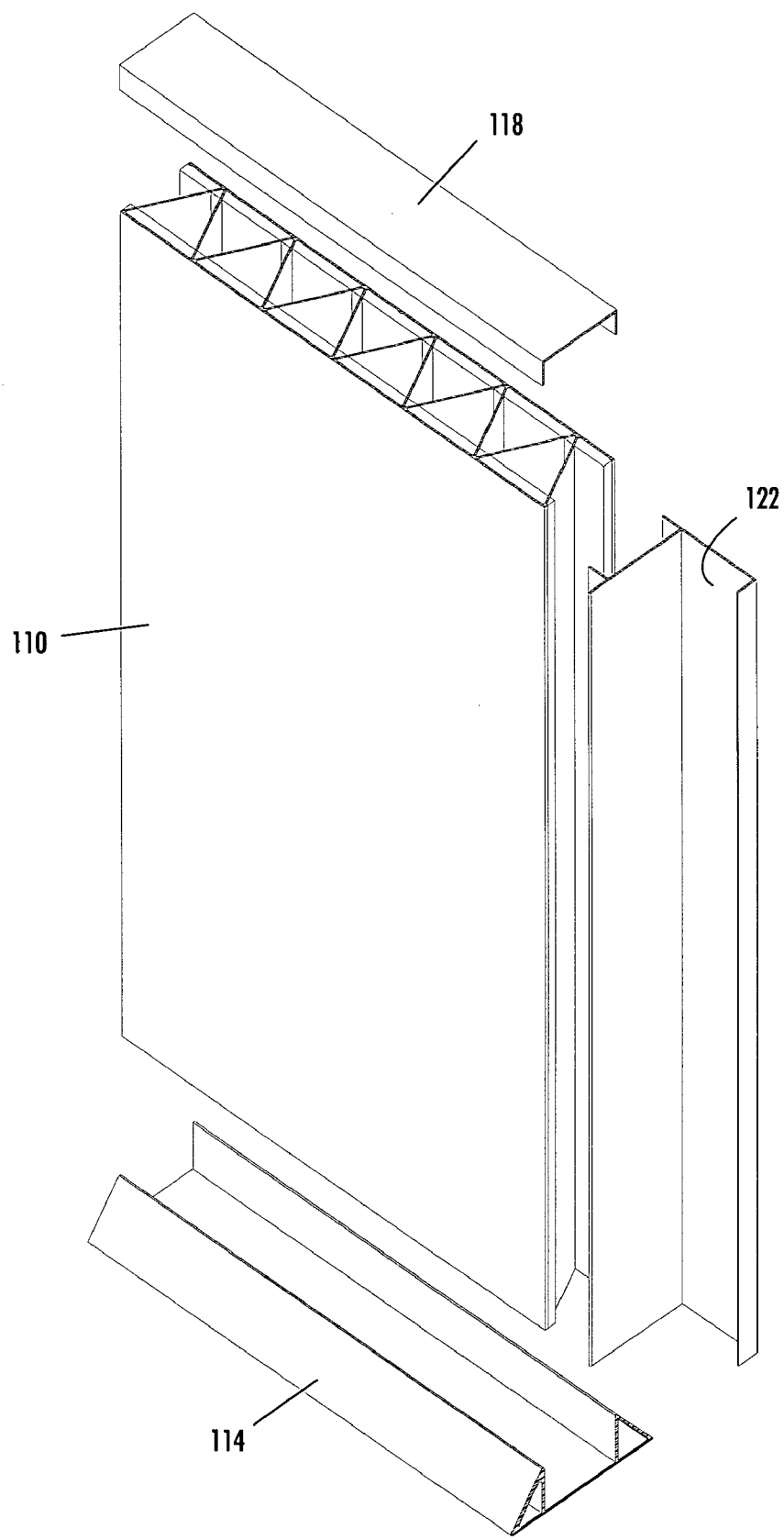
FIG. 1 is a three-dimensional representation of a wall system in accordance with an aspect of the present invention.

The present invention will be described in connection with a preferred embodiment, however, it will be understood that there is no intent to limit the invention to the embodiment described. On the contrary, the intent is to cover all alternatives, modifications, and equivalents as may be depicted or otherwise included within the spirit and scope of the invention as defined by the claims.

DESCRIPTION OF THE PREFERRED EMBODIMENT

For a general understanding of the present invention, reference is made to the drawings. In the drawings, like reference numerals have been used throughout to designate identical elements.

As used herein the term "wall panel" is intended to include pre-manufactured panels comprising one or more materials formed to provide a finished or partially-finished surface or surfaces for the construction of structures, including but not limited to buildings, foundations for buildings and similar above and below-grade structures (e.g., retaining walls, noise barriers). It is further contemplated that the wall panel may be employed to produce pre-fabricated structural elements applicable for below-grade use such as pre-formed stair entryways, manholes, vaults, etc.

In the following description, an embodiment of the present invention is described relative to a polymeric material such as polyvinyl chloride (PVC), for example, a PVC resin may be used where no precompounding is performed, but where mixing is done in the barrel. In one embodiment, the material used for the extrusion may be a twenty-percent glass fiber reinforced PVC. It will be appreciated that secondary grades of PVC may also be employed as coloration may not be of importance in a foundation. Alternatively, a Fiberloc® 81520 material made by Polyone may be employed. While PVC is believed to be a preferred material, due to its ability to be extruded and its structural characteristics, the present invention is not intended to be specifically limited to a single a material or composition. Various factors, including cost to performance characteristics, may be employed in the selection of the particular materials and manufacturing processes. Hence, the present invention, or aspects thereof, may be implemented with alternative polymeric materials and/or methods of manufacture, whether by extrusion, pultrusion or otherwise.

In accordance with an aspect of the present invention, the thermo-forming polymers (e.g., vinyl, PVC, etc.) may be advantageous as they may be produced in desired sizes using direct-to-extrusion processes, and are frequently less expensive that thermo-setting polymers. Such materials are believed to be preferable due to the decreased cost and increased rigidity and safety achievable with such materials and the associated production techniques. It will be appreciated however, that various alternative materials and processes may be employed (e.g., pultrusion with embedded, linear fiber) to produce elements of the present invention. For example, a polyester resin may be more rigid then PVC, but is more costly and tends to burn and outgas, presenting safety issues in relation to a fire, whereas PVC is believed to be inherently safer and has been used in the construction trades for some time now. Furthermore, alternative or variations in materials may be used to obtain desired characteristics. For example, it may be desirable to have reduced rigidity in certain components so as to assure their compliance with the adjacent structure (e.g., window sills and frames).

Since thermo-form polymers, such as vinyl and PVC, come in a wide range of hardness and density combinations, the extrusion parameters for use in producing wall panels or the adjoining elements or other components may vary greatly. It is known that the most critical zones in an extrusion process will be the rear barrel temperature of the feed zone and the temperature of the die. The feed zone temperature controls the tendency for the extrusion compound to stick to the barrel wall. The die temperature also will affect output and will have an effect on the dimensions of the extruded member or extrudate (i.e., higher extrusion temperatures may result in larger deviation of dimensions from the designed dimensions).

Through the use of additives, PVC and other polymers achieve extreme versatility that makes them suitable for a wide range of applications. PVC resin is the basic material and is produced in varying molecular weights. As the molecular weight is increased, the physical properties of the compound such as tensile strength and tear or shear strength are also increased—although the flow properties may be decreased. Specific additives produce specific characteristics in PVC compounds. For example, stabilizers, made from mixed metals, are employed to protect the compound from degrading due to the heat of processing. Since there are many outdoor applications for PVC compounds, a UV stabilizer and special pigments may be incorporated to resist weathering. Furthermore, as described above, it is contemplated that the material employed for components of the present invention will include a fiber, or fiber-like additive that will improve the rigidity of the panels and components, thereby increasing their resistance to deflection in response to lateral loads, while maintaining the compressive strength. Addition of the fiber also reduces the thermal expansion of the material, thereby reducing the amount of expansion that must be accommodated by the wall panels and joints in a foundation system.

Lubricant additives are used both internally and externally. Internally they lubricate the polymer chains and externally they reduce the friction between the PVC compound and the metal surfaces it contacts during processing.

Certain additives can raise the chemical resistance and lower the migration for PVC compounds that come in contact with oils, grease, or other polymers. Fillers, usually comprising calcium carbonate and calcined clay, are most often added for economic reasons. They also affect the physical properties and the processing of the compound. For example, fibrous additives may be used to improve the strength of the extrudate.

Although PVC resin is inherently a flame retardant material, certain additives such as plasticizers can increase the flammability of the compound. To counteract this undesirable characteristic, a variety of flame retardant additives can be utilized such as antimony trioxide, alumina trihydrate, molybdenum and zinc compounds. Antimicrobials may also be used in applications where resistance to bacteria and fungus are desired or necessary, a feature that may be important for below-grade foundations in accordance with an aspect of the present invention. It is also possible to employ color additives to meet a particular color requirement for the present invention. Furthermore, PVC has excellent adhesive and bonding qualities, making it an easily coated or painted material, and allowing for application of Ultra-Violet (UV) stabilizers and decorative materials.

Adding an exterior grade UV stabilizer to the wall panels is likely to be cost-prohibitive, as it is only required for the exposed exterior face. While the present invention contemplates the use of such stabilizers in the extrusion material, it is believed preferable to add only an interior grade UV stabilizer to the mix and coating the exposed exterior surfaces to achieve the desired UV blocking. Also contemplated is adhering readily available decorative plastic panels to the exposed exterior wall sections. In addition to blocking UV, these panels provide decorative shapes and textures such as shake shingle, brick and fieldstone.

Figure 2:
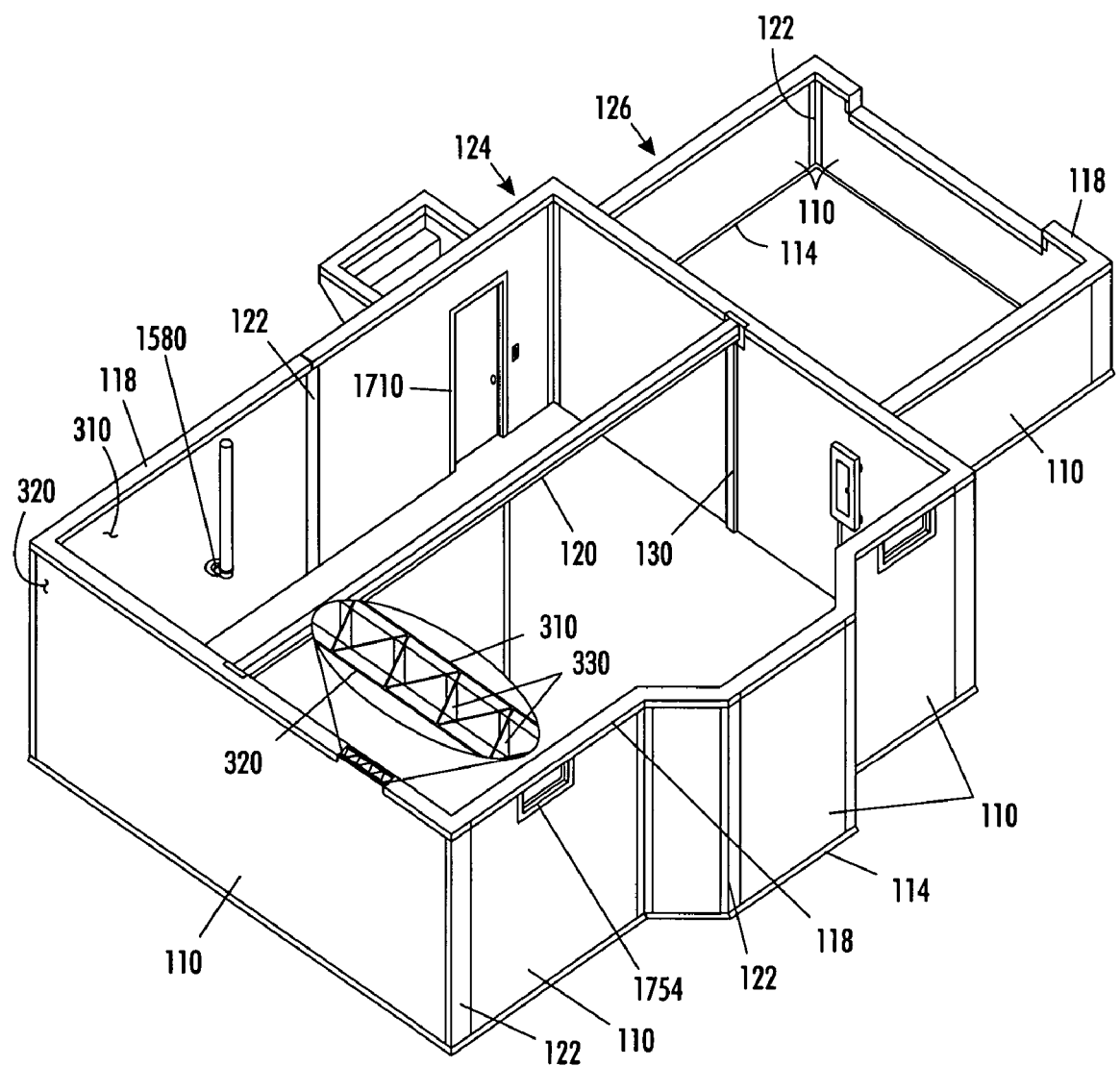
FIG. 2 is a three-dimensional representation of the wall system of FIG. 1 employed in a conventional basement and foundation for a residence in accordance with an aspect of the present invention.

Turning now to FIGS. 1 and 2, there is depicted a three-dimensional representation of an embodiment of the present invention. In particular, an isometric view of a foundation is illustrated in FIG. 2 and a section thereof is represented in FIG. 1. The section of the foundation depicted in FIG. 1 comprises at least one wall panel 110, said wall panel including a hollow frame member with first and second sheet faces (310, 320) generally parallel to one another and connected by a plurality of ribs 330 spanning a space therebetween as illustrated by the cross-section of the panel illustrated at the top of FIG. 1. Furthermore, the wall panel faces and ribs are preferably formed of a polymeric material such as PVC (e.g., 20% glass fiber reinforced PVC). Although a 20% glass fiber content has been identified at present as providing an adequate safety margin for manufacturing, based upon anticipated uses and loading, it will be appreciated that alternative glass fiber levels may be employed. For example, if the deflection is greater than intended higher glass content, such as 30%, may be used. It is believed that a glass fiber content as high as 45% may be used.

In addition to the wall panel, or plurality of wall panels as might be employed for a complete foundation as depicted in FIG. 2, the system of FIG. 1 uses additional components such as a sill plate 114, a cap or top plate 118 and one or more adjoining elements such as a corner 122 between adjacent wall panel sections. Each of these components are also preferably comprised of a polymeric material so as to provide compatibility for joining techniques and materials, as well as for resistance to moisture penetration and degradation that is characteristic of most polymeric materials. Although some of the components depicted in FIG. 1, or in other figures, may be press-fitted or maintained in place due to loading, it is contemplated that some or all of the adjoining components and panels are permanently affixed to one another, either by ultrasonic welding, gluing with adhesives, solvent welding (using well-known compounds suitable for forming water-tight bonds in PVC), mechanical fasteners, clips, or equivalent joining techniques as will be described in greater detail below. It is also contemplated that various of the components may include end caps or covers that are used either temporarily or permanently to cap or seal openings therein against pests, water, debris—both in final use as well as in storage and transportation of the components.

Figure 3:
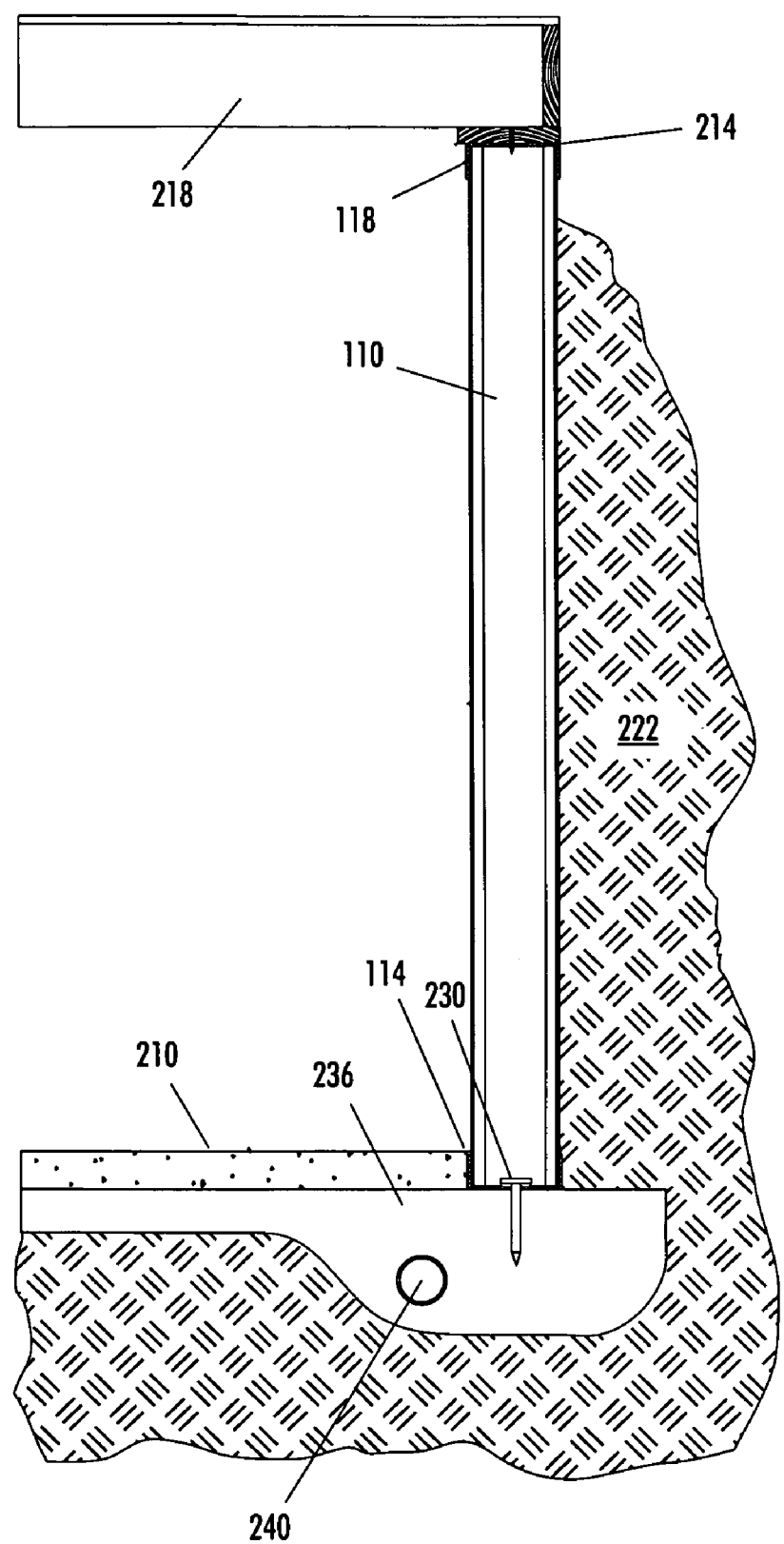
FIG. 3 is a cross-sectional view of a foundation constructed as shown in FIGS. 1 and 2.

Turning next to FIG. 3, there is depicted a cross-sectional view of the foundation system depicted in FIGS. 1 and 2. In FIG. 3, wall panel 110 is placed within a channel defined by sill plate 114. Sill plate 114 may be further held in position, during assembly of the foundation by a spike 230 or similar staking means that is pushed through holes in the sill plate and into the underlying compacted stone 236, concrete, or similarly compacted or equivalent footing material. Such a footing is, for example, a trench footer as taught by Frank Lloyd Wright. As noted the stone base may also include drainage pipe 240 or similar means for assuring the removal of groundwater, either through a gravity drain or sump drain and pump system, and preventing the infiltration of groundwater, and reducing the likelihood of frost, at or near the foundation base. It will be appreciated that footers and other construction techniques must be completed in compliance with applicable residential and commercial building code.

A completed structure would also assist in maintaining the position of the foundation wall panel 110 in an upright fashion as a result of the cap or top plate 118 along with a wooden sill 214 and floor joists 218 and associated decking or similar structural members spanning between the tops of the vertical foundation walls and beam 120 (FIG. 2). In addition to the sill plate 114, the bottom of the foundation wall is held in place by a concrete floor 210 or similar material poured at the bottom and against the wall and sill plate, and on the outside by backfill material 222. In this manner of use, where the foundation walls are held in place by a combination of top and bottom forces on the inside in opposition to excavation fill forces on the outside, the foundation is similar to other poured concrete, block or pre-cast or pre-formed wall structures known for use in building foundations.

Referring again to FIG. 2, it will be appreciated that the present invention may be employed to produce all or at least a portion of a below-grade foundation for a home or similar building or structure. In such a structure, the foundation units may need to have: adjoining elements such as corners (right-angle and otherwise), seams; architectural openings or apertures (doors, windows); and other conventional modifications as are well-known in the building trades. In accordance with one aspect of the present invention, a polymeric material may be employed to make some or all of the adjoining elements and other necessary components for the foundation. In this way, the foundation may be made of components that are easily transported and assembled using well-know techniques so as to quickly, and cost effectively produce a foundation or similar structure.

In particular, FIG. 2 illustrates that a full basement 124 and an attached garage foundation 126 may be made of polymeric material, without the need for additional reinforcing structure. Moreover, as described relative to FIG. 3 above, the foundation may be used in the manner of conventional masonry foundations to provide structure to which traditional wood, steel, or similar framing materials may be attached or integrated.

Figure 4:
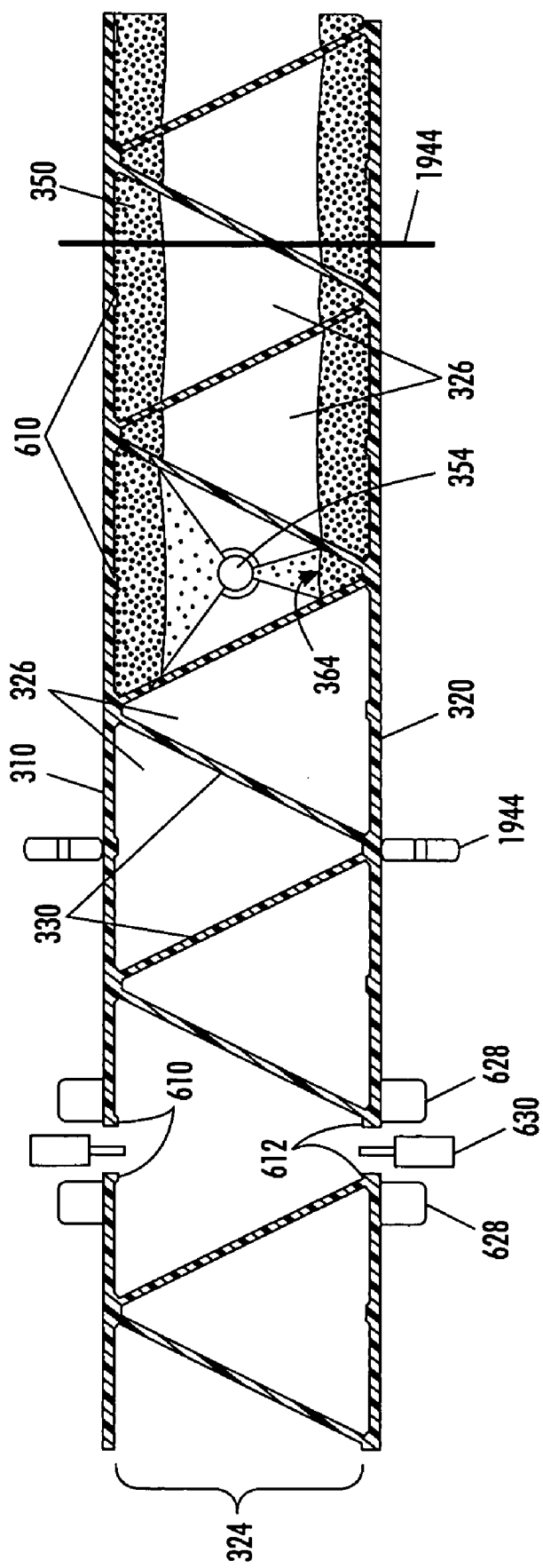
FIGS. 4 and 5 are cross-sectional views of the tops of wall panels made in accordance with one embodiment of the present invention.
Figure 5:
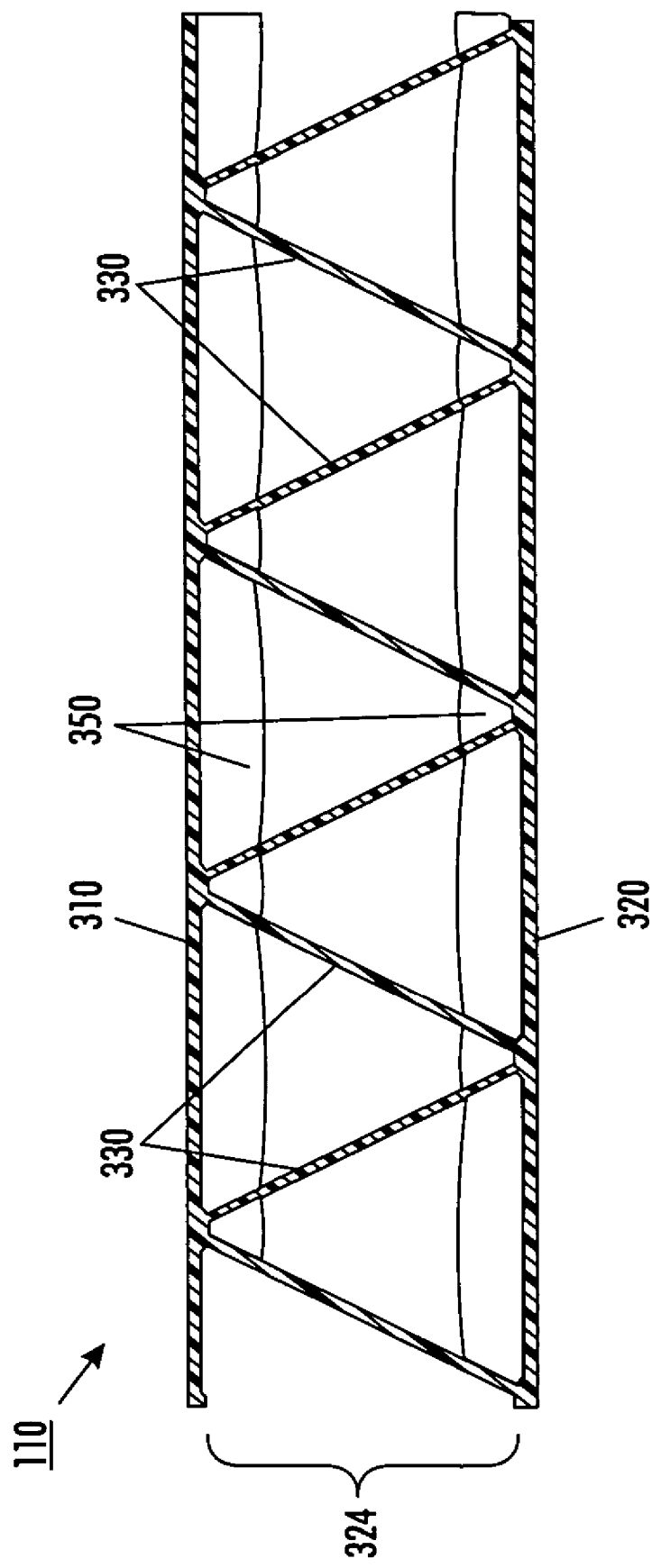

Having described the basic use of the polymeric foundation system in accordance with an aspect of the present invention, attention is turned to FIGS. 4 through 18 that illustrate preferred and alternative embodiments of the wall panel 110, including some that incorporate thermal insulation. In particular, as shown in FIGS. 3 and 4, the wall panel is formed from a first sheet face 310 and a second sheet face 320, which define a hollow cavity 324 therebetween. Within the cavity is a plurality of web elements or ribs 330 spanning the space or distance of cavity 324. As depicted in the figures, ribs 330 are generally placed at an angle to the sheet faces 310 and 320 to form a truss-like structure that is believed to provide rigidity to the wall panels of the present invention. As will be discussed below, various alternative web or rib configurations may be employed with similar results.

Also depicted in FIGS. 4, 5, 10 and 12, for example, are regions of insulating material 350 located within the cavity region of the wall panel 110. As shown in FIG. 4, the insulation 350 is preferably adjacent the inner surface of at least one, and possibly both face sheets. FIG. 4, along the left-most truss region of the wall panel, shows a spray nozzle 354 that may be employed to spray a foam (polyurethane or other compatible polymer-based expanding or non-expanding foam) or similar insulating material along the inside of the hollow region 326, as defined by ribs or trusses 330. As will be appreciated the nozzle may be specifically suited to provide for a broad range of coverage and material to be delivered along the larger face of the truss region, 360, and a smaller range and amount of material along the apex of the truss region in area 364.

In addition to introducing foam or similar insulating materials along the wall pane face sheets, it may also be possible to completely fill the voids in each truss (i.e., all cavities between the face sheets). It is also contemplated that insulating materials other than foams may be employed to provide insulation. As will be described below, the manufacturing process contemplates inserting or spraying an insulation material into the voids after producing the wall panels. However, it may also be possible to co-extrude the panels and associated foam or similar insulation material in a common production step, thereby producing an insulated wall panel, such as panel 110, at the time of manufacture.

Although depicted with insulation adjacent one or both faces of the wall panel, alternative insulation techniques may be employed. Putting the insulation on the exterior surfaces may reduce thermal cycling of the wall panel by allowing the ribs to maintain a more constant temperature. This allows the ribs better control over the expansion and contraction of the face sheet(s). Putting the insulation on the interior face would better control the damage to the rib material in the event of a fire. Should an interior fire erode the entire inner plate, the wall would relax away from the soil, relieving considerable lateral stress from the ribs enough so that the ribs should still be able to maintain the structure. The insulation would then slow the erosion of the ribs and delay a catastrophic collapse.

The use of an insulation or similar filler may also improve the structural characteristics of the wall panels in that it will assist in reducing the likelihood of deflection of the ribs if the hollows or voids are filled. It is further contemplated that other materials with unique properties other then thermal insulation may be used with the wall panels. For example, energy absorbing materials may be employed to improve the ability to resist propagation of acoustic energy or for radar absorption or reflection in military applications. Although not specifically intended for military applications, the wall panels and components of the present invention may include additives, coatings or void filling compounds that absorb light any other energy waves (or reflect it). The additives may also include anti-microbial compounds may be added to the polymer material to resist the growth and propagation of mold, mildew and bacteria. Furthermore, the panels may employ DuPont Kevlar® mesh or similar materials to improve resistance to the penetration of projectiles. In a military setting, the panels can then be assembled in the field to become bunkers, field hospitals, etc. that may be located in a below, or partially below grade location.

Figure 6:
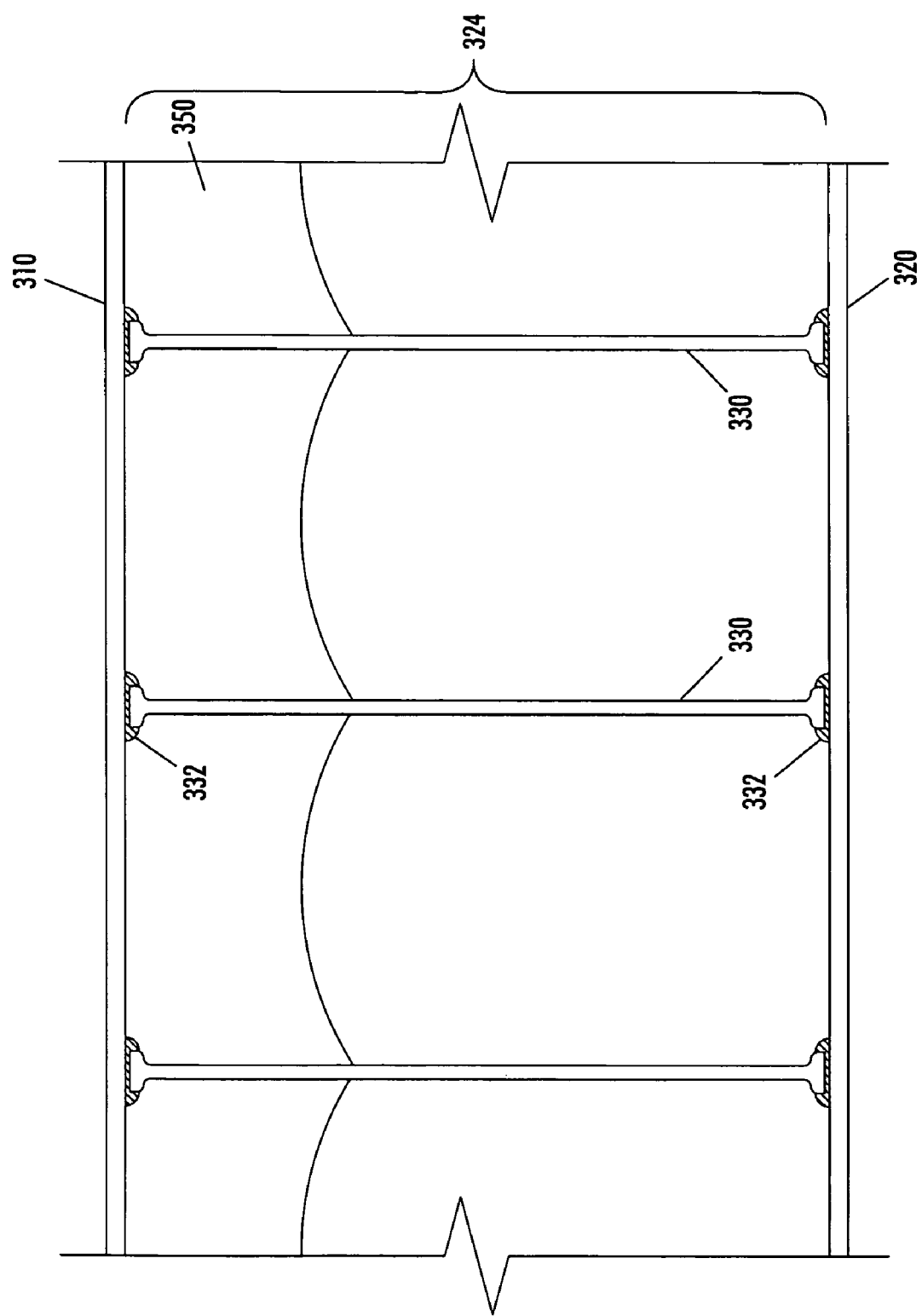
FIG. 6 illustrates a cross-sectional view of an alternative wall panel design incorporating generally perpendicular ribs.

Referring next to FIG. 6, there is depicted an alternative wall panel design incorporating generally perpendicular ribs 330 to separate faces 310 and 320. Again, insulation 350 may be employed to fill at least a portion of the cavity region 324. In this embodiment, it is contemplated that the wall panel structure may be extruded as described with respect to a preferred embodiment, or may be extruded or laid-up in sections as described with respect to various alternatives. For example, a bonding agent or adhesive 332 may be employed to attach ribs 330 to the interior of one or both faces 310 and 320. It will be further appreciated that the various alternative welding and bonding means disclosed herein may also be employed to attach the ribs to the faces, such as the group including ultrasonic welding, solvent welding, gluing with an adhesive or bonding agent, plate welding, friction stir welding, thermal bonding, and mechanical fastening. Although not completely discernable from the illustrations, it is contemplated that some or all of the weld areas may have an increased material cross-section, including around and through the radiuses for the ribs. This is to accommodate for the welded region generally being weaker than the surrounding material. Ultrasonic welding may range from 50% to 75% of the original material strength depending on the wave penetration. Wire welding is around 75% to 80% and plate welding is 80% to 85% of pre-welding strength. In general, the design depicted have assumed approximately a 75% strength transfer and the thickness of the weld surfaces and surrounding areas have been increased by approximately 33% to accommodate for the lower strength.

Figure 7:
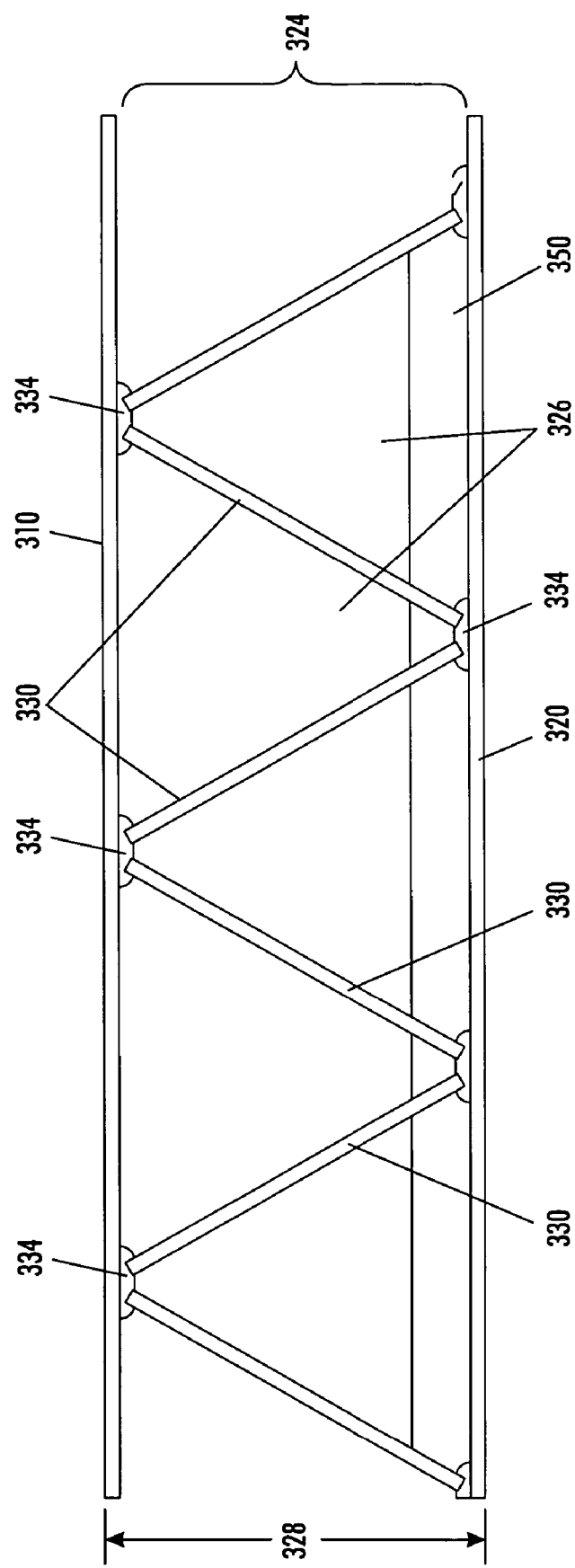
FIGS. 7–9 illustrate cross-sectional views of wall panel designs having angled ribs, where the panel is formed from separate components that are then assembled.

Referring next to FIG. 7, there is depicted an alternative wall panel incorporating angled ribs 330 to separate faces 310 and 320. Again, insulation 350 may be employed to fill at least a portion of the cavity region 324. In this embodiment, it is contemplated that the wall panel structure may be extruded as individual face and rib sections, which are then assembled, or as a face 310 and face 320 plus ribs 330 which are then assembled. As illustrated, the ribs are attached to the faces at a built-up region 334, which may or may not include a groove, channel or similar receiving structure capable of receiving the end of the rib 330. As described above, various welding and bonding means may be employed to permanently affix the unattached rib ends to the faces. In one embodiment, the ribs are preferably oriented at an angle of about 60-degrees to the face of the panel, thereby forming an isosceles triangle structure within the wall panel—where the size of each truss region 326 is dependent upon the wall thickness 328.

Figure 8:
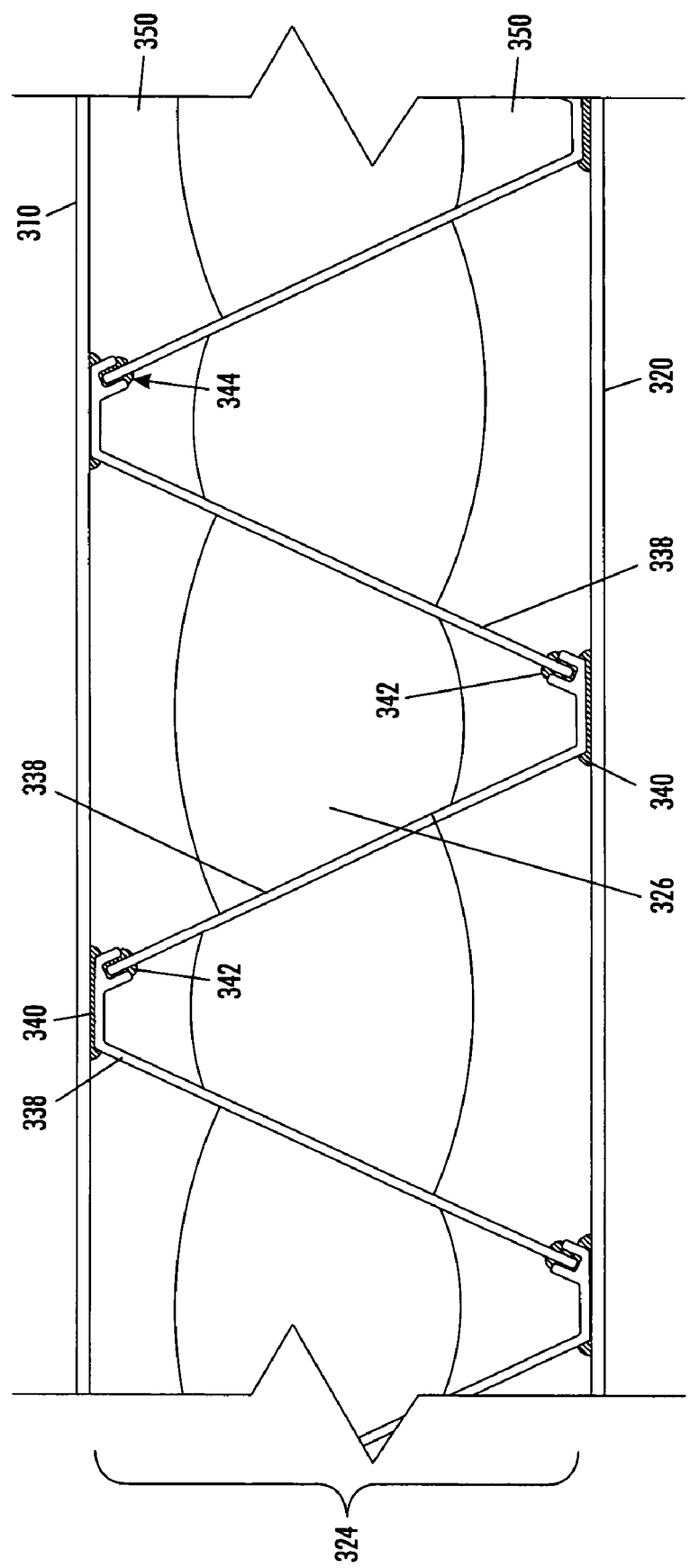
Figure 9:
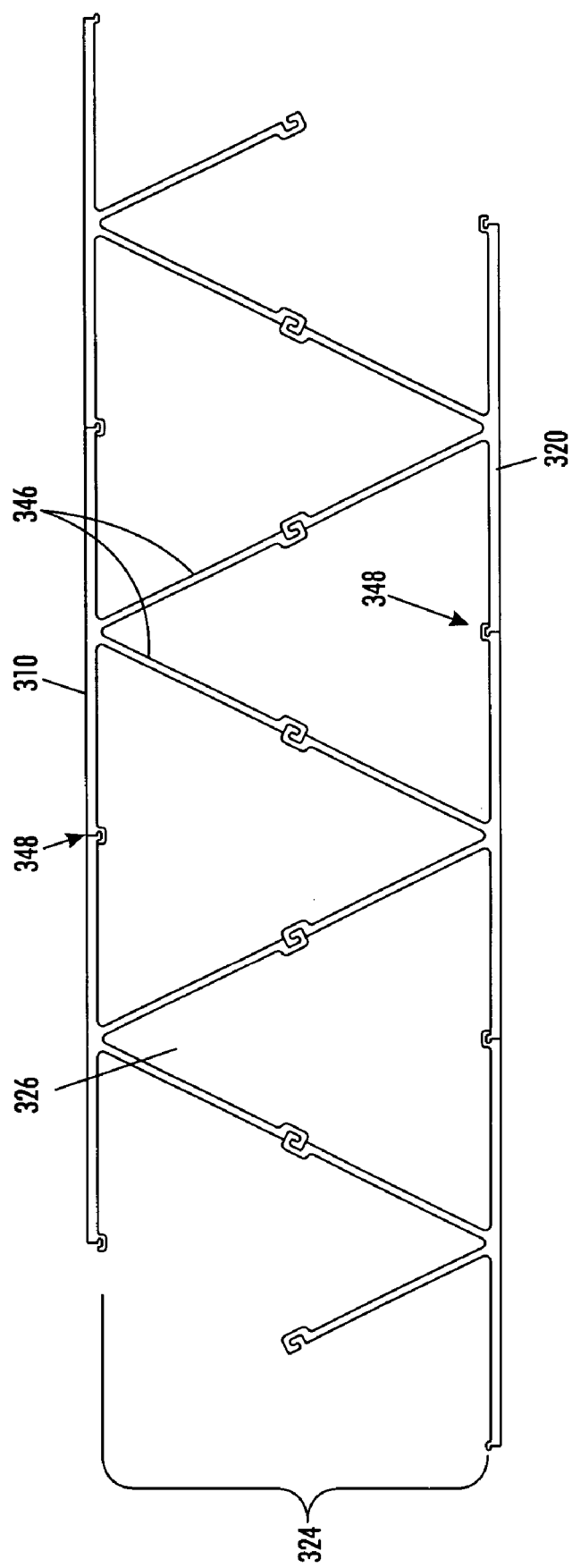

Referring next to FIGS. 8 and 9, there are depicted further alternative wall panel designs incorporating angled rib elements 338 to separate faces 310 and 320. Again, insulation 350 may be employed to fill at least a portion of the cavity region 324. In this embodiment, it is contemplated that the wall panel structure may be extruded on parts and laid-up in sections. More specifically, the rib elements may be extruded or formed with not only a rib but also a flat region suitable for bonding with the faces 310 and 320. Again, a bonding agent or adhesive 340 may be employed to attach rib elements 338 to the interior of one or both faces 310 and 320. The same or similar bonding means 342 may be employed to attach the rib is element ends to a groove or channel 344, where the bonding means is placed. FIG. 9 shows a similar structure, where partial ribs 346 are extruded in conjunction with a face of the panel, and then are connected to a 180-degree rotated member (rib and face element. In such an embodiment, the extruded pieces may be assembled to produce a wall panel. More specifically, the ends of partial ribs 346 may be connected or bonded to the ends of opposing partial ribs to complete the rib structure separating the faces. Furthermore, face sections may be connected in a similar manner, such as at region 348, in order to connect adjacent ends of wall panel's sections to produce a wider wall panel.

Figure 10:
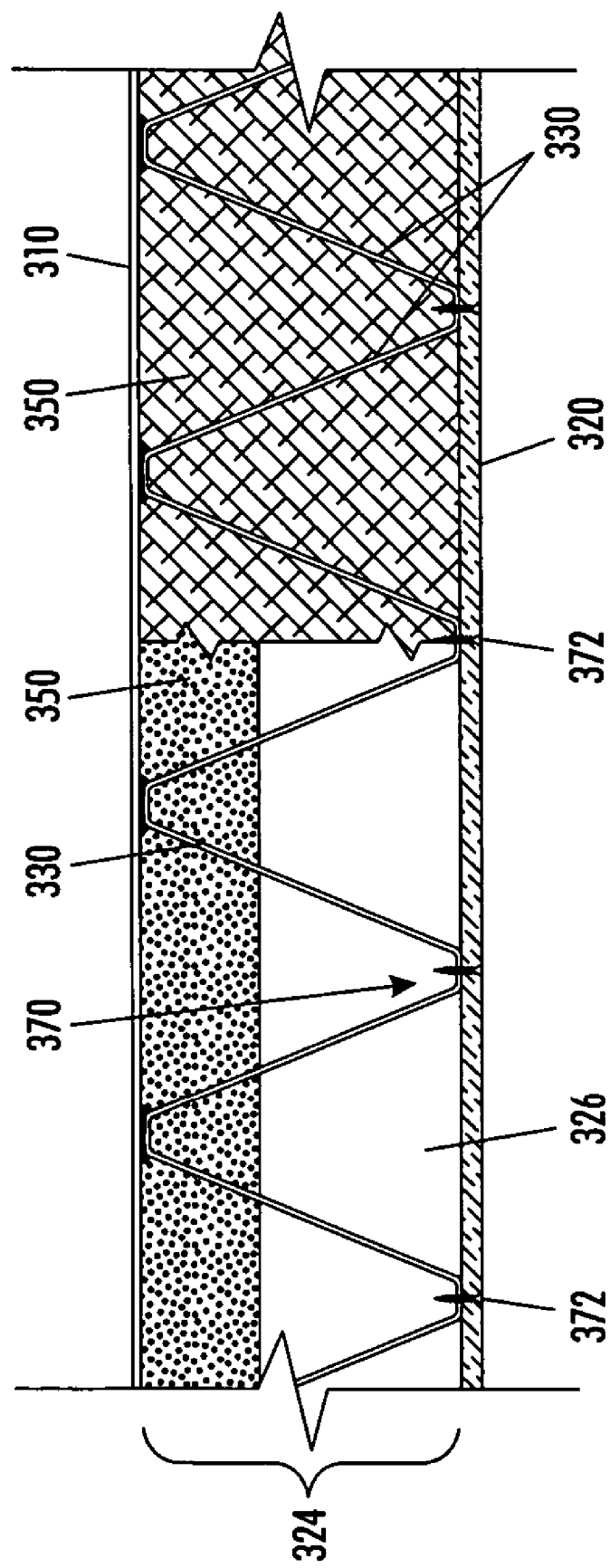
FIGS. 10 and 11 are cross-sectional views of further alternative wall panels designs, where the face is pre-formed and attached to the ribs.
Figure 11:
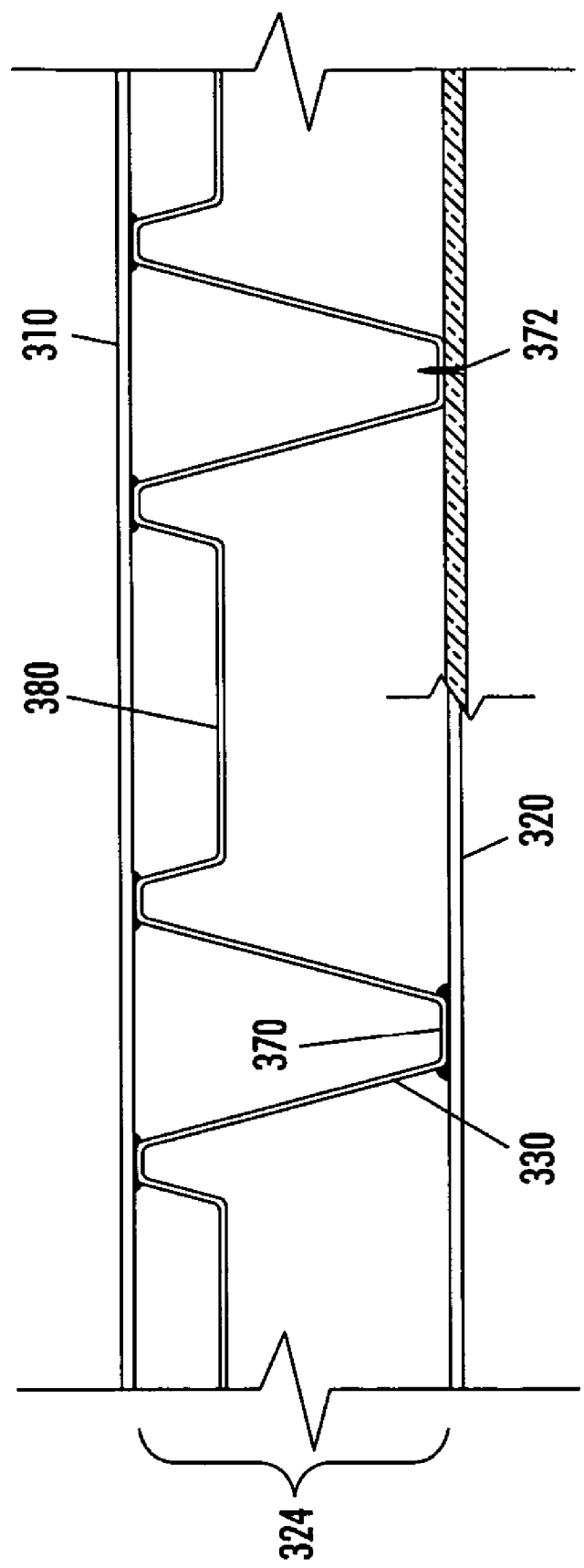

Turning next to the alternative wall panel embodiments illustrated in FIGS. 10 and 11, it will be appreciated that alternative rib configurations (380 of FIG. 11) and alternative materials and assembly techniques may be employed to produce the wall panels contemplated by aspects of the present inventions. For example, as FIG. 10 illustrates, the panels may be produced using a face and rib structure as described above, and where face 320 comprises pre-formed sheet goods such as plywood, drywall, etc., and is attached to ribs 330 along a flat 370 therebetween. The manufacture of such panels may be achieved by the method of forming the ribs 330 from calendared plastic sheet that is bent or formed (calendared) and then glued to the sheet goods. In addition to adhesive or other bonding means, a conventional mechanical fastener such as a screw 372, threaded nail (not shown), etc. may be used to attach face 320 to the flats 370. As will be apparent from the various alternative wall panel embodiments described herein, numerous alternatives are possible. However, common to all of these alternatives are two parallel faces 310 and 320 and a plurality of ribs 330 that can be manufactured as a complete unit or as partial components that are then combined and bonded to form a single wall panel unit. Although depicted with varying numbers of ribs in various configurations, it should also be understood that the number of ribs and the spaces between the ribs are a function of the structural requirements for the wall panel as well as the materials and manufacturing techniques used. For example, one embodiment uses narrower wall sections having only two ribs per section, to utilize existing extrusion machinery, and the sections are then welded at their edges to produce larger walls or panels.

As will be appreciated, the various face and rib structures depicted and described relative to at least FIGS. 9 and 10 may be used to produce similarly-shaped concrete or similar rigid wall panels. For example, the panel structure depicted in FIGS. 10 and/or 11 may be employed as "forms" by which a face and integrated cavity may be formed, leaving only an opposite face to be installed. Although such panels may not be as lightweight as intended for a preferred embodiment of the present invention, it will be apparent that such wall panel alternatives may be employed with other aspects of the present invention to improve the speed and efficiency of constructing and assembling structures and foundations with aspects of the present invention.

Figure 12:
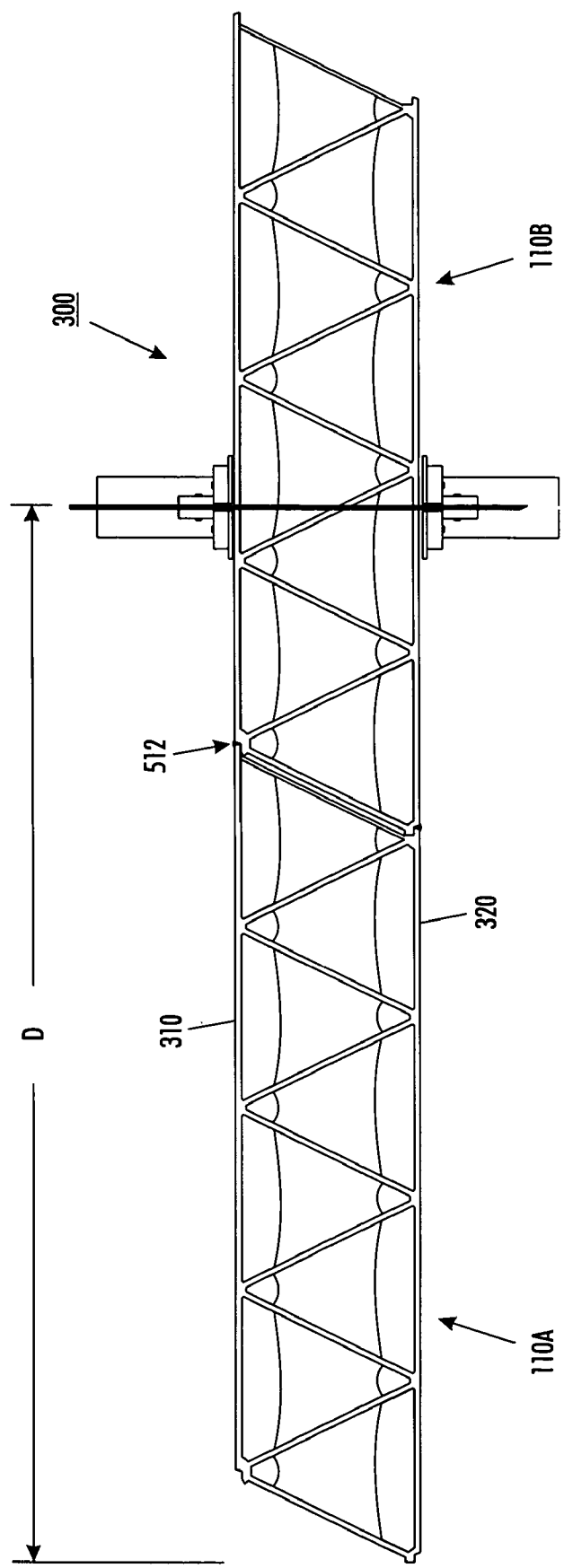
FIGS. 12–14 are illustrative examples of the manner in which panels may be assembled and sized in accordance with embodiments of the present invention.
Figure 13:
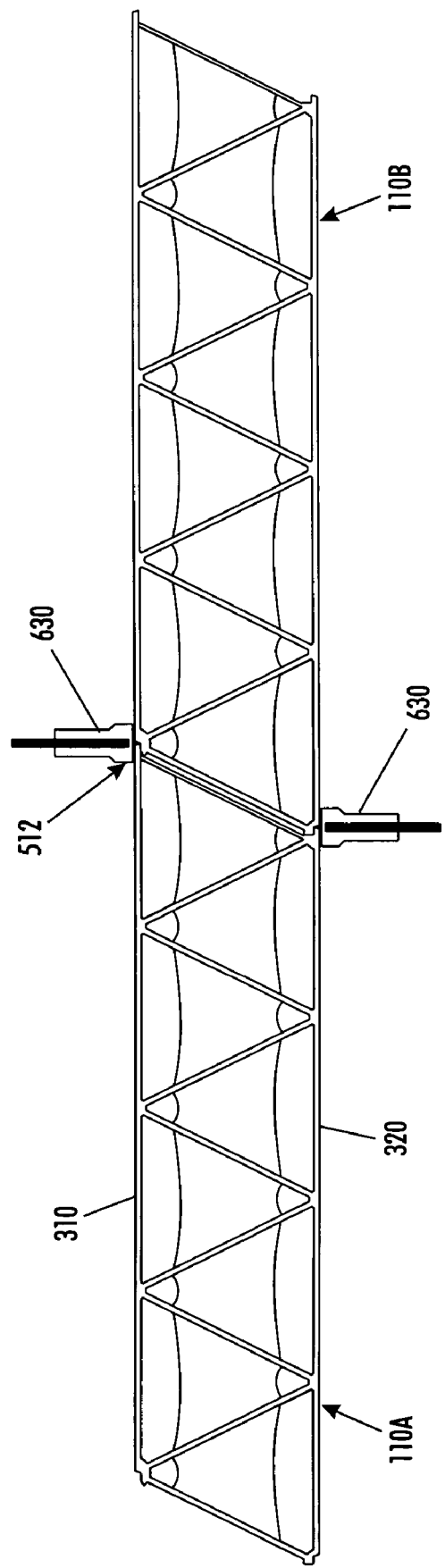
Figure 14:
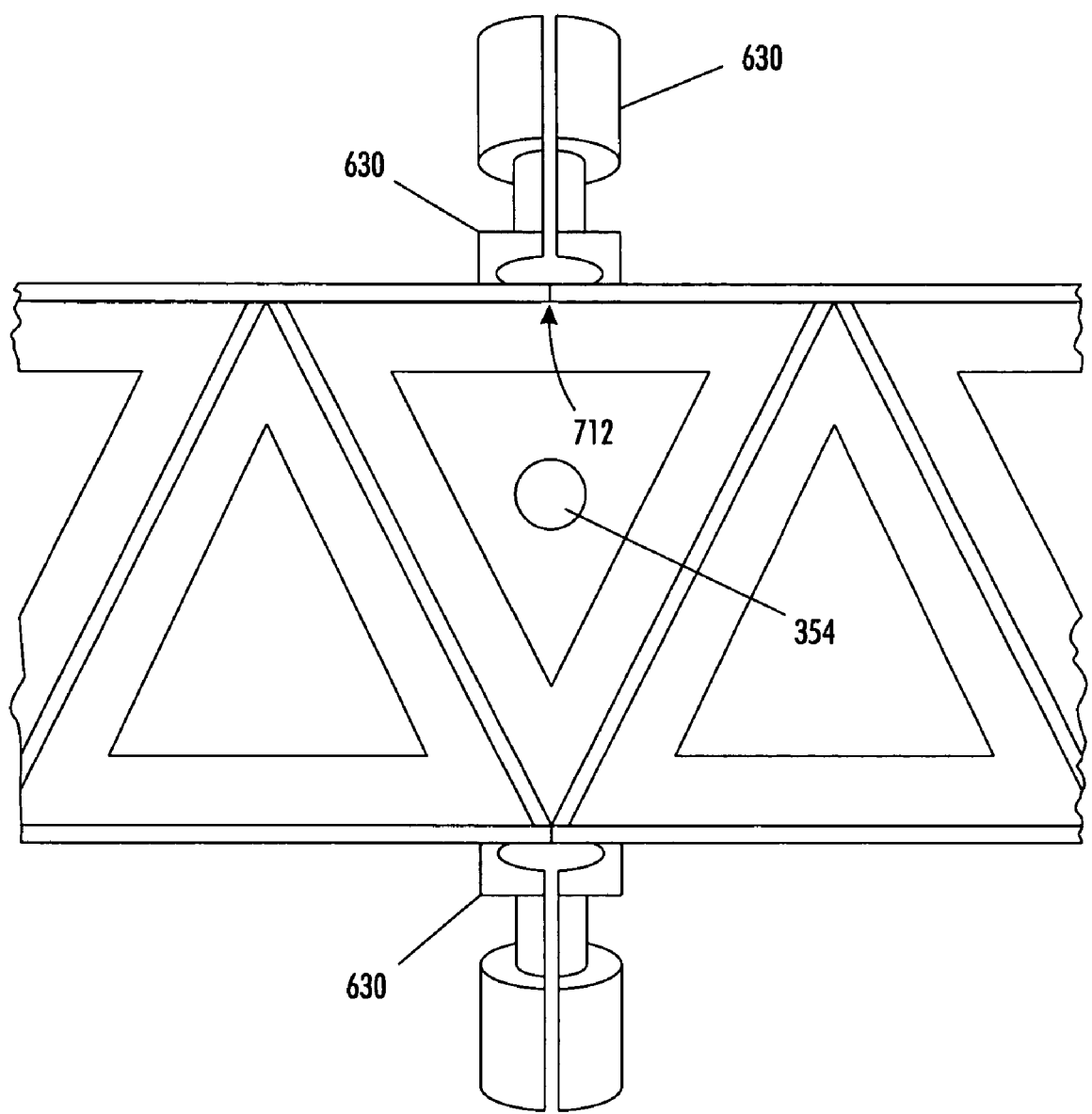

Referring next to FIG. 12, there is depicted a general illustration of the manner in which an extruded or similarly formed wall panel 300 may be cut to a desired width in accordance with the required foundation dimensions. For purposes of clarification, the terms wall panel length shall be used to characterize the ultimate height of a wall panel used in a foundation, whereas a wall panel width, at the time of manufacture is determined by process constraints (e.g., extrusion die width). It is, however, contemplated that panels may be assembled along adjacent edges so as to build the panels into a desired width or the ultimate linear length of a foundation wall (or part thereof). As shown in FIGS. 4, 9 and 13, the ends of the wall panels may include interlocking or mating elements (e.g., 348, 610 and 612) to assure alignment and correct positioning of the panels so as to enable permanent joining of the panels by welding or similar bonding means described herein or otherwise known.

Considering FIG. 12 in more detail, it will be appreciated that in the figure a pair of wall panels 110A and 110B have been previously joined to one another in region 512. After joining the panels, they may be cut to a desired width "D" using a known cutting apparatus suitable for PVC (e.g., saw, heated knife or wire, laser, water jet, etc.) The cut ends are preferably finished by one of the noted components described with respect to FIG. 1, such as a corner member 122.

As illustrated in FIG. 13, adjacent wall panels may be joined together to provide walls of a width greater than what may be produced by an extrusion system. In particular, wall panels 110A and 110B may be placed in position adjacent one another and forced or press-fit into contact along region 512. While being held in this position, or perhaps held there by features of the mating regions themselves, the panels may be extrusion, wire-fed or ultrasonically welded, from both sides, by welding heads depicted generally as elements 630. It will also be understood that whether the panels move relative to the welding heads, or vice versa, the heads traverse the length of the seam between the adjacent panels in order to provide a continuous weld. A continuous weld is believed to be preferable to an intentionally discontinuous weld as it enables the assembled wall panels to meet the structural requirements of the foundation application. As noted herein, the welded regions may be of a lower strength, so a continuous weld is required to assure that the welded joint is structurally sound. Furthermore, a continuous weld will also assist in preventing or minimizing the likelihood of groundwater or other outside elements penetrating through the wall panel seams in region 512.

Although described with respect to an ultrasonic welding system, it is contemplated that one or more joints of the wall panels or similar components may be completed using a solvent welding or gluing process or similar joining method. Of high importance in any such technique is the ability to provide a structurally stable joint, that meets or exceeds the load strength of the wall, and that also provides, at least along one face of the panel, a water impermeable and generally continuous seal.

As depicted in FIG. 13, the edges of adjacent wall panels, in the region 512, are designed to have an overlapping rib and therefore do not require the addition of insulation at the joint. In an alternative embodiment, depicted in FIG. 14, it may be possible to join panels along a cut surface such as that shown in region 712. In such an embodiment, in addition to joining the two faces of the panel, it may also be important to assure that insulation is inserted into the region or cavity formed by the joining of the two wall panels. For this reason, nozzle 354 is also illustrated in the joint region 712. The addition of the insulation may be accomplished concurrent with the ultrasonic welding process depicted or as a post-processing treatment.

An engineering analysis was conducted for a wall panel constructed in accordance with the design generally depicted in FIGS. 1, 3 and 4, for a PVC wall panel having approximately 20% glass fiber. The following assumptions were used:

| Wall Thickness: | 8 in. | Spacing Between Ribs: | 8 in |
|---|---|---|---|
| Face Thickness: | 0.2 in. | Rib Thickness: | 0.15 in |
| Wall Section Length: | 12 in (calculations made per foot) | | |

Base House Load: 2,500 lbs/ft (1,750#/house+750#/brick face)

| Wall Height: | 8 ft. | Maximum Wall Length: | 40 ft |
|---|---|---|---|
| Back Fill Depth: | 7.33 ft. | Soil Wt. | 60 #/CuFt |

Note:
60-lbs./cubic foot is a fluid equivalency rating, and actual soil weights are typically between 85 and 130 #/CuFt.

Based upon the analysis, and using a modulus of elasticity of 1000 ksi, it appears that the total deflection of the wall panel would be approximately over 0.26 inches (and up to approximately 0.6 inches over 25 years) and occurs at approximately 40 inches from the bottom of the wall panel. The wall would be well within its operational limits at approximately 10–11% of the material's rated tensile strength and approximately 2–3% of its rated compression strength, and able to withstand a lateral (horizontal) load from backfill of slightly over 1600 lbs.

Also analyzed as thermal expansion of the wall panels, assuming a 100 degree Fahrenheit temperature variation. Based upon the analysis, the wall panels might expect a thermal expansion over a 40 ft. length of approximately 0.403 inches. And, an additional 16.937 Lbs/Linear ft. of force are anticipated to be applied by winter contraction. Other data determined includes and anticipated vertical deflection 0.067 inches due to temperature variation.

Considering aging of the PVC material, a 44.69 percent maximum fiber stress is predicted at 25 years. A shear stress at the rib to face plate interface of 326.6 psi is predicted, resulting in a 9.33 percent of shear strength at 25 years.

During the design, two primary obstacles were considered in the various designs: creep, or the relaxation of material due to stress, and thermal cycling, or thermal expansion due to temperature change. With respect to creep there is a known reduction in the strength of PVC over the lifetime of the material. The 20% glass fiber reinforced PVC being considering weakens at following rate (stress over time):

| Time | Apparent Modulus |
|---|---|
| 10 seconds | 1,000,000 psi |
| 1 year | 652,000 psi |
| 5 years | 550,000 psi |
| 10 years | 501,000 psi |
| 25 years | 446,000 psi |

As will be appreciated after twenty-five years the material is reduced to less then 45% of it's published strength. This is fairly uniform throughout all of the strengths (fiber strength, Tensile strengths, etc.). The less fiber in the material, the greater the decline in strength. For example, assuming a faceplates thickness of 0.2 in., a rib thickness of 0.15 in., a backfill level of 7.33 ft. and a wall panel thickness of 8 in., the 10 seconds creep (installation) for a panel would be as follows:

| % fiber reinforcement | Deflection (in.) | Thermal Exp over 40 ft. (in.) |
|---|---|---|
| 10 | 0.353 | 0.571 |
| 20 | 0.263 | 0.403 |
| 30 | 0.197 | 0.336 |

As noted, thermal cycling is also important to consider. The PVC material has a relatively high expansion and contraction rate −300% greater then wood such as pine. Additionally many temperature zones should be accounted for, including the interior (normally consistent), exposed exterior, and below grade (with various temperature zones dependent upon depth).

As used in the present invention, the top plate or header should be able to transfer a percentage of the lateral load from the wall panel to the structure while transferring the compressive loads of the structures weight to the wall panel. This is difficult in that the load is carried throughout the wall panel with the greatest loads occurring at the interior and exterior plate. If the header does not adequately and evenly transmit these loads the header will rotate inward possibly causing the ribs to deform and ultimately the joint may fail. In addition to the lateral loads, the header needs to control thermal cycling so that the transfer of stress to and from the structure can occur without interruption.

The sill is intended to transmit the compressive loads to the footer as well as transmit a percentage of the lateral forces to the poured concrete floor. The representative lateral force here is in the range of 1150 pounds per linear foot, versus approximately 470 pounds per linear foot at the header. At these loads there is an increased need to be sure that the resulting stresses are adequately transferred. Also if the sill is not designed to spread the load there is a danger of a high compression zone at the leading edge of the concrete, which could act like a knife cutting into the wall panel, with the potential for a failure.

The vertical joints, and particularly the corners, are not only a means for finishing off the wall panels, but also act as structural elements. Primarily they need to control the effects of thermal cycling by limiting the "pumping" of the soil that could occur. Soil pumping could occur when the wall contracts, due to a drop in temperature, and pulls away from the soil, and later expands, due to a rise in temperature. When this cycle is repeated it can effectively compress the soil around the foundation causing higher lateral soil loads.

Furthermore, at the location of the beam pocket there is a high compressive load applied to the wall panel. The beam pocket and other supports are employed to assist the wall panel in distributing this concentrated load over a larger area of the footer and soil in a method that does not compromise the wall panel.

Figure 15:
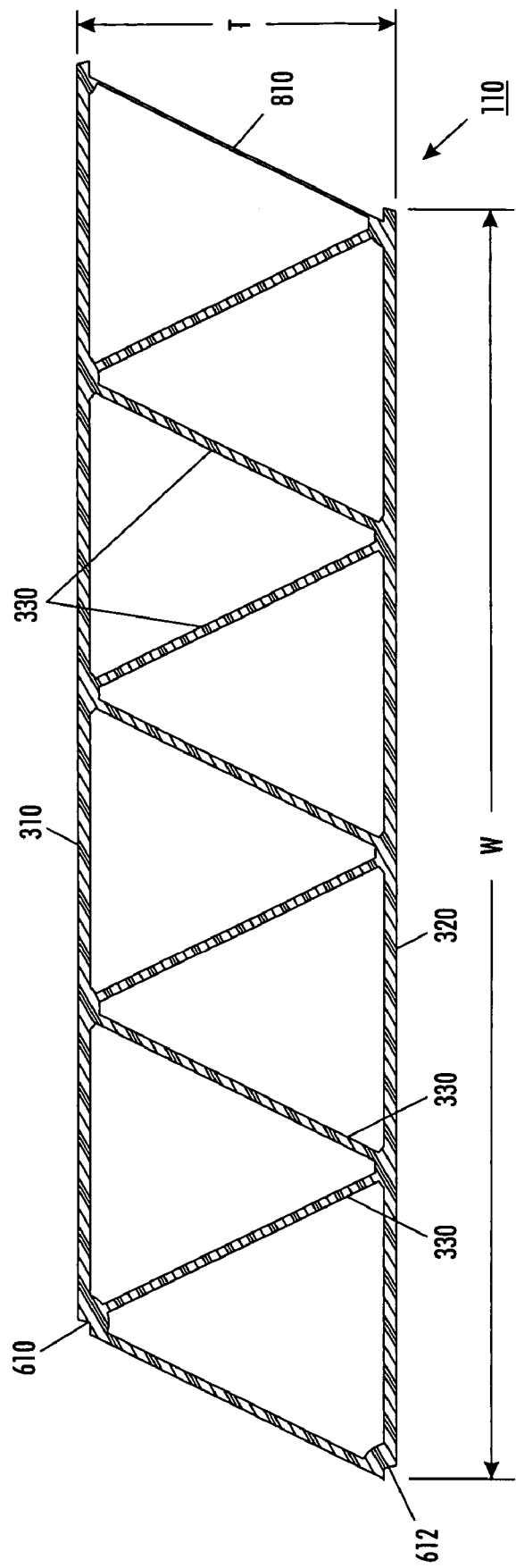
FIGS. 15–18 are illustrations of alternative configurations of the wall panel of FIGS. 4 and 5.

Having described certain general aspects of the polymeric foundation structure and system, attention is now turned to some additional wall panel embodiments, as well as to the additional foundation system components previously referred to. FIGS. 15–18, as will be described, depict various alternatives for the wall panel 110. As illustrated in FIG. 15, wall panel 110, as previously depicted, includes a front face sheet 310 and a rear face sheet 320, where front and rear are merely chosen for reference purposes and are not intended to be limiting as to the orientation of the wall panel. The wall panel of FIG. 15 also includes web members or ribs 330 that hold the face sheets in separation from one another. Although depicted in a generally flat and parallel relationship, it will be appreciated that certain embodiments may call for face sheets that are angled relative to one another or that are curved (e.g., curved or rounded walls). At the right end of the wall pane, rib 810 is noted to be thinner in width than the remaining ribs 330. This is because when a left end of one wall panel is mated with a right end of an adjacent panel, via mating elements 610 and 612, the adjacent panel rib is of full size. Accordingly, it is believed that rib 810 may be of reduced thickness, serving only to hold the face sheets in separation until the panel is mated with an adjacent panel or another foundation system member to add structural rigidity. Rib 810 may also hold the insulation in place so that there is no secondary application required after assembly.

Figure 16:
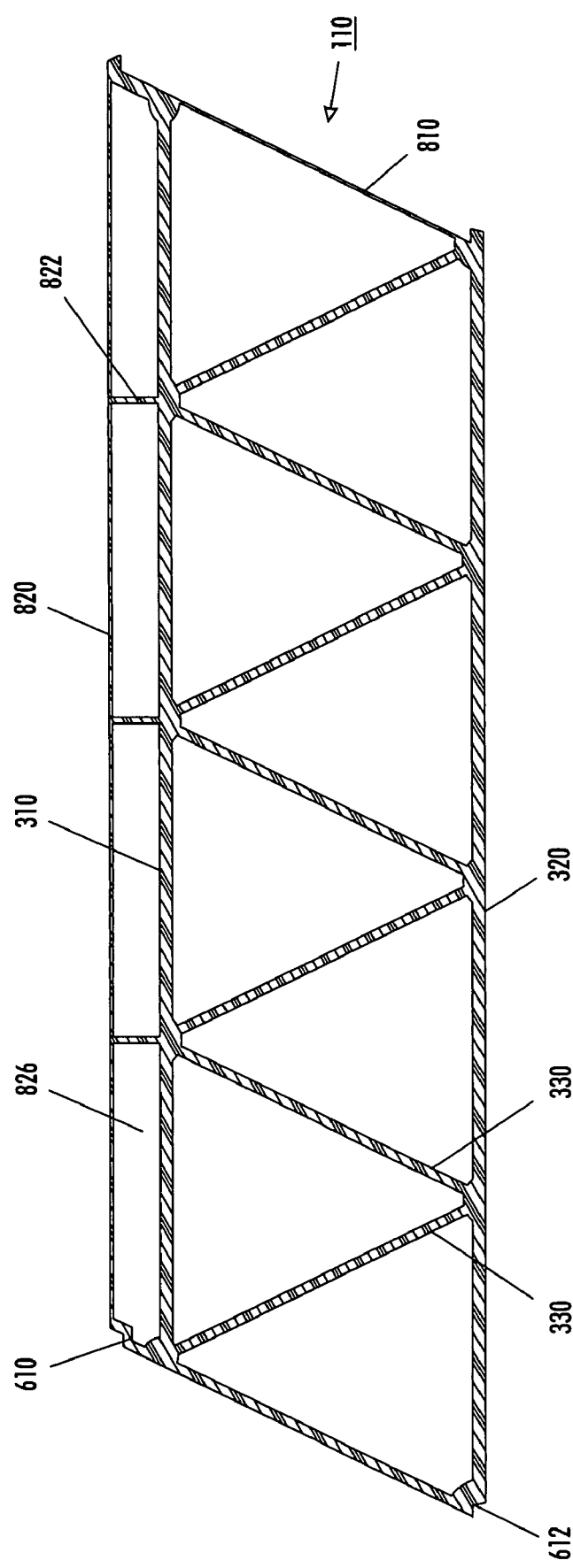

The wall panel depicted in FIG. 16 is essentially the same as the panel of FIG. 15, with the exception that an additional sheet face 820 has been added near face 310. In particular, a plurality of ribs, extending perpendicularly or at other angles from face 310 create a cavity 826 between the face 310 and secondary face sheet 820. It is believed that the additional cavity may be valuable for the purpose(s) of being filled with a flame resistant insulation to protect the web structure in the event of a fire. It is believed that this aspect may be advantageous in obtaining fire-safety certification of the structure. Alternatively, the cavity 826 may be used for plumbing or other mechanical system components (e.g., water lines, drain pipes and stack vents, HVAC ducts, electrical wiring, etc.).

Figure 17:
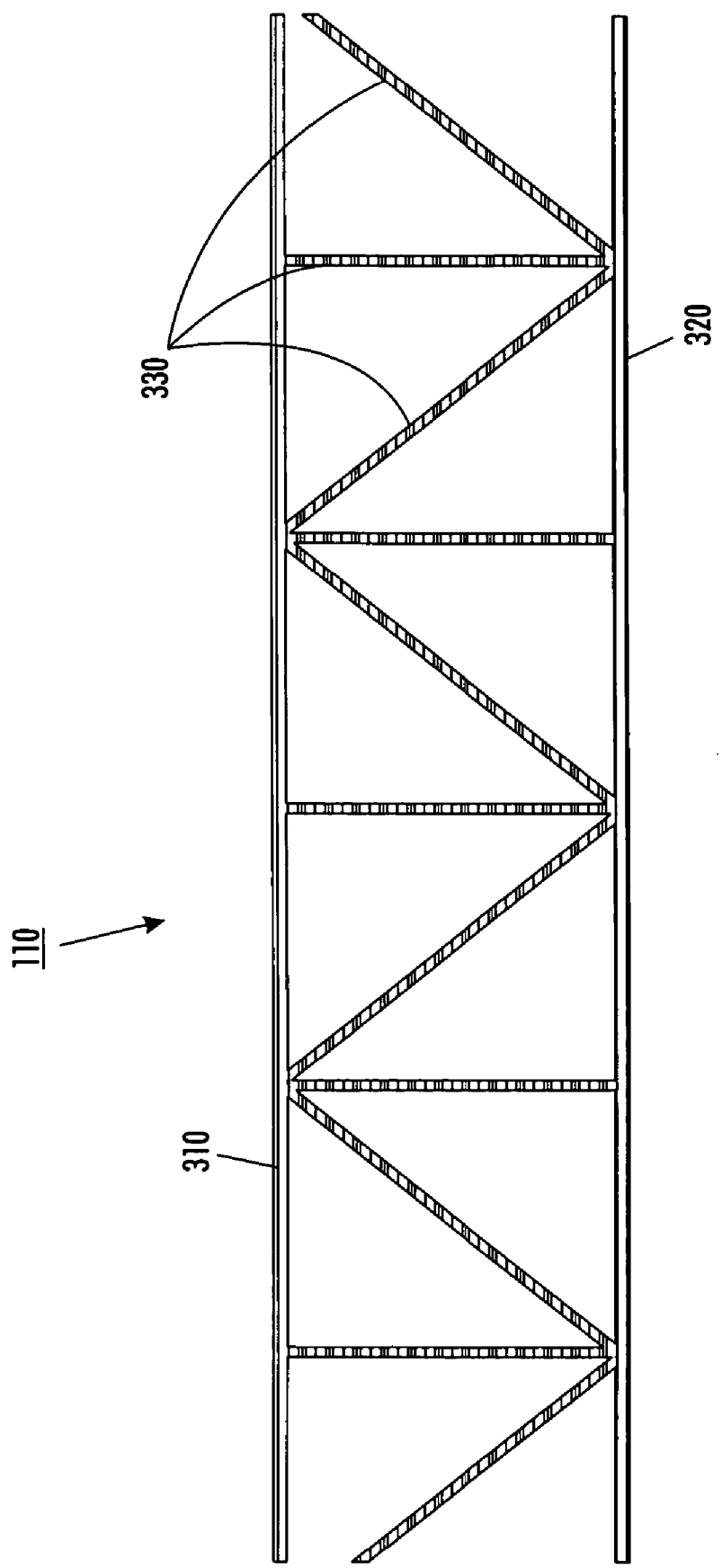
Figure 18:
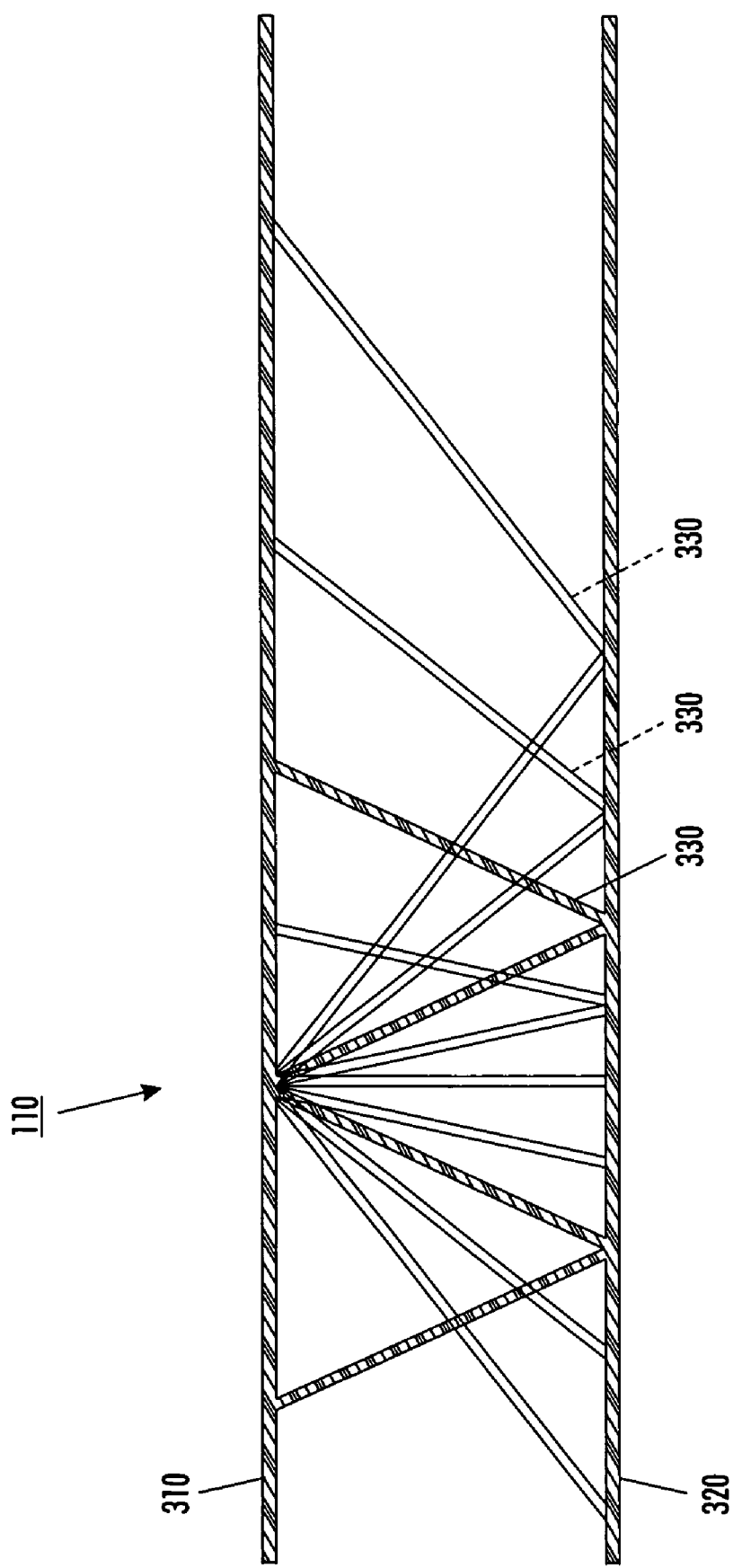

As will be appreciated, FIGS. 17 and 18 are intended to represent alternative embodiments for the basic rib system design employed in the wall panels. In particular, FIG. 17 depicts a design where the ribs or webs 330 are oriented both at an angle to the face sheets and perpendicular to the face sheets. Similarly, FIG. 18 illustrates that the design may include various angles for the ribs. As will be appreciated, the wall panel strength, and deflection under load, is at least partially dependent upon the design, including the face sheet thickness, rib angles, rib or web thickness and the material properties. Accordingly, the varying rib angles in FIG. 18 may be used to provide wall panels of differing strengths for particular applications and/or different soil conditions.

As noted, the performance of the wall panel and the foundation system is, to a certain degree, a function of the materials used and the dimensional characteristics of the foundation system components. Based upon preliminary simulations, with various materials, the following dimensions may be considered exemplary, but are not intended to be limiting. Moreover, the greater thicknesses may not be realistic because of the cost of materials and limitations of the manufacturing process (e.g., extrusion). For example, a wall panel 110 would likely have a face sheet thickness on the order of 1.6 mm to about 12.7 mm and angled ribs, set at about a 60-degree angle with the face sheets. The thickness of the ribs is likely to be in the range of 0.787 mm to about 9.53 mm. Although various widths are possible, the dimension "W" of a typical wall panel would likely be on the order of 45 cm to about 122 cm, with multiple adjacent panels being employed in order to produce walls of longer lengths. Typical wall thicknesses "T" are intended to be on the order of 12 cm to about 23 cm as illustrated in FIG. 15.

Figure 19:
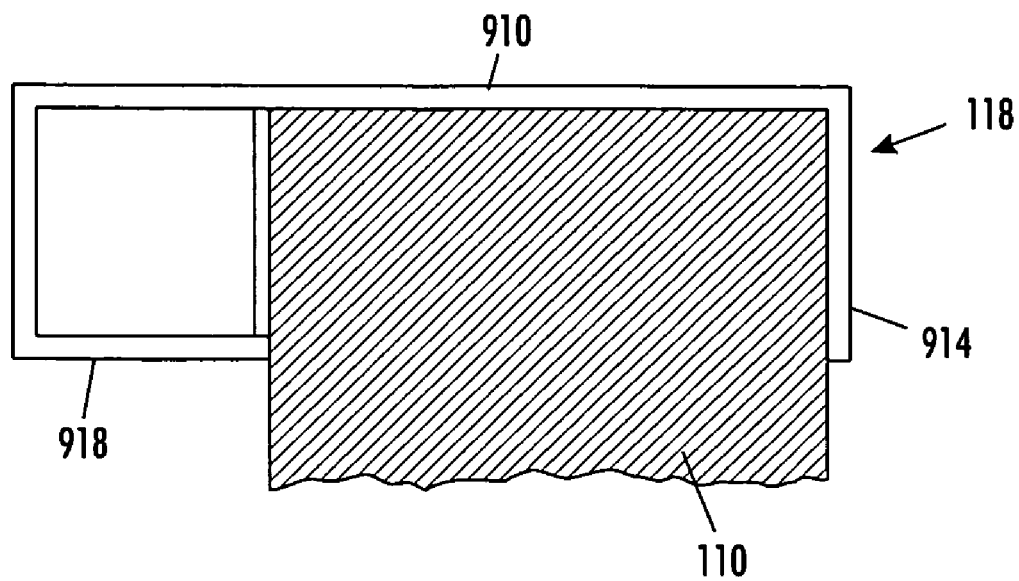
FIGS. 19–23 are cross-sectional view of various alternative top plate designs in accordance with aspects of the present invention.

Attention is now turned to the various components that may be needed to complete a foundation using the wall panels described in detail above. For example, referring to FIGS. 19–23, various configurations and alternatives for cap or top plate 118 are illustrated. FIG. 19 is an illustrative cross-section of a cap 118, including a horizontal face 910 with an adjoining tab 914 along one edge and a square or similarly shaped channel member 918 along the other (inner) edge. The channel member 918 and tab 914 form a recess therebetween where a wall panel member may be inserted. The purpose of the channel member is to provide rigidity to the cap 118, and to provide a means for enclosing electrical or plumbing components as is depicted in the alternative embodiment of FIG. 21.

Figure 20:
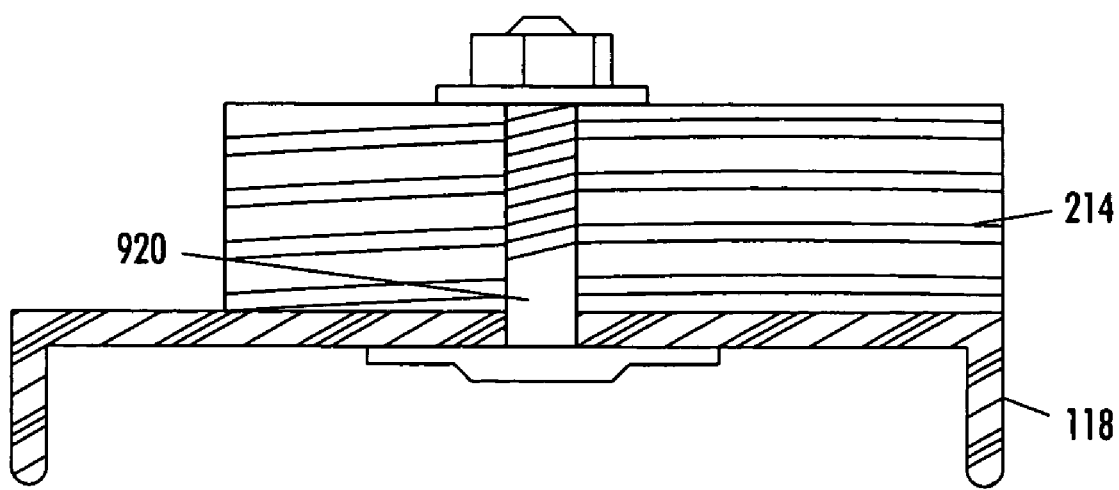

Referring to FIG. 20, one possible application of the cap 118 is to provide an anchor or connection in order to tie the foundation wall system to the remaining building structure through a sill 214 attached thereto by a plurality of bolts 920. It will be appreciated that the bolts may be spaced at regular intervals along the cap member, either in pre-drilled holes or in holes that are drilled at a job site during final assembly. Bolts 920 preferably include a wide head so as to spread the load of the sill attachment over a large region of the cap, and therefore the adjoining wall panel.

Figure 21:
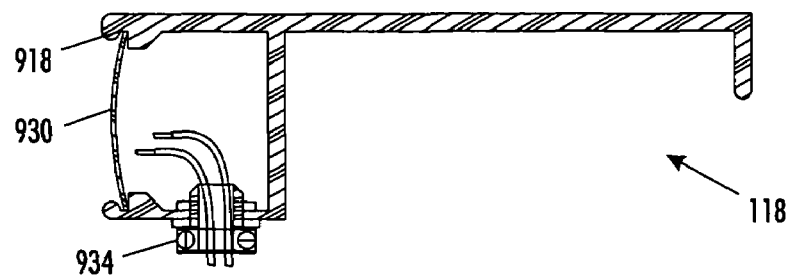

As illustrated in FIG. 21, previously alluded to, cap 118 may include a channel 918, where electrical components, wiring, etc. may be enclosed. To facilitate such components, all or a portion of the inner face (or lower) of channel 918 may have a hole with removable cover 930 placed therein to allow access to the components within channel 918, for example, electrical component 934. It will also be appreciated that the top plate or header 118 may have decorative faces or details on the interior and/or exterior flanges, like a crown or detail molding.

Figure 22:
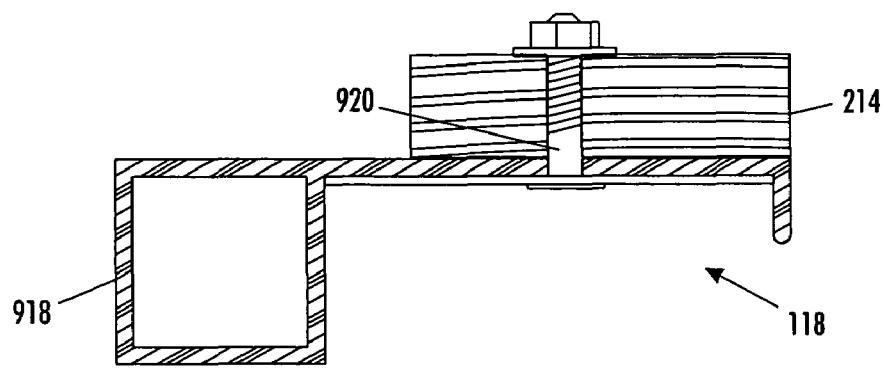
Figure 23:
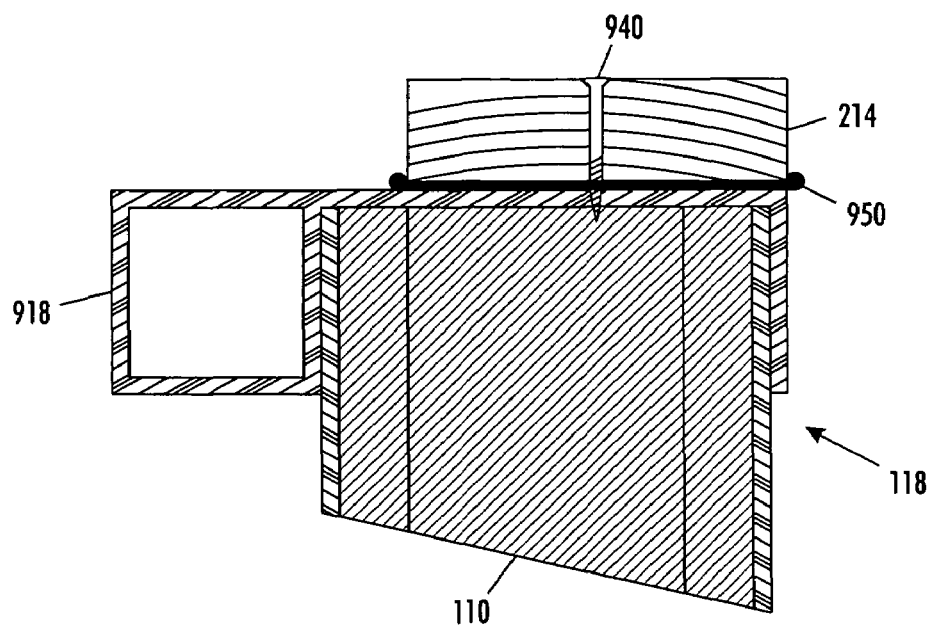
Figure 24:
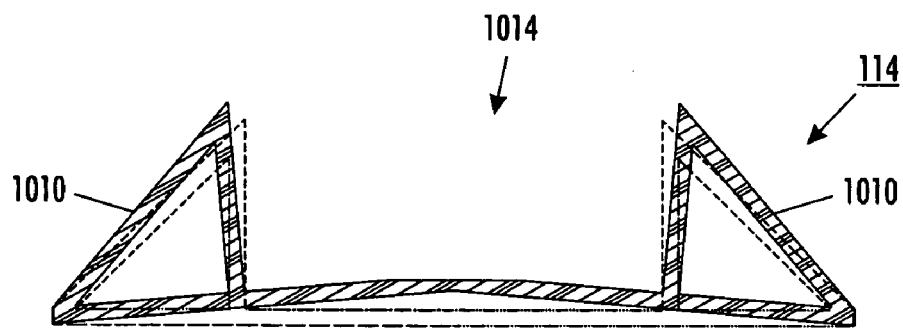
FIGS. 24–33 are cross-sectional view of alternative sill plate designs in accordance with aspects of the present invention.

FIGS. 22 and 23 show two additional alternatives embodiments of the cap 118, where the sill 214 is attached to the cap using a bolt 920 and nut as shown in FIG. 22 or with a plurality of screws 940 through the sill and into the cap, as depicted in FIG. 23. Also shown in FIG. 23 is the possible addition to a gap-filling insulation member 950 that is used to assure a complete seal between the cap 118 and the sill 214 as required by energy efficient building codes.

In various embodiments, it may be required to attach the top plate or cap 118 to a conventional lumber structure, as illustrated in FIGS. 21 and 22, a mechanical fastener may be employed. However, it is believed that the function of the wall panel foundation is optimized by using an adhesive such as Macco Adhesive's Adhesive for Subfloor and Decks (LN-602), Liquid Nails® or similar means to permanently bond the wooden plate to the top plate 118, thereby assuring appropriate structural integrity at the foundation-framing interface. In a preferred embodiment, a pair of adhesive beads would be placed along the edges of the plate. In this manner, the screws or bolt-type fasteners would be used to provide a compression fit to assure contact with and distribution of the adhesive. Also, an adhesive would be applied so as to permanently attach the top plate to the top of the wall panel(s). In one embodiment, it is contemplated that one or more adhesives are applied or pre-applied before assembly, thereby improving the ease of assembly. For example, the interior of the top plate could be coated with a sprayed or rolled-on adhesive or similar bonding means to adhere to the wall panels once they are inserted therein.

Turning next to FIGS. 24–33, depicted therein are various alternative embodiments of sill plate 114. The purpose of the sill plate, in addition to holding the wall panels in place, is to distribute the foundation load over a larger area than what is presented by a bottom cross-section of the wall panel. Referring first to the sill plate of FIG. 24, it is apparent that the plate has been produced with a slight crown across its width. The purpose of the crown, which may be applied to any of the other configurations, is to provide a sill plate that that has the outer flanges 1010 "opened" slightly—where it will be easier to insert a wall panel down into the recess 1014 defined by the flanges. Once the wall panels are inserted, the weight of the wall panels thereon will cause the crowned sill plate to flatten out to a final position as indicated in the figure. It will be noted in FIG. 24 that the flanges 1010 are made in a generally triangular shape. Again, this forms a channel that provide structural rigidity to the sill plate in order to assure that the bottoms of the wall panels are held therein. It is an intention to keep symmetry in the sill plate cross-section in order to reduce waste from the miters and reduce the chances of someone installing it backwards. It will be appreciated, however, that particular requirements may necessitate an asymmetric cross-section for the sill plate 114.

Figure 25:
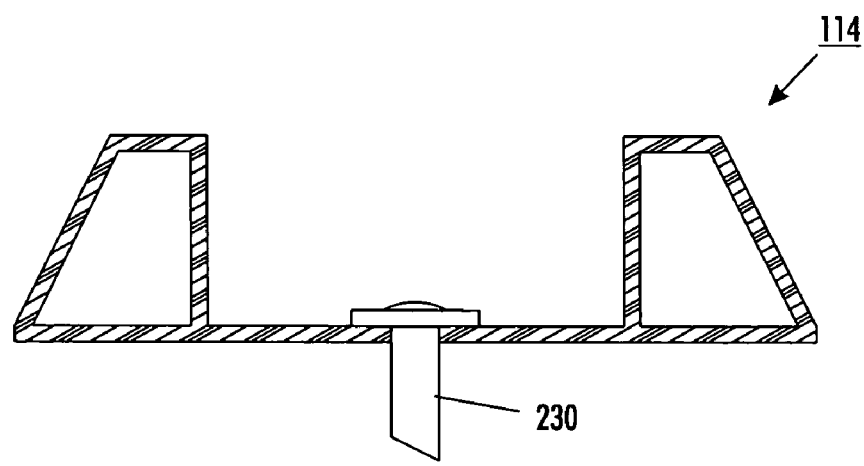
Figure 26:
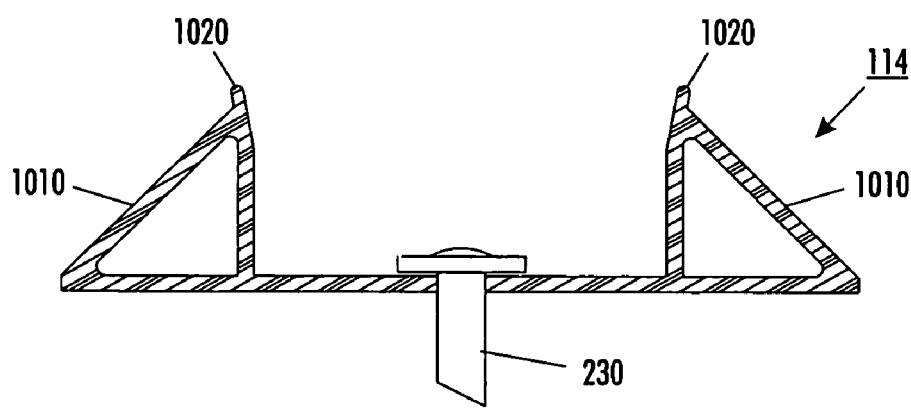
Figure 27:

FIG. 25 shows an alternative flange cross section, in the form of a polygon, as well as spike or an anchoring bolt 230 which is intended to hold the sill plate in place (resist horizontal shifting, while the foundation is being assembled. FIG. 26, shows yet another alternative flange cross-section, this time with angled tabs 1020 at the top of each flange, where the tabs are angled outward so that the tabs may assist with the alignment of wall panel sections being placed within the sill plate. FIG. 27 is a cross sectional view of a sill plate 114 as depicted in FIG. 1.

Figure 28:
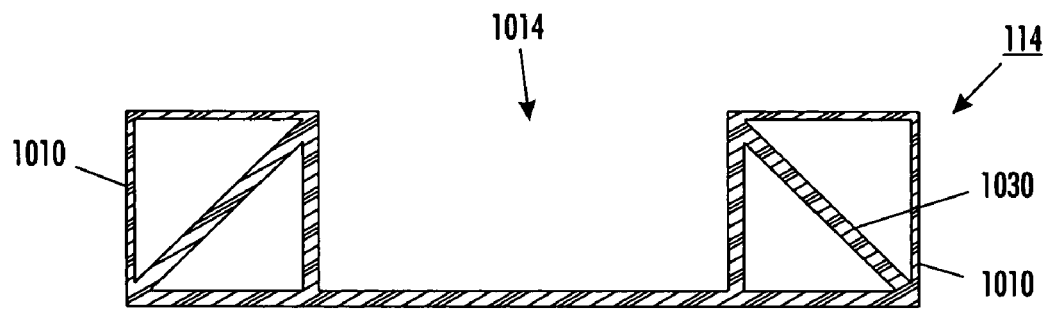
Figure 29:
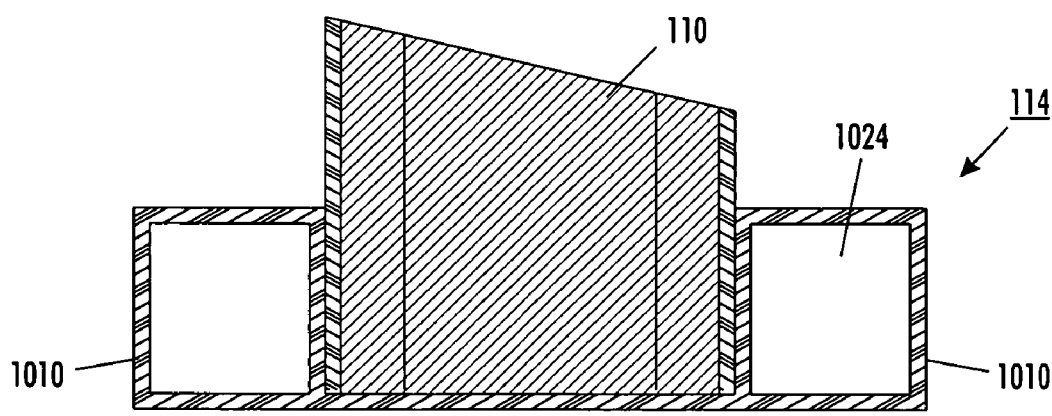
Figure 32:
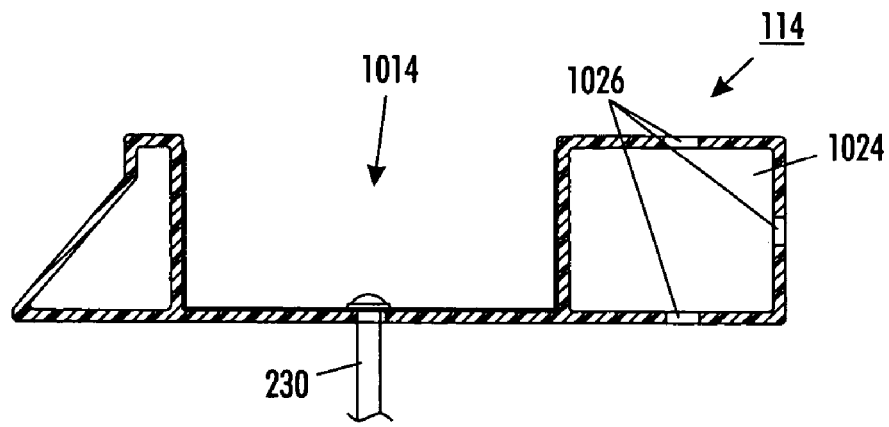

FIGS. 28 and 29 depict two additional sill plate designs, each having a generally rectangular-shaped flange 1010, again defining a recess 1014 for receiving a wall panel 110 therein. It will be appreciated that the rectangular channel of FIG. 28 includes a diagonally bisecting web or rib 1030 to add further structural support and rigidity to the sill plate. It is also possible, as depicted in FIG. 32, that the outside channel region 1024 (or possibly inside) edges of the sill plate may be further provided with perforations 1026 therein so as to enable the channels themselves to assist in the collection and removal of groundwater that might collect at the base of the foundation wall. Sill plate 114 may also include drainage holes to allow water that may collect inside the panels to pass through to the underlying footer. Water may collect from condensation, vapor collection or high groundwater levels. Holes and/or channels within the sill plates would preferably drain this water, and in flooding conditions (and even during construction where excavations are susceptible to flooding), the wall panels could then take on water and be kept from floating out of position. Further contemplated, although not shown, is a design for a sill plate in combination with a corner joint that would pass the water from the outside of the foundation wall to a sump crock.

Figure 30:
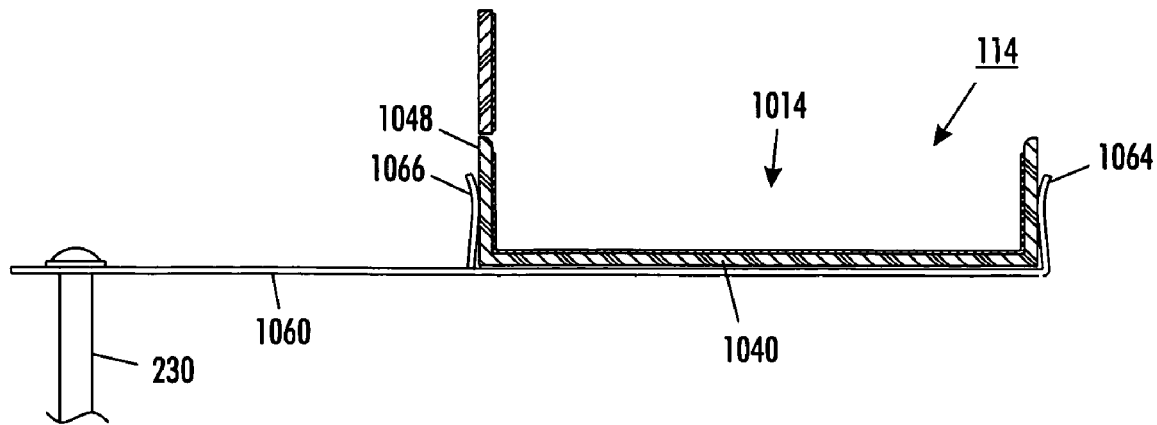
Figure 31:
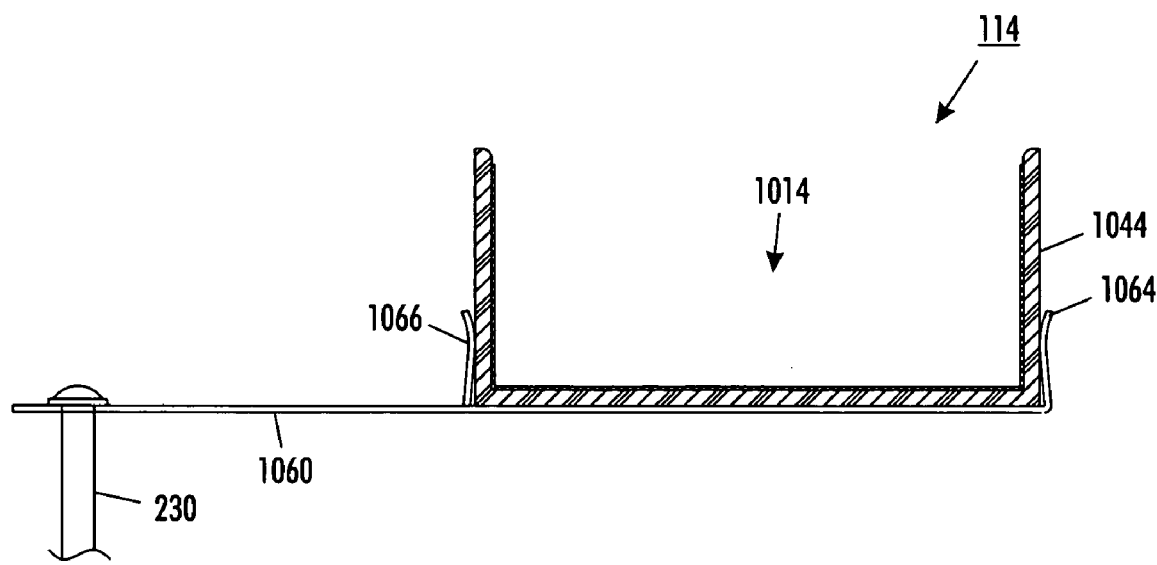

Referring to FIGS. 30 and 31, it will be seen that the sill plate employed may be as simple as an extruded channel 1040 or 1044. In FIG. 30, channel 1040 has an interior flange 1048 that is of a height slightly greater than the exterior flange 1050. The interior flange may be employed as a screeding edge when the concrete floor (not shown) is poured adjacent the flange and lower portion of the wall. It will be appreciated that the heights of any of the various flanges described relative to various sill plate designs may be modified so as to permit different floor thicknesses to be achieved.

Also depicted in FIGS. 30 and 31 is a hold-down strap 1060. Strap 1060 is intended to assure the accurate placement of the sill plate 114 and holding of the position as the wall panel is being inserted, the floor is being poured etc. By use of the strap and a spike or similar device, strap 1060, may be used to hold the various sill plate designs 114. In the depicted embodiments, strap 1060 uses a spike, however, it will be appreciated that it may be possible to form a sharp tab along or at an end of the strap to accomplish a similar function as the spike. Furthermore, the strap is preferably formed from a single piece of metal such as steel, with one end bent upward to form tab 1064. At a middle region of the strap, a smaller tab 1066 is cut partially across the strap width and bent into the position shown. A spike hole or holes may be punched to provide a location for inserting the spike, however it may also be possible to permanently affix the spike to the strap for convenience, or to position an additional spike that mates with a hole or channel on the sill.

Figure 33:
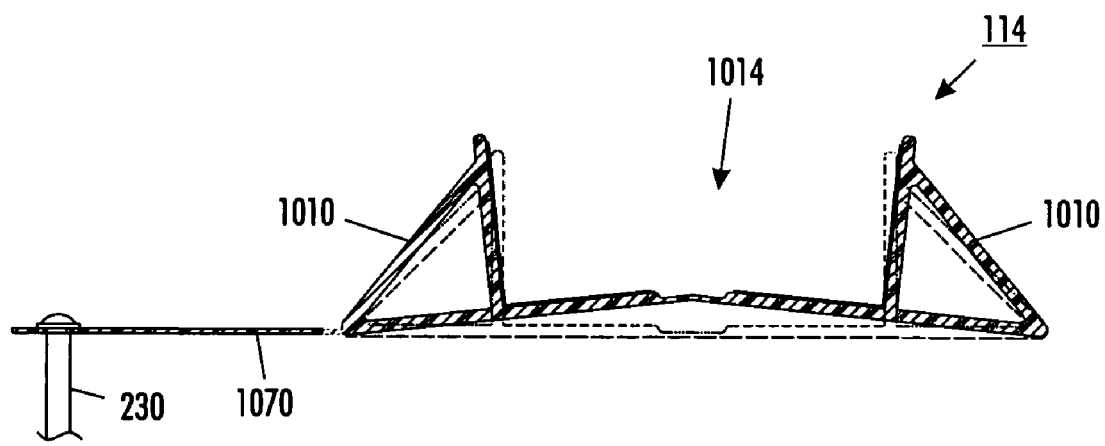

Next, as represented by FIG. 33, the combination of the function of the strap (FIG. 30, 1060) and sill plate 114 may be combined, where the sill plate and strap are integrated or formed from a common material (e.g., extruded). In this embodiment, the strap 1070 is integrally formed with the sill plate 114 in any of the various cross-sections illustrated in FIGS. 24–32.

It should be understood that the various component configurations depicted in the cross-sectional views of top plates in FIGS. 20–23 and the sills in FIGS. 24–33, as well as for other components discussed below, are particularly designed so as to be readily extrudable. The ability to produce the components via an extrusion process is not only consistent with the intent of an aspect of the present invention, but will allow for the components to be produced in lengths that may be adequate for use in foundation systems without requiring splicing or other joining of such components.

The description is now directed to the various adjoining elements and other vertically-oriented members or components of the foundation system, including joints and corners. As will be apparent from the various alternative adjoining elements and several embodiments described below, numerous alternatives are possible and are believed apparent once the general structure of the adjoining elements is described. Again, common to the various alternatives are cross-sections that receive or fit to the edges or other portions of the wall panels described above. Moreover, the adjoining elements are preferably designed such that they may be manufactured as a complete unit, preferably by extrusion or a similar mass-production technique.

Figure 34:
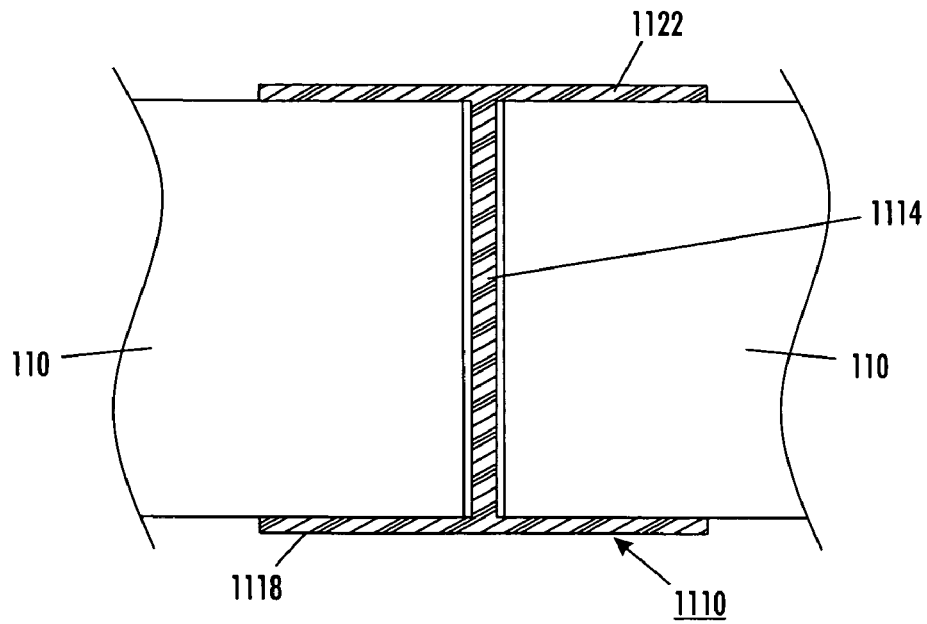
FIGS. 34 and 35 are cross-sectional views of two vertical joint components used at wall panel edges.

Referring first to FIG. 34, depicted therein is a cross-sectional view of a vertical joint component 1110 that would be used to join two wall panel sections 110. Joint 1110 includes a central rib 1114 that connects two flat flanges 1118 and 1122. In use, the flanges, which have a width H' that is approximately equal to the wall thickness H, extend along either side of a wall panel inserted therein. In order to provide a permanent and preferably water-resistant seal, the flanges may be glued or welded (ultrasonic or solvent) to the face sheets of the inserted wall panels.

Figure 35:
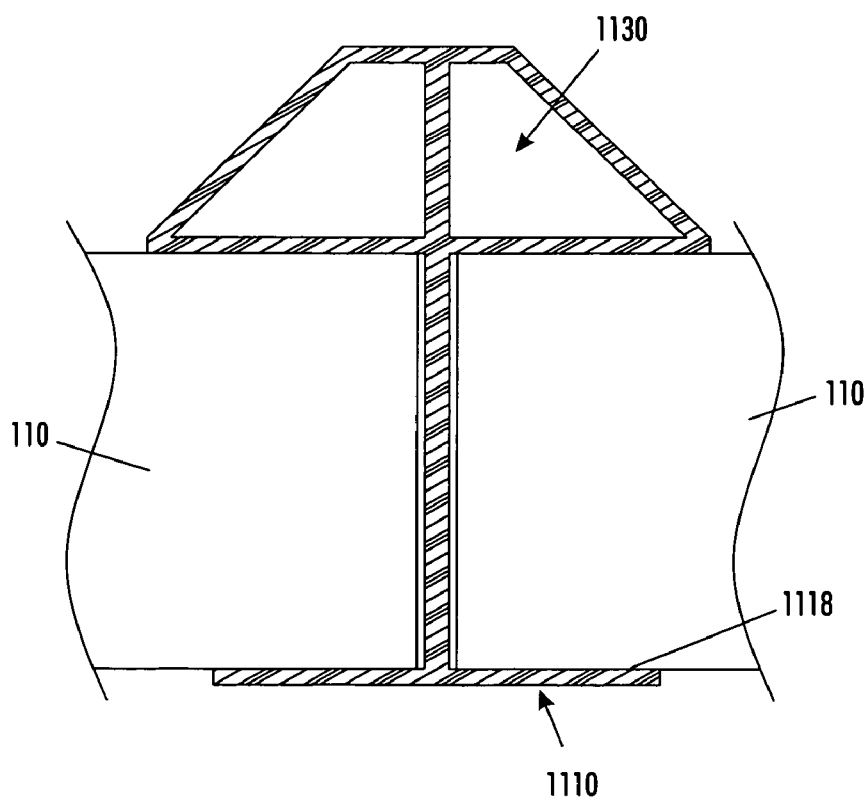

An alternative vertical joint is depicted in FIG. 35, where joint 1110 has at least one flange that includes an enclosed channel 1130 to add rigidity to the joint. It will be understood that such a joint member may be used to reinforce the wall at the joints in much the same way as a pilaster or similar foundational element may be used to reinforce a long foundation wall or one anticipated to be subjected to significant horizontal and/or vertical loading.

Figure 36:
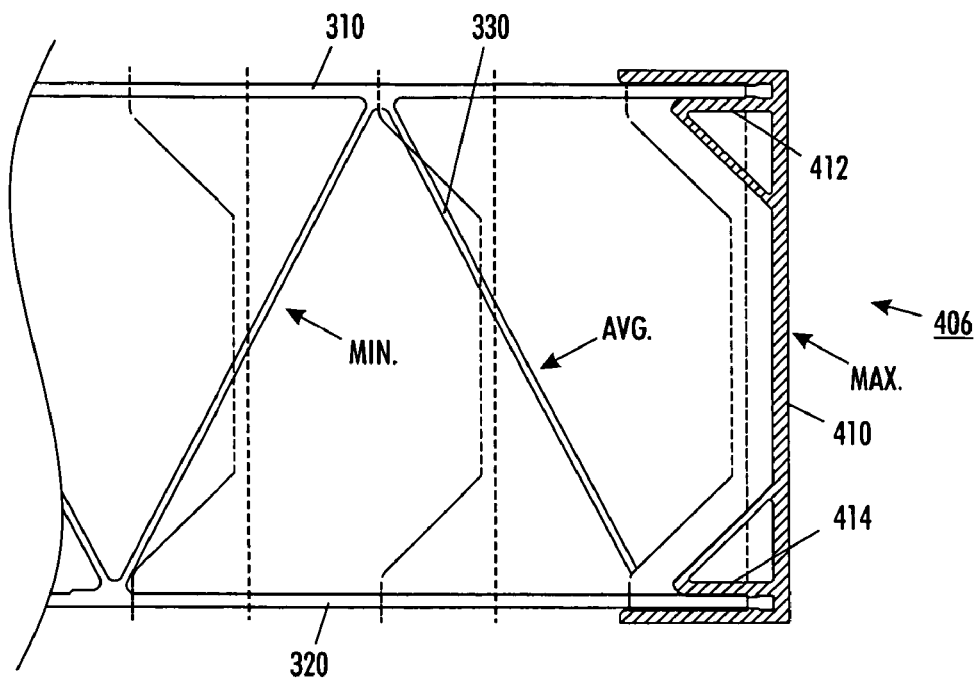
FIGS. 36 and 37 are cross-sectional views of a wall panel edge depicting aspects of two edge treatments.
Figure 37:
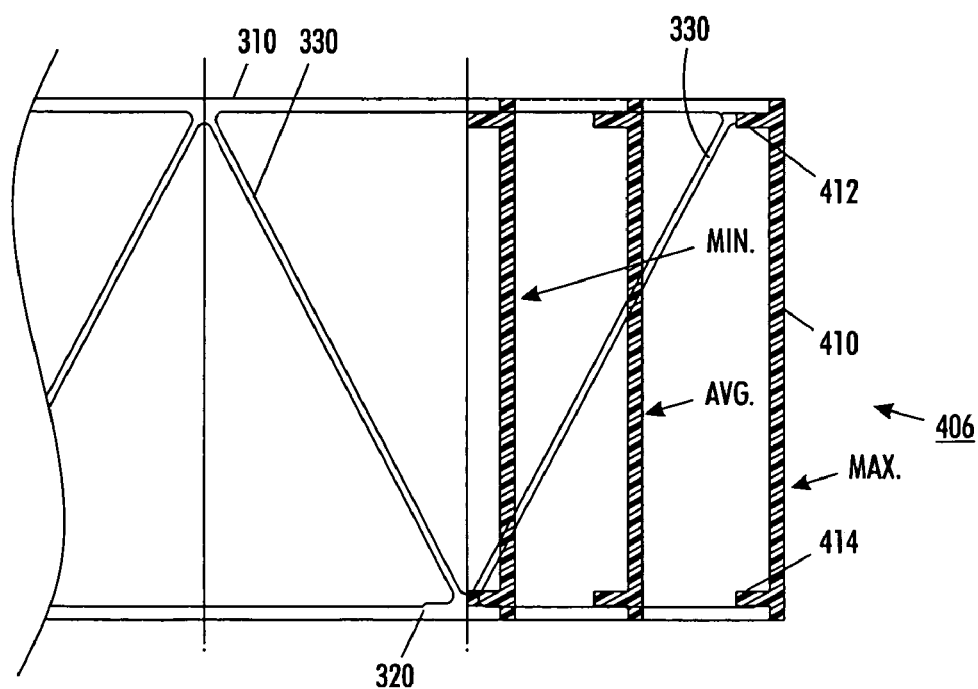

Referring next to FIGS. 36–39, various means for affixing or adjoining wall panel sections and the adjoining elements will be discussed briefly. Although simple butt-type joints as depicted in FIGS. 34 and 35 are possible, the present invention contemplates alternative joints that are believed to improve the structural integrity of the wall panel over the butt-type joints depicted previously so as to enable joints for use in below-grade applications. In such applications, it is important to assure the integrity of the wall panel components, and particularly the rib or web spanning the cavity between the panel faces. As illustrated in FIGS. 36 and 37, where two alternative means for affixing wall panels are represented, the loading of the joint goes from a minimum (Min) to a maximum (Max) load based upon where the joint position in relation to the last wall panel rib 330. Accordingly, in order to replace the load carried by a removed or partially removed rib (e.g., 330), the adjoining elements 406 may include a member having a perpendicular rib 410, and a pair of flanges 412 and 414 on either end of the rib to intersect the faces of the wall panel.

FIG. 36 shows an adjoining element 406 having a pair of internal flanges 412 and 414, as well as a pair of external flanges 420 and 422. A gap between the respective internal and external flange pairs is provided for the insertion of the wall panel face therein. As will be explained in more detail, the wall panel faces would be permanently affixed to the flanges via a bonding means in the gap. FIG. 37 illustrates an adjoining element with only a flange at each end of the rib, thereby making the installation of the element easier. Over the three positions illustrated for insertion of the adjoining element 406 (Max, Avg and Min), the respective deflections calculated under maximum loading conditions (backfill of wall) are no greater than approximately 1.4 cm for a 20.3 cm (8 inch)thick wall having a structure similar to that illustrated. As will be appreciated by those knowledgeable in mechanical and civil engineering design, the replacement rib with its associated flanges reduces the load carrying requirement of the joint itself and also provides adequate contact area to support the faces at the edge of the panel (e.g., for adhesive in a bonded rib, or for larger contact in a free-floating joint, so as to prevent fiber shear of the joint/rib from the panel edge). In other words, upon loading of the foundation wall, a longitudinal shear force component may be induced at the adjoining elements, and the elements themselves need to be designed so as to handle such forces. For example, with the configuration of FIG. 37, a 1.27 cm (0.5 inch) adhesive contact width may be used to assure proper distribution of adhesive between the panel face and the flange.

Figure 38:
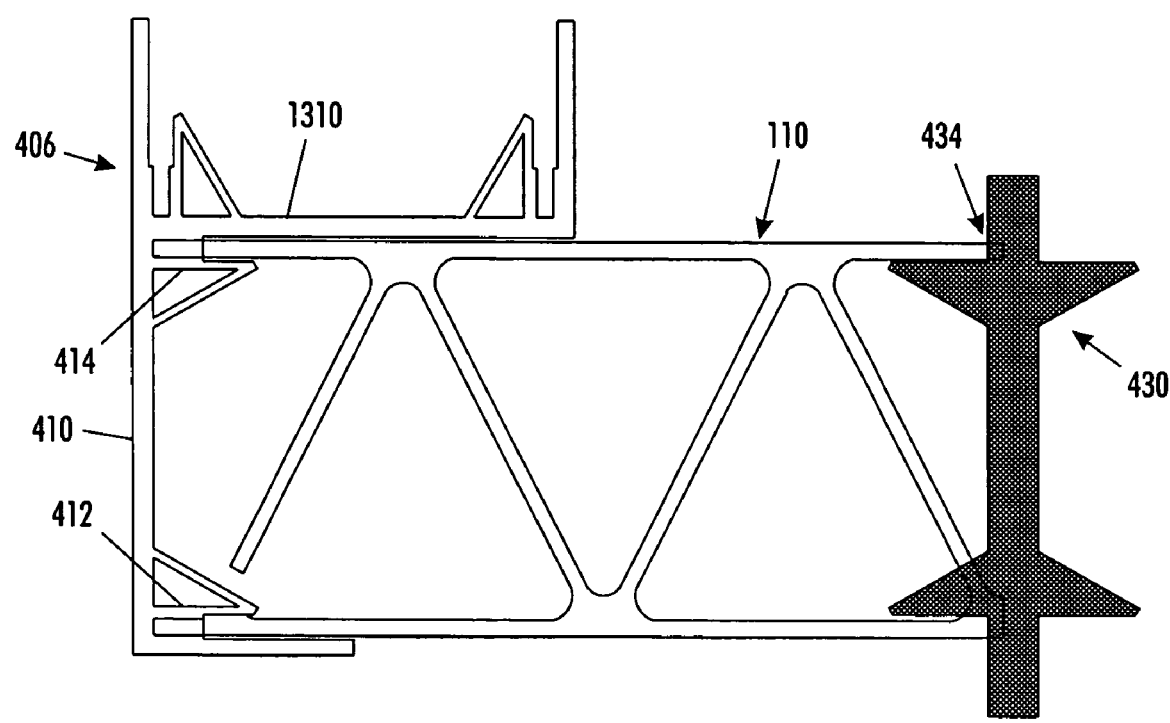
FIG. 38 is a cross-sectional view of a wall panel assembly at a corner, and illustrates a method of preparing and connecting the edges of the wall panels.
Figure 39:
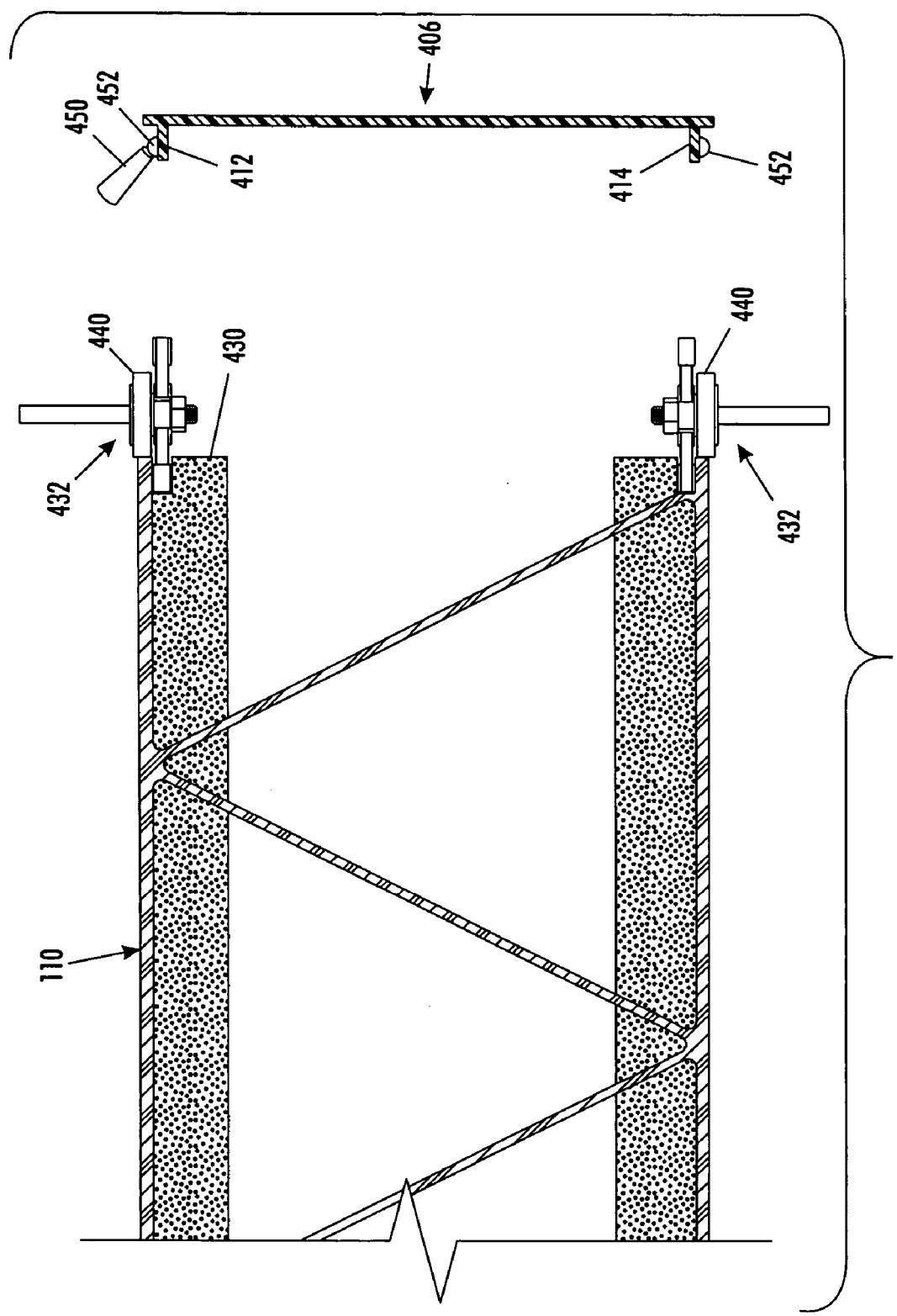
FIG. 39 is a cross-sectional view of a wall panel illustrating an alternative method of preparing the edges of a wall panel at a joint.

Having described the alternative configurations for the adjoining elements, attention is now turned to FIGS. 38 through 39, where steps for assembling such joints are illustrated and described in more detail. For the joint illustrated in FIG. 36, the edge of the wall panel 101 must first be cut to the desired width along cut edge 434, allowing for the thickness of the perpendicular rib 410, and then a "dog-bone" shaped routing device 430 may be used to cut away any interior web or insulation that is in the region of the edge. Such a routing or trimming device may be mounted on a hand-held drill or similar piece of equipment (not shown) and would preferably be designed with guides and bushings (e.g., FIG. 39, bushing 440) so as to facilitate its controlled movement along the cut edge of the wall panel. The routing device 430 would rotate to cut away the ribbing, and thereby provide clearance for the flanges of the adjoining element 406 as illustrated in FIG. 36. One advantage of the dog-bone configuration is that the flanges may be employed in a non-bonded interface, to provide room for expansion of the wall panels, or their faces, within the groove defined by the interior (dog-bone shaped) and exterior flanges. It remains to be determined, however, whether it is possible to produce an expansion joint of this nature that allows for expansion yet provides adequate structural characteristics.

In a similar manner a routing tool 432 as depicted in FIG. 39 may be employed to rout or trim the rib and insulation from the end of a joint as depicted in FIG. 37. Again, tool 432 would include a bushing 440 for riding along the cut edge 430, and perhaps other guides or safety guards (not shown). The intention of tools 430 and 432 is to provide a ready-made configuration for receiving the internal flanges 412, 414 of the various adjoining elements 406. Accordingly, alternative sizes and shapes for the adjoining elements are intended to be included within the scope of the present invention.

Once the cut edge of the wall panel has been prepared, it is ready to receive the interior flanges 412, 414 in a position adjacent the faces 310 and 320. In one embodiment, the flanges and the adjoining element would be free-floating in relation to the wall panel sections so as to allow both sections room for thermal expansion is and contraction. In another embodiment, the flanges and the adjoining element could be permanently affixed to at least one wall panel edge (perhaps both edges, but may be only one edge in the case of an expansion joint). As illustrated, for example in FIG. 39, a glue, adhesive or welding solvent dispenser 450 is used to apply a bead or layer of adhesive 452 or other bonding means to at least the flange or cut edge of the wall panel. The adjoining element 406, and flanges 412 and 414, are then pressed into contact with the cut edge 430 of wall panel 110 to form a permanent bond therewith.

Figure 40:
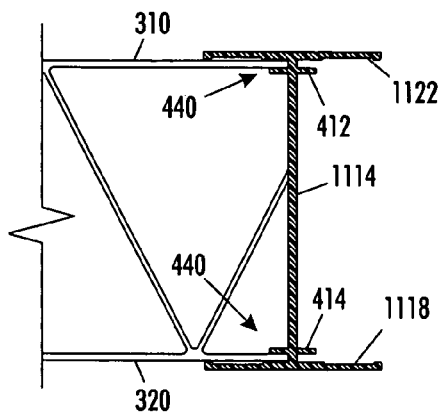
FIGS. 40 and 41 are illustrative cross-sectional views of vertical joints in accordance with aspects of the present invention
Figure 41:
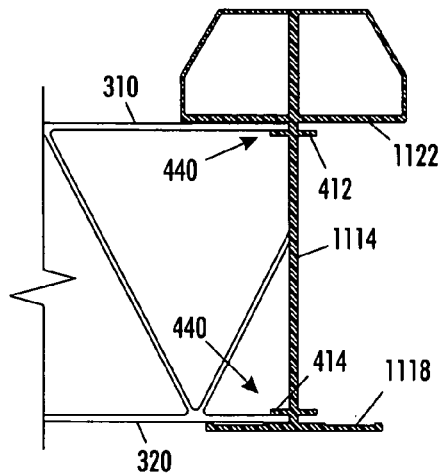

Applying the design of perpendicular rib 410, the 180-degree joints of FIGS. 34 and 35, would be redesigned to appear as indicated in FIGS. 40 and 41, respectively. More specifically, as illustrated in the figures, ribs 1114 would now add flanges 412 and 414 as described previously, to form a channel or groove 440 into which the faces 310 and 320 may be inserted and bonded.

Figure 42:
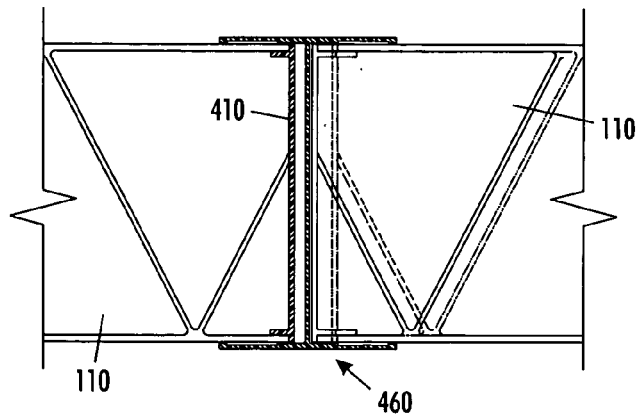
FIGS. 42–47 are cross-sectional views of wall panels illustrating alternative expansion joint embodiments that may be used in accordance with the present invention.
Figure 43:
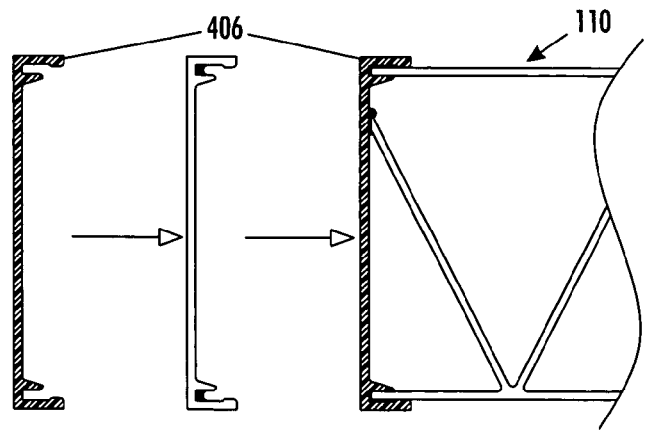
Figure 44:
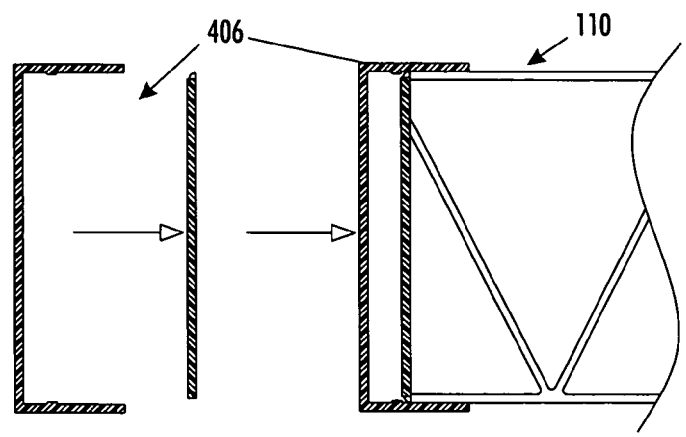
Figure 45:
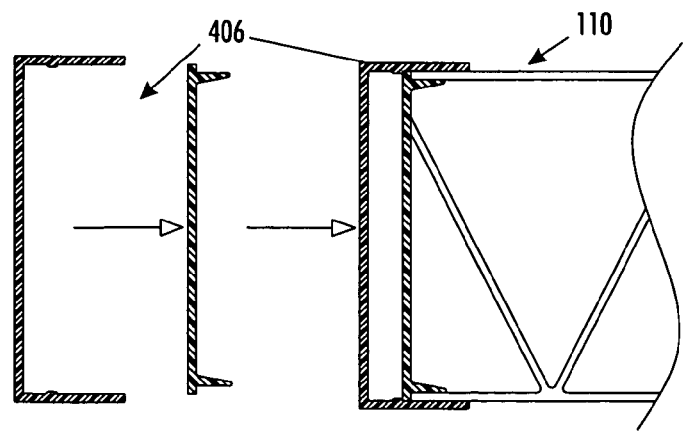
Figure 46:
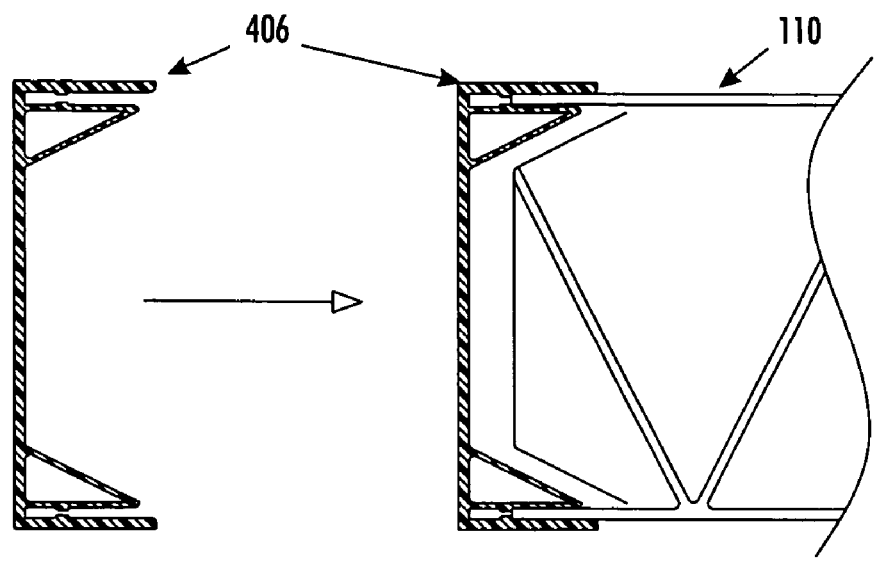
Figure 47:
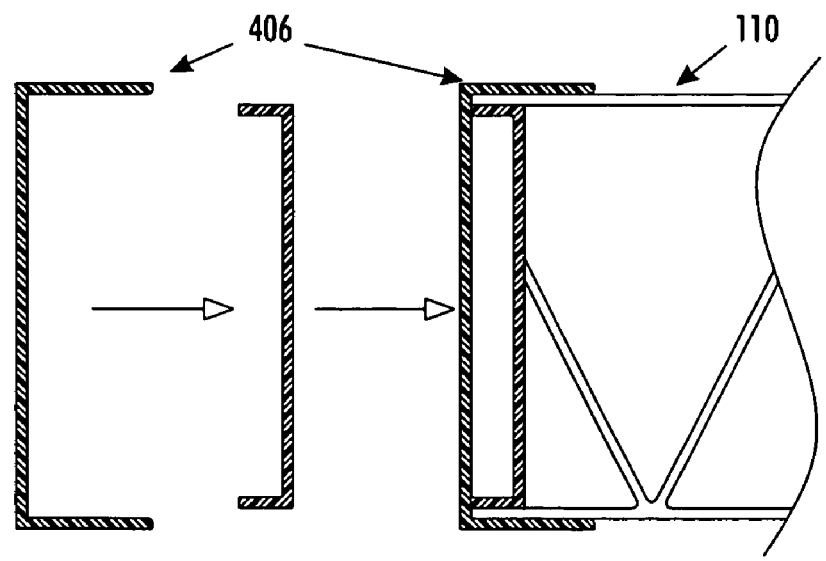

Turning next to FIGS. 42 through 47, depicted therein are various alternative embodiments of expansion joint configurations that may be employed with the present invention to provide a structurally sound joint suitable for eliminating problems due to thermal expansion of the wall panels along a large wall width. As illustrated in FIG. 42, the joint may consist of a plurality of perpendicular rib members 10, both of which are permanently affixed to the ends of wall panels 110. Subsequently, an I-shaped joint cover 460 is introduced to cover the joint and provide a seal against at least one of the wall panel ends. The connector or cover 460 does provide strength to the wall even though the internal rib carries the load. The connector provides an added margin of safety. In one embodiment, the cover 460 is permanently bonded to one wall panel section and simply slip fit over the other in order to provide room for thermal expansion and contraction of a wall constructed of the panels. Although not specifically illustrated, it may be possible to utilize a corner joint to provide expansion relief for longer walls. It is also contemplated that the expansion joins may include seals, membranes or gap filling materials such as closed-cell foam to fill the expansion gaps. Use of such fillers will prevent the migration of water or debris into and through the expansion joint.

As illustrated in FIGS. 43 through 47, various alternative flange and rib designs, both one- and two-part, may be employed to produce an end for a butt-type or expansion-type joint. The adjoining element 406 may be permanently affixed to the wall panel 110 using one or more bonding methods described previously. It will be appreciated, again, that the bonding means may be determined based upon the type of material and the configuration of the adjoining element. For example, it may be possible to utilize sprayed or rolled-on adhesive to pre-treat those portions of the adjoining elements that are to be permanently affixed to one another or to wall panels in order to improve the ease of assembly (e.g., insert an adhesive layer in a groove between flanges such as in FIG. 43).

Figure 48:
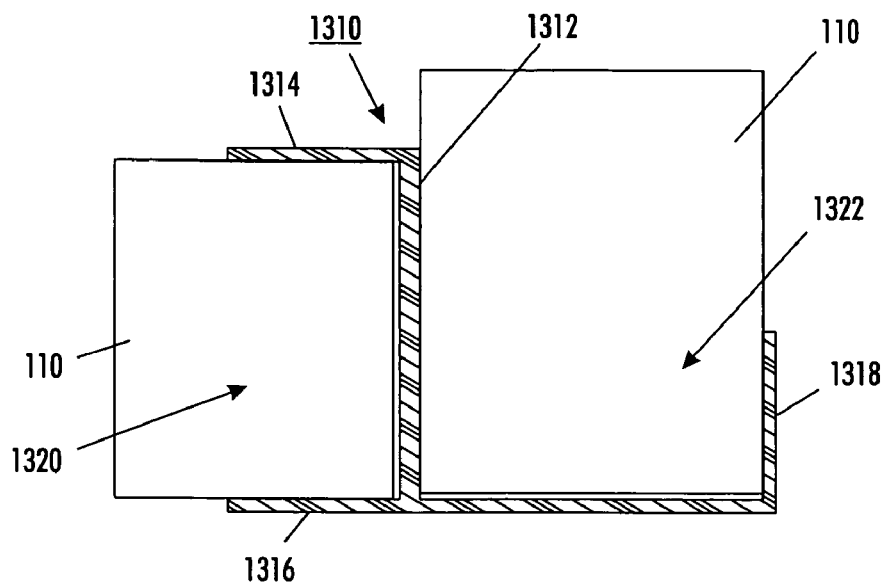
FIGS. 48–55, 96, 97 and 98 are cross-sectional illustrations of various adjoining elements such as angled corners that may be employed as aspects of the present invention to complete a foundation as depicted in FIG. 2.
Figure 49:
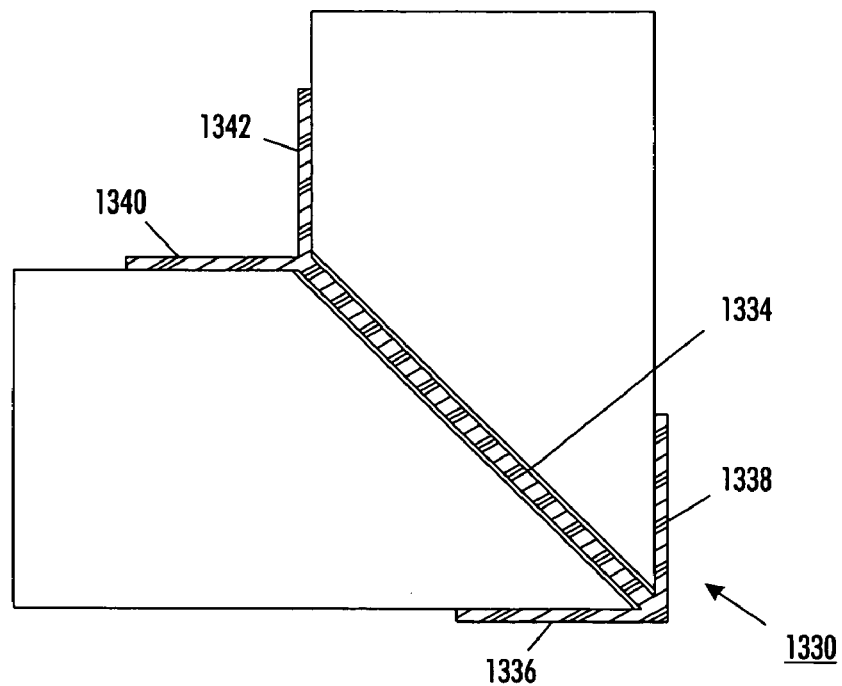
Figure 52:
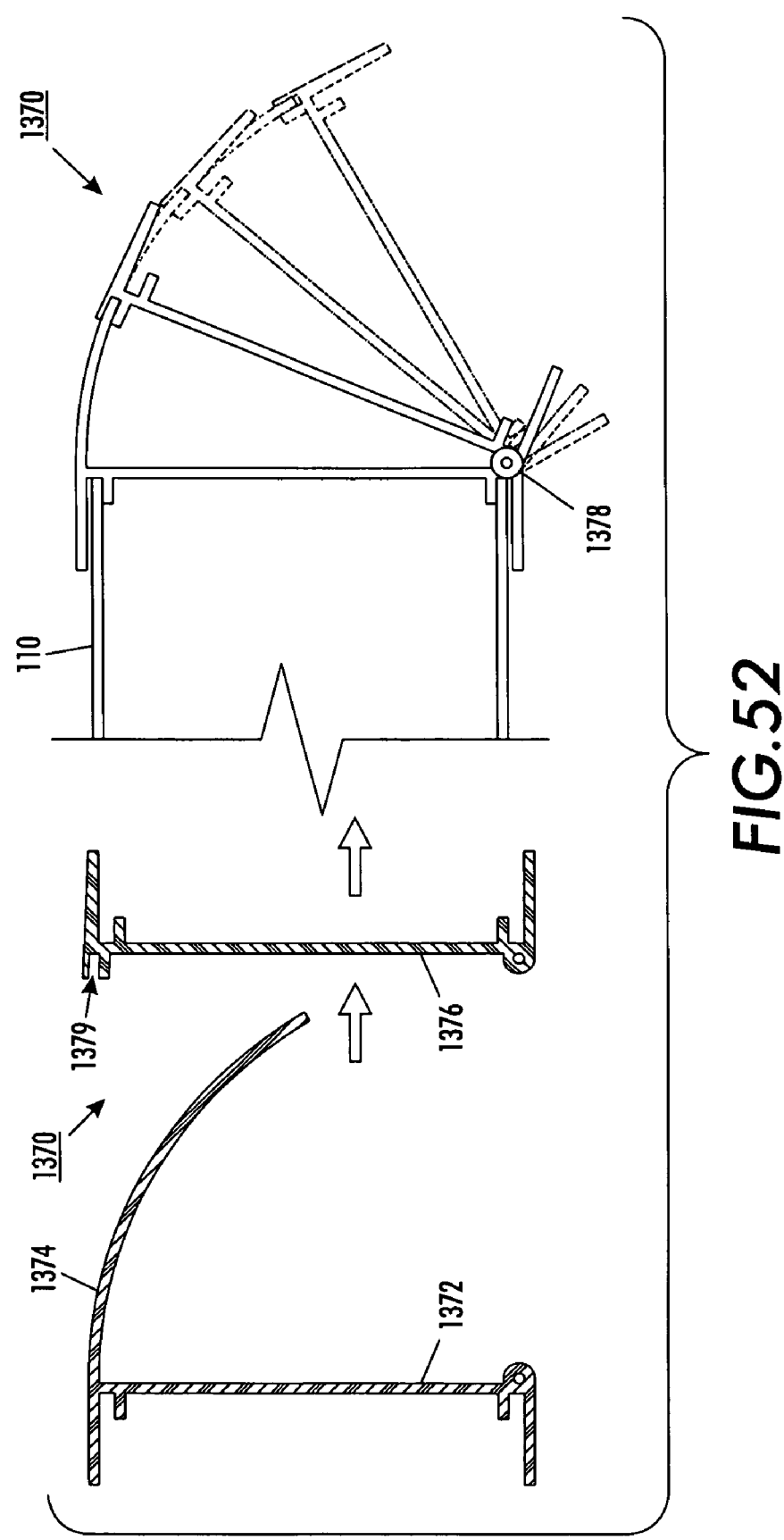
Figure 53:
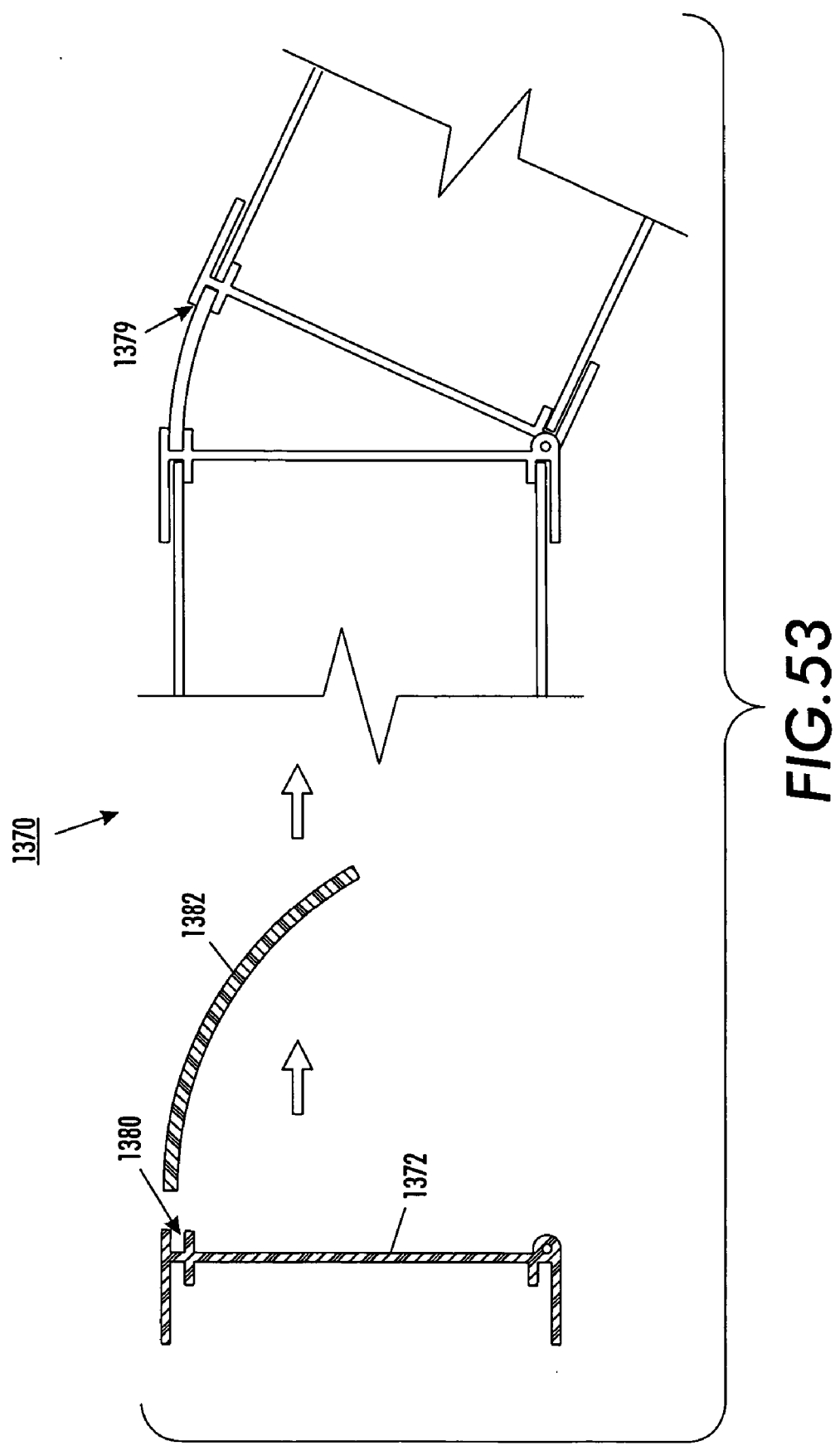
Figure 54:
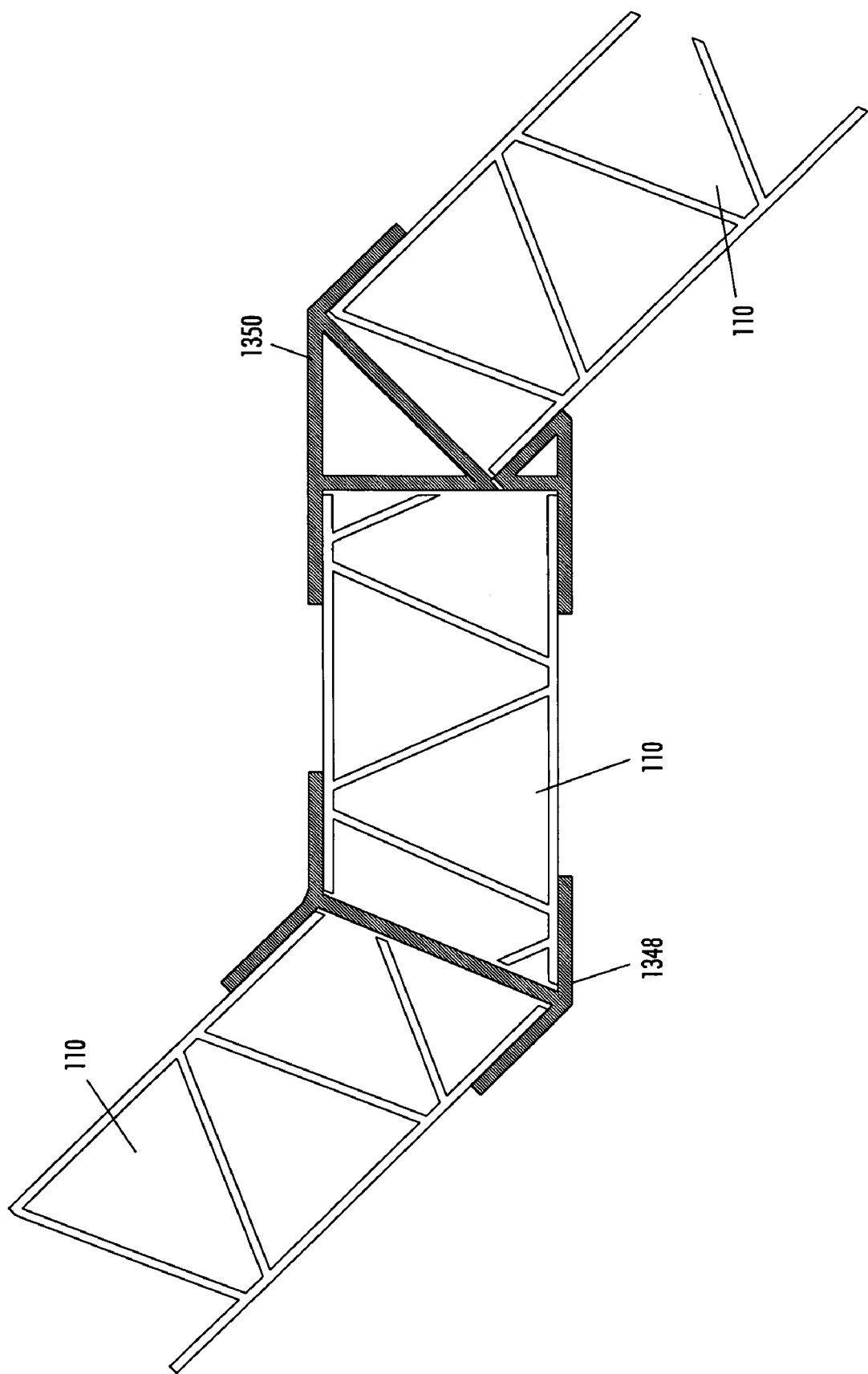

Another vertical component or adjoining element is the corner member. FIGS. 48 through 51 illustrate various alternative configurations for the corners, including pre-defined angles. FIGS. 52 and 53 illustrate an embodiment of an adjustable-angle corner, and FIG. 54 illustrates an additional element that may be employed with corners or similar adjoining elements. Referring to FIGS. 48 and 49, there are shown cross-sections for two alternative designs to provide 90-degree corner joints for the foundation walls. Although depicted in a simplified form, it will be appreciated that the various corner joints preferably employ internal flanges, such as those described above (e.g., flanges 412 and 414) with respect to FIG. 40 of FIG. 38, to improve the strength and contact with wall faces 310 and 320. In the first design, an L-shaped corner member 1310 is comprised of a back web 1312 connected at one end to a flange 1314 and at another end to a bottom face 1316. One end of the bottom face provides an outside flange opposite flange 1314, and the opposite end of the face has a second outside flange 1318 extending at a right 10 angle therefrom. As illustrated, the various components in combination result in two flanged recesses 1320 and 1322 that are oriented at a perpendicular angle relative to one another—where they receive the wall panels and maintain them in a right-angle corner. The length of the flanges along any particular wall section may be varied according to design and wall thickness, but is likely to be in the range of 2.5 cm to about 11.5 cm, or at least extending to the point on the face plate where a rib intersects the face plate.

FIG. 49, depicts an alternative structure for achieving a similar right-angled corner, does so using wall panels that are configured with mitered, 45-degree ends. As illustrated in cross-section, joint 1330 includes a central web 1334 that has a plurality of flanges 1336, 1338, 1340 and 1342 extending therefrom. For the right-angled corner, the flanges all extend at equal, 45-degree angles from the central web 1334, and are of a length of about 7.6 cm (approximately one-half the wall panel thickness) or as otherwise suitable or desired to receive the wall panel and provide for joining of the wall panel to the corner joint member. Again, a preferred embodiment may include shorter interior flanges (not shown) to contact the inside of the wall panel faces as previously described with respect to the joint of FIG. 43.

Figure 98:
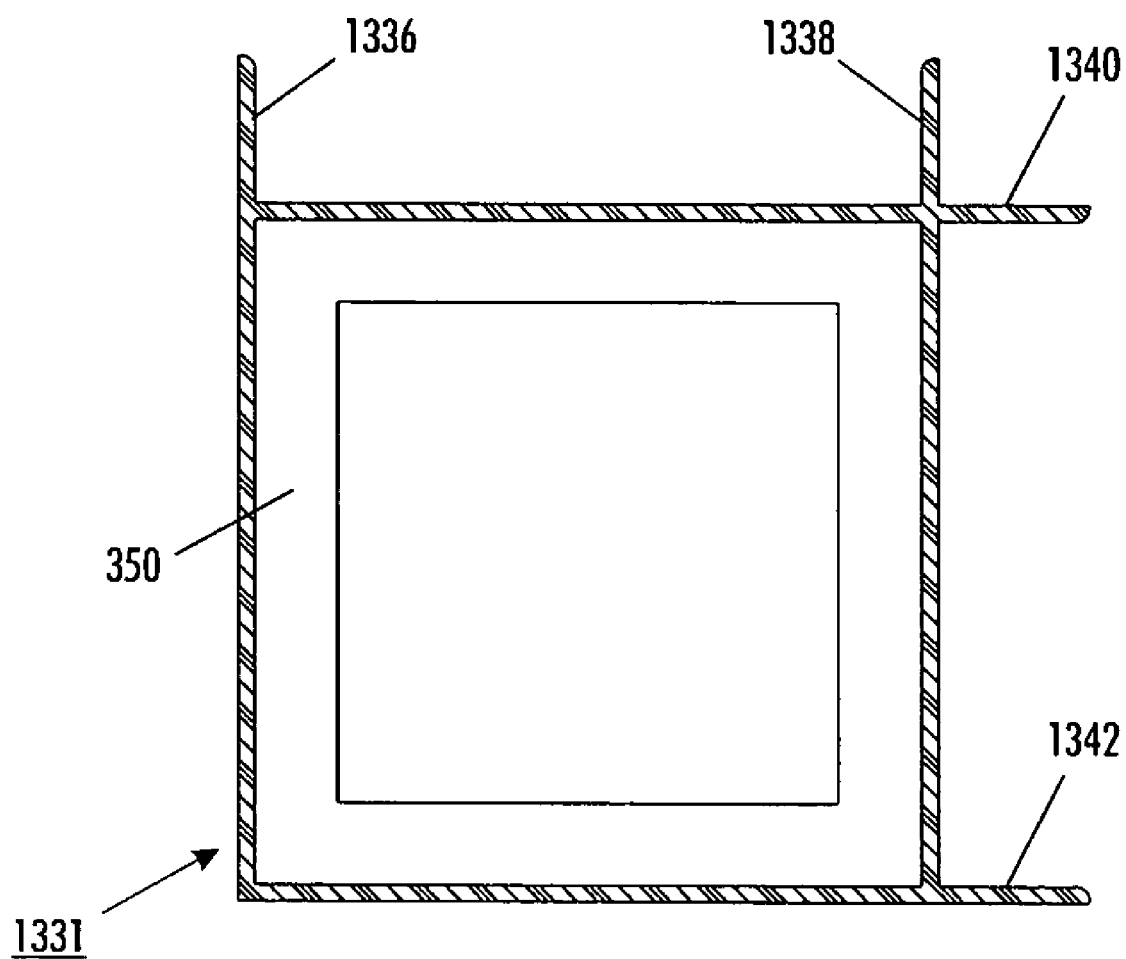

As yet another alternative, FIG. 98 illustrates a right-angle corner 1331 that may be used to join two square-ended wall panels, particularly where an expansion gap is desired at the end of the wall. Again, flanges 1336, 1338, 1340 and 1342 are employed to contact the faces of each of the wall panel sections being joined at the corner. As illustrated, insulation 350 may fill all or a portion of the hollow region within the corner. Furthermore, it will be appreciated that the interior and/or exterior exposed portions of the corner joints (e.g., interior flanges, exterior surface) or other adjoining elements may look like corner posts, and could also be manufactured with a texture, profile, or color that enhances such an appearance. For example, the interior flanges on the corners, expansion joints, top plates, etc. could be made with a surface "grain" and the entire element may be produced using a colorant to simulate a wood surface.

Figure 50:
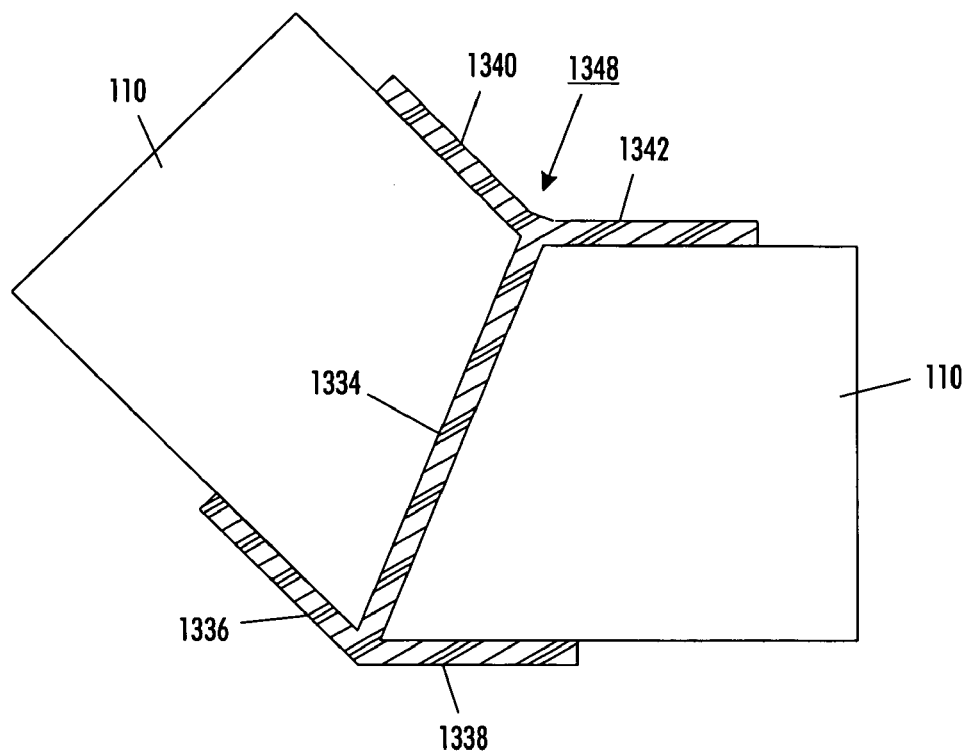
Figure 51:
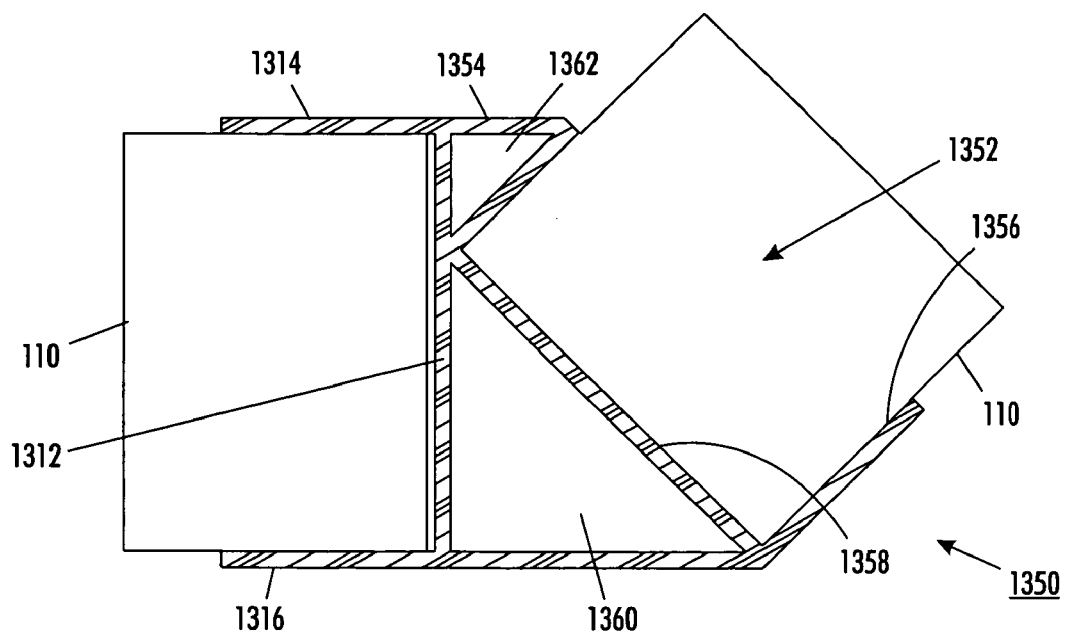
Figure 55:
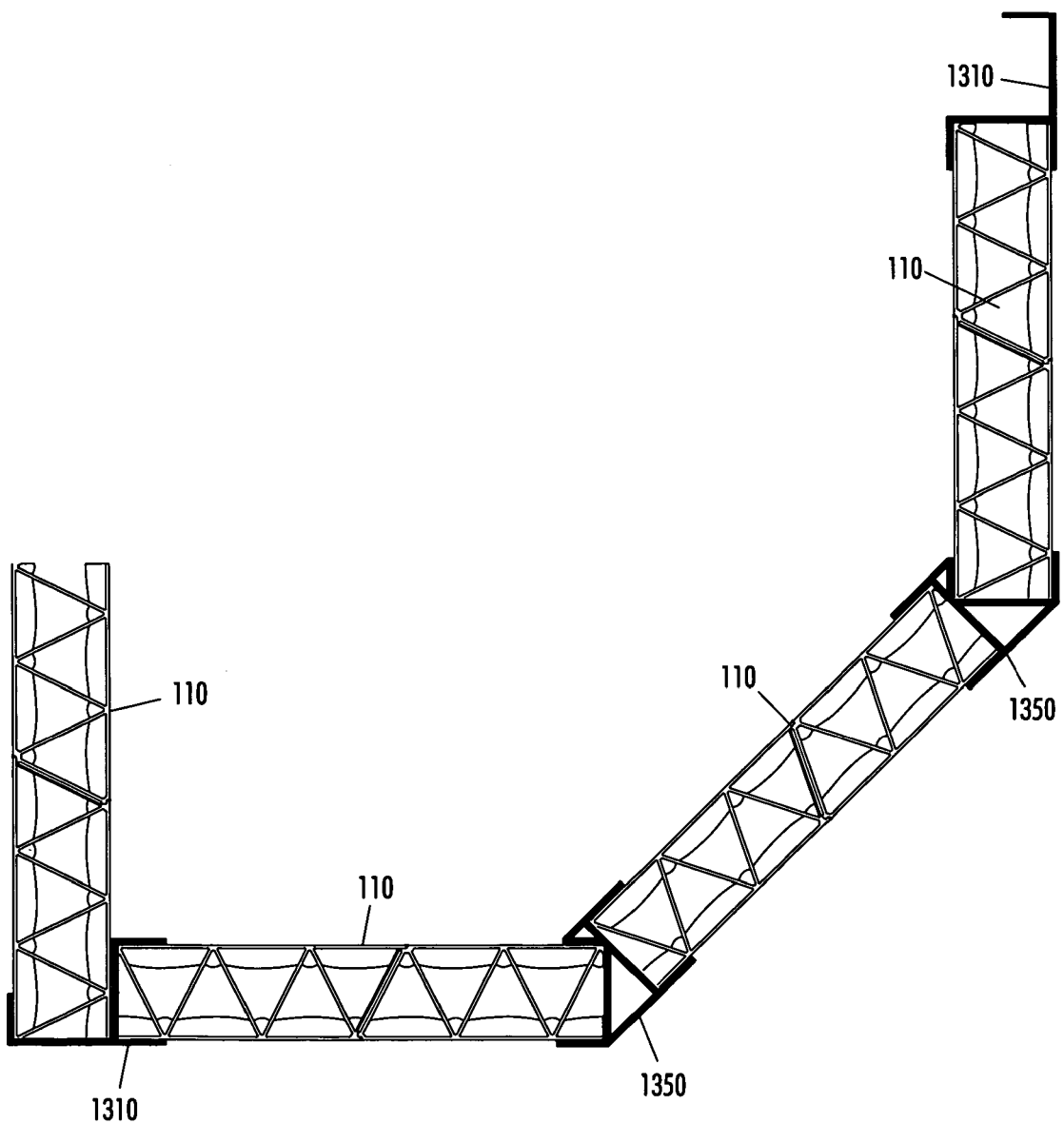
Figure 96:
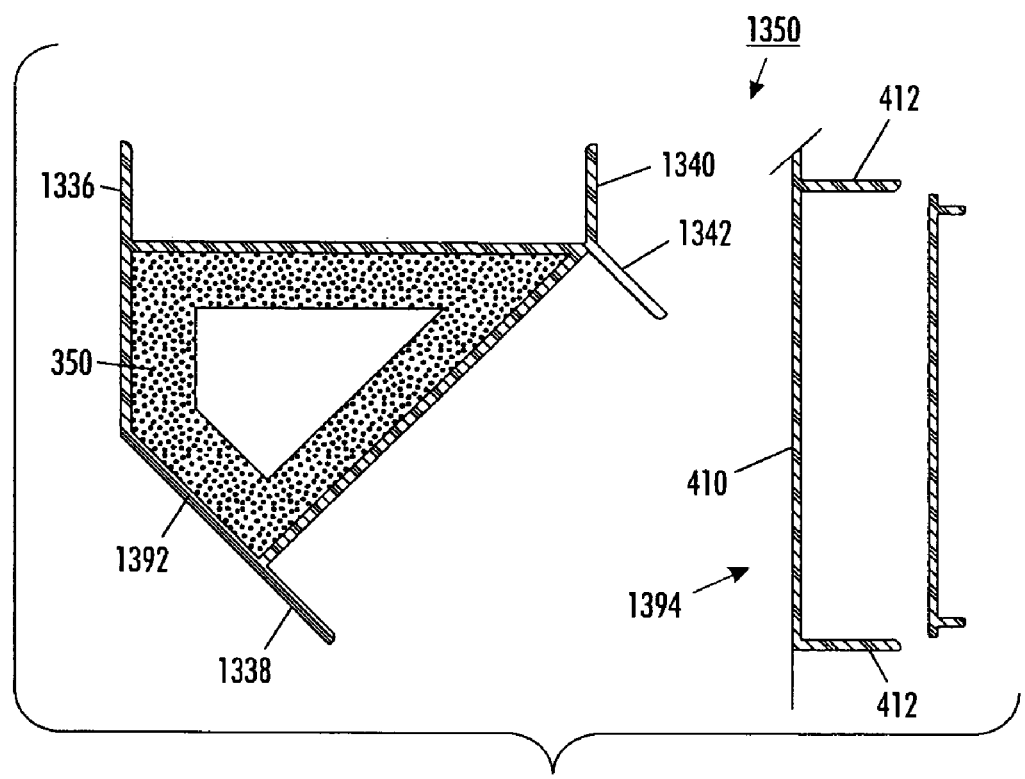

FIGS. 50 and 51 are exemplary cross-sections of corner joints 1348 and 1350 that enable the foundation to be used to produce other corner angles, such as 45-degree angles. As in the prior figures, the joints are designed to provide a corner member that may be used with mitered or square-ended wall panels, respectively. Although the web and flange design for the joint of FIG. 50 is similar to the corner joint of FIG. 49, the design in FIG. 51 is substantially modified for the square-ended wall panels. In order to provide an angled corner joint for square-ended wall panel sections, the joint must provide for two sets of flanges to receive the wall ends. Accordingly, while joint 1350 includes elements similar to joint 1310, it also includes an extended inner flange 1354, and angled outer flange 1356 and a back 1358, the combination of which forms recess 1352. Also created as a result are hollow channels 1360 and 1362, which may have insulating foam inserted therein to improve the thermal performance of the corner joint. As illustrated in FIGS. 2, 54 and 55, the various corner joints, in combination with wall panel sections 110, may be used to produce foundation walls of varying shapes and dimensions. In yet a further alternative design for a 45-degree corner, FIG. 96 illustrates a corner joint 1350, wherein the 45-degree corner has reinforced outer walls 1392, insulation 350 and flanges 1336, 1338, 1340 and 1342. Although used and installed in essentially the same manner as described relative to the other joint, preferably in conjunction with a spanning web 1394, it will be appreciated that corner 1350 accomplishes a 45-degree corner without the need for mitered ends on the wall panels.

In the corner adjoining elements depicted in FIGS. 48 and 51, the profile of these corners is not only intended to provide the necessary structural support for the wall panel edges at a corner, but is also intended to provide a more compact shipping profile. More specifically, if the corners are pre-assembled to at least the end of one wall prior to shipping, the corners of FIGS. 48 and 51 will take up less space when being shipped and eliminate a requirement for protecting flanges extending beyond the face of a wall segment.

Figure 97:
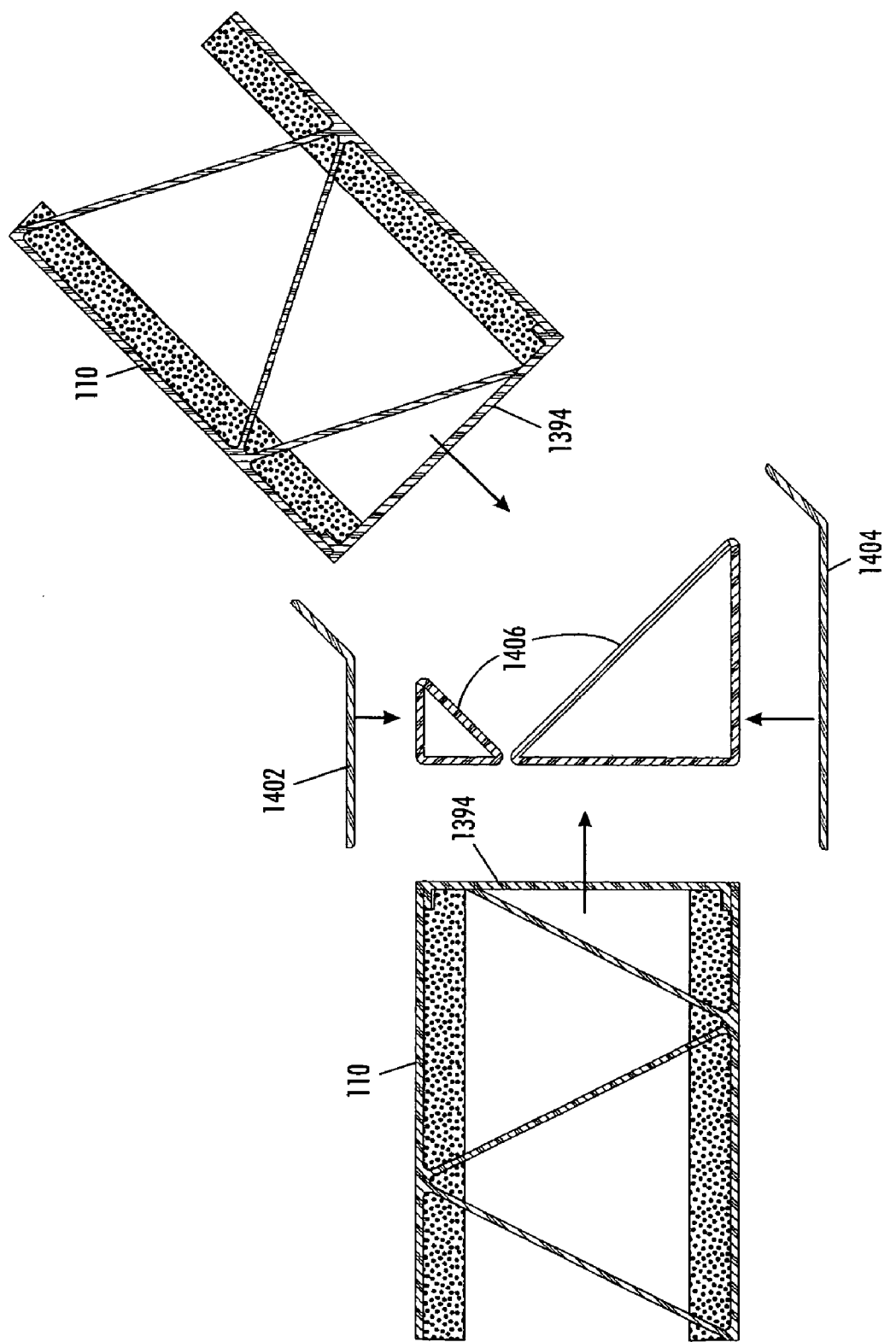

Referring also to FIG. 97, is yet another alternative design for a corner joint. Although illustrated as a 45-degree corner, the elements of this corner may be applied to various angles from near zero to 180-degree. In this embodiment, corner joint 1400 includes an inside flange piece 1402, and outside flange piece 1404, and at least one interior spacer 1406, which may be triangular in shape. In assembling alternative 45-degree corner depicted, the wall panels are first prepared as described previously to receive a spanning member 1394 that is permanently affixed to the adjacent ends of the respective wall panels to provide support to the faces of the panel. Subsequently, spacers 1406 are inserted between the walls and preferably bonded to one or both of the wall pane ends with a bonding agent or alternative means of attachment. The use of the spacers will provide permanent surfaces, to which the panels may be attached, thereby improving the joint's resistance to movement, shear, etc. In order to finish the joint, inside and outside flange pieces, 1402 and 1404, respectively, are permanently bonded to the faces of the panels. These pieces serve not only to reinforce the joint, but also to render the joint impervious to water or debris and to cover any gaps that may be present in the joint. It will be appreciated that the interior and exterior flange pieces may be made from standard sheet goods, or may be extruded to cover standard corner angles or wall thicknesses.

Turning to FIGS. 52 and 53, depicted therein are adjustable corner joints 1370. In the first embodiment depicted in FIG. 52, corner joint 1370 includes a wall panel edge member 1372 having an expansion tab 1374 extending therefrom, and an adjustable edge member 1376. The members 1372 and 1376 are preferably connected about a pivot hinge 1378, where the two members may pivot about the hinge and relative to one another in order to produce a non-standard wall angle. Before assembly, the length by which tab 1374 extends from panel edge member 1372 is cut to produce the desired angle. It will be appreciated that the tab may have markings, scoring or similar indicia thereon to indicate approximate angles resulting from defined tab widths. Once cut to the desired width, the members are assembled to the edges of the adjacent panels and are then connected at pivot joint 1378 before the cut end of tab 1374 is bonded or glued to the receiving groove 1379 on member 1376. Similarly, the design depicted in FIG. 53 includes 1o members 1372 and 1376. However, in the alternative design, tab 1374 is replaced by a groove 1380 and a separate tab 1382. As will be appreciated, the separate tab may be cut along either edge and may be employed to provide corners of varying angles, from nearly zero to almost 360-degrees.

Figure 56:
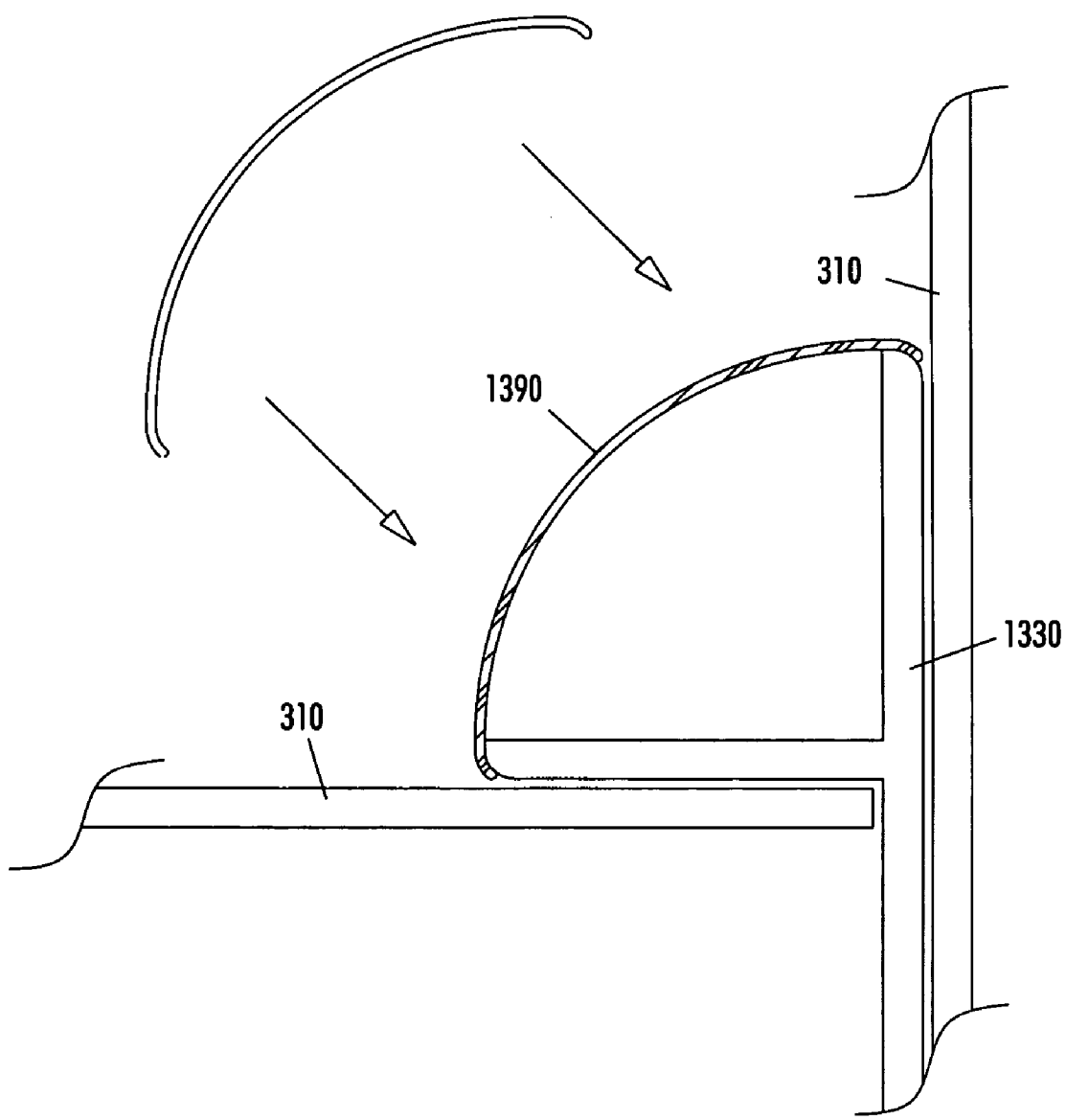
FIG. 56 is an expanded view of the angled corner of FIG. 49, showing an additional element that may be employed.

Turning to FIG. 56, which illustrates one embodiment of a corner cover that may be used with one of the corner joints illustrated in FIGS. 48 or 50. More specifically, cover 1390 is adapted to clip onto the flanges of joint 1330. Once attached, the cover may be used to conceal wiring, plumbing or similar items that are run adjacent to the corner.

Figure 57:
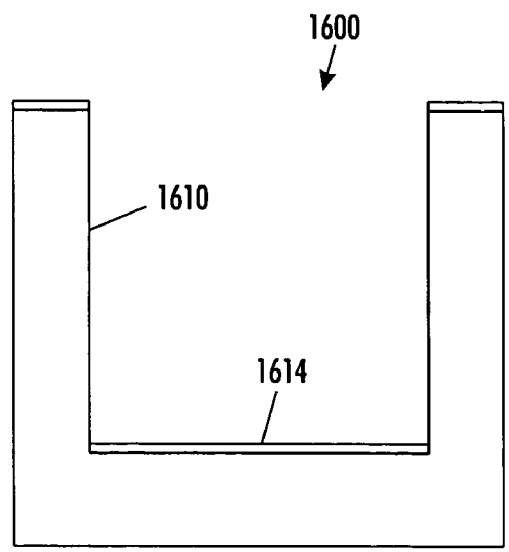
FIGS. 57–63 are illustrations of various alternative embodiments of beam pockets that may be used in association with the wall panels to produce supports for a beam as represented in the foundation of FIG. 2.
Figure 58:
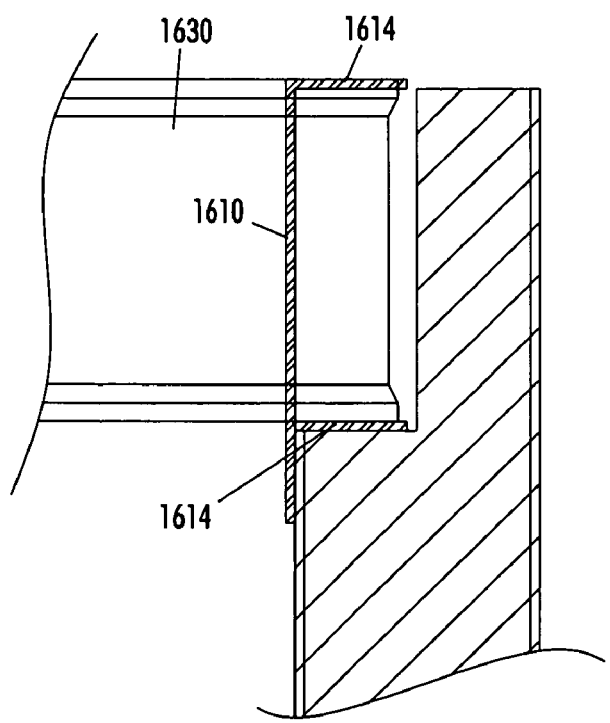

Additional elements depicted in FIGS. 57 and 58 may be used to add additional features to the foundation wall structure depicted. More specifically, FIGS. 57 and 58 illustrate the front and cross-sectional views of a beam pocket 1600 having a web member 1610 and a pair of flanges 1614 extending therefrom. When installed in the wall, the pocket 1600 would receive an I-beam or similar structural member intended to be supported by the wall panel. It is contemplated that the beam pocket may be made of a steel or similar high-strength metal or polymeric material. It will be further appreciated that the dimensions, particularly the width of the pocket may be greater than the width of the beam inserted therein, so as to spread the load over a larger region of the foundation wall panel. To install the beam pocket 1600, the wall panel would be routed out to create at least a partial void and this beam pocket would be attached to the surface. In an alternative embodiment, the pocket may be a face-mounting system that merely stabilizes the position of the beam relative to the wall, wherein the vertical load of the beam is carried by a column member or an adjustable jack post with a cover. For example, as illustrated in FIG. 2, a column member 130 may be employed to support the load by itself, or in conjunction with the wall panel 110.

Figure 59:
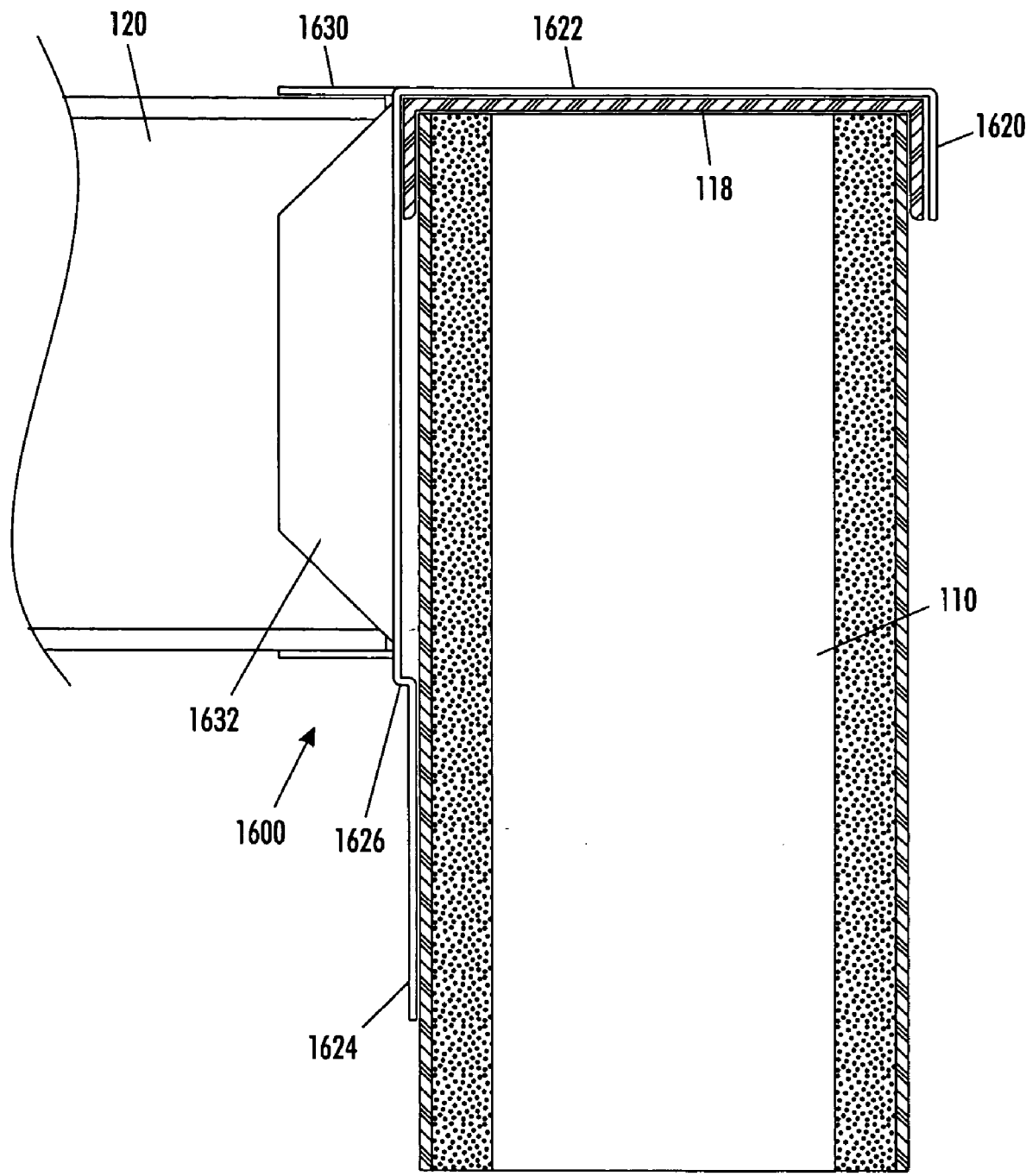
Figure 60:
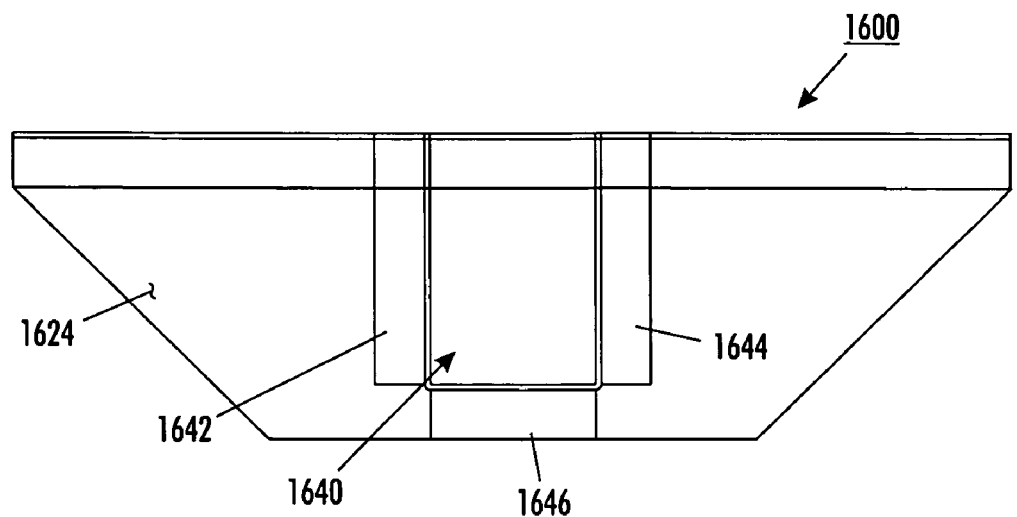

FIGS. 59 through 63 depict alternative embodiments for a beam pocket 1600. In particular, the beam pocket is designed to be face-mounted, but provides an overhanging support structure. Intended to be prepared from a single sheet of steel or similar material, the pocket employs an inverted J-shaped design having an outer tab 1620, a top 1622, a face contact portion 1624 and an extended region 1626. As seen, outer tab 1620 and top 1622 are designed to contact the top sill 118 on panel 110, thereby providing support for the beam pocket. Face contact region 1624 is intended to provide a surface by which the beam pocket 1600 can be glued or affixed to the wall panel. It will also be noted that extended region 1626 is designed to provide clearance around the interior flange of the top sill piece, enabling contact with the face. In an alternative embodiment, it may be possible for the top and tab 1620 to be used in place of the sill for the width of the beam pocket 1600. Although not illustrated, the beam pocket defined an aperture in which beams 120 may be placed. The aperture is defined by top flange 1630, side flanges 1632, and bottom flange 1634, which may be cut and bent from the sheet structure comprising the beam pocket. It will be appreciated that the beam pocket 1600 is somewhat wider in overall width than the beam being supported, as depicted in FIGS. 57 and 60, so as to spread the load of the beam over a larger region of the wall panel.

Figure 61:
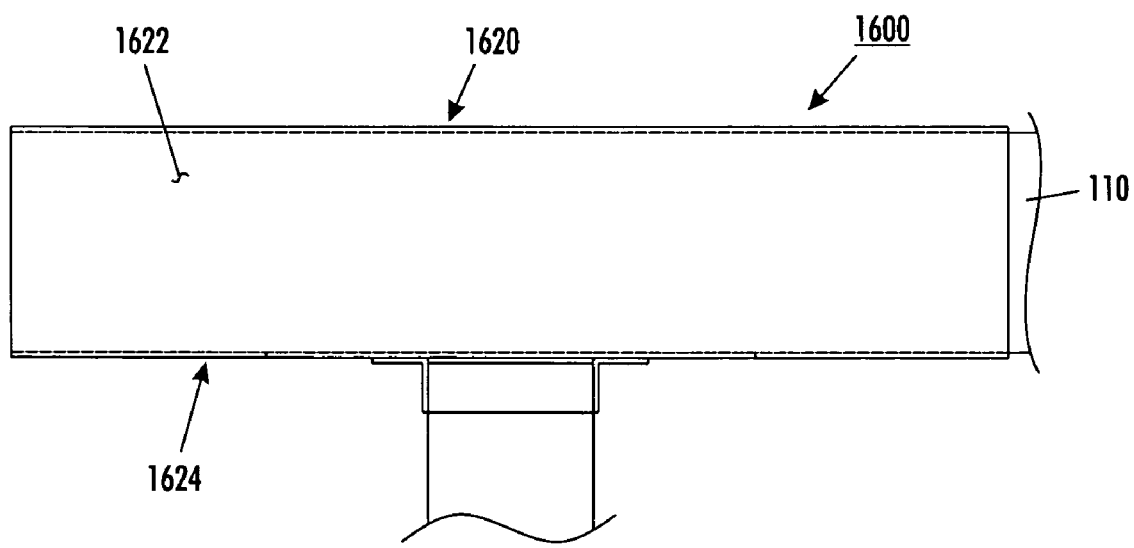

Turning to FIGS. 60 and 61, there is depicted an alternative face-mounted design. Beam pocket 1600 is again intended to support beam 120. However, in this design, the generally J-shaped structure has a pocket member 1640 attached thereto. Pocket member 1640 has left flange 1642, right flange 1644 and bottom flange 1646, each of which is designed for permanent attachment to face contact region 1624. In this particular design, the beam pocket 1600 is intended to be used in place of a top sill to fit atop wall panel 110. In one embodiment of this design, beam support flanges 1642, 1644 and 1646 may be standard angle iron and the remainder of the beam pocket may be formed using sheet steel that is bent to the desired configuration.

Figure 62:
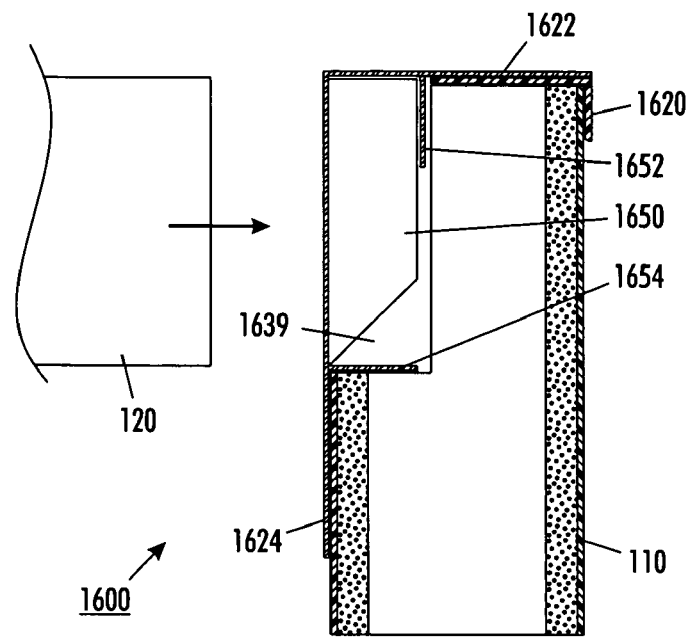

In a further alternative design, depicted in FIG. 62, beam pocket 1600 is a recessed pocket design that is similar in its manufacture to the design of FIG. 59, except that the pocket is recessed and not face-mounted. More specifically, the pocket is formed by cutting a recess 1639 into the face of wall panel 110 adjacent the top. Then the recess is reinforced by installing the beam pocket member 1600, where side flanges 1650, top flange 1652 and bottom flange 1654 come into contact with the cut surfaces of the wall panel to provide reinforcement for support of the beam 120 inserted therein.

Figure 63:
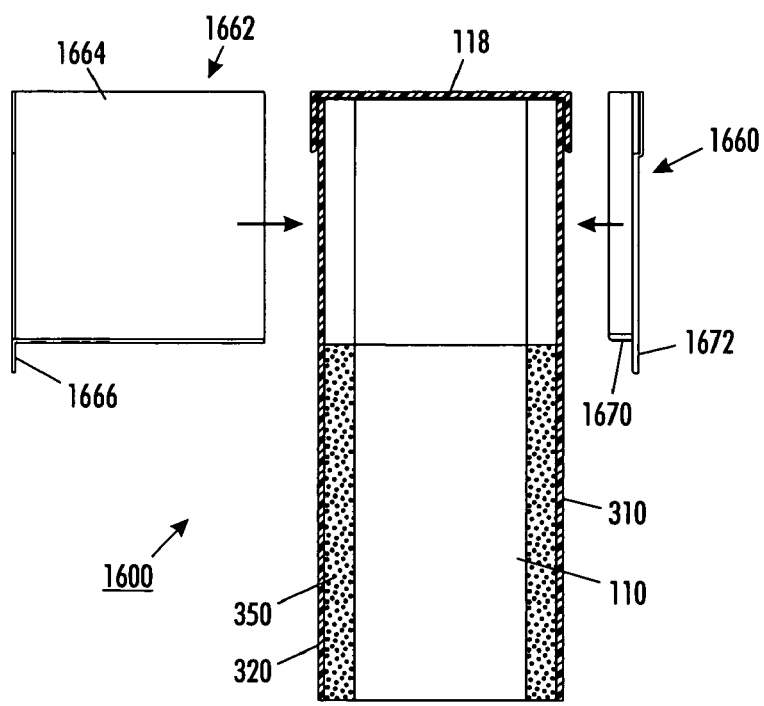

Yet another beam pocket 1600 is illustrated in FIG. 63, where a cut-through pocket is illustrated. The cut-through pocket is intended to allow for easy installation of a beam pocket where the installer simply has to cut a U-shaped recess completely through the wall panel 110. After cutting the recess, the two-part pocket is installed by inserting the outer support 1660 and the inner finishing face 1662 as illustrated by the arrows. In one embodiment, the inner support 1662 may be installed first and the outer support acts primarily as a cover. Inner support 1662 includes a C-shaped or box-shaped member 1664 that extends the thickness of wall panel 110. In addition, the member includes at least bottom flange 1666, and preferably side flanges on the outer end thereof, providing surfaces by which the member may be attached to the face 320 of the wall panel. Finishing face 1662 includes a similar design, but only extends into the recess slightly to "finish" the interior side of the beam pocket 1600. Here again, the finishing face includes not only a box-shaped frame 1670, but also a continuous flange 1672 extending outward from the frame and parallel to the inner panel face 310. Flange 1672 is provided as a surface by which the inner finishing face may be mounted to the wall panel and to reinforce the corners of the cut-out recess. In the embodiment depicted, once the beam pocket is installed, the wall may be finished by installation of the top plate 118. As will be appreciated, aspects of the beam pocket may be made using an injection molded PVC steel sheet with angle iron. Since the beam usually sits flush with the top of the foundation wall it may not be necessary to put the top plate or header into place.

Although not shown, it is further contemplated that support columns may be inserted within the hollow region of a wall panel prior to the installation of channel 1662. The columns would extend downward to the footer. Such columns would need to be inserted into the panel through the cutout and therefore the size and shape become critical. Currently, two designs are contemplated for these columns. The first uses a series of plates that are inserted into the wall and rotated into position, and the second uses trapezoidal shaped tubes that are approximately half of the hollow area 326. The trapezoid appears to be a preferred design since at least two should be able to be slid into the wall panel through the opening. Even though these tubes would not lie symmetrically under the beam pocket they would provide the support to the beam and reduce the load directly on the wall at the beam pocket.

As will be appreciated, the recessed beam pocket designs described above may be modified to incorporate the web reinforcing features previously described with respect to FIGS. 36 and 37, although not required as the beam and beam pocket do not present loading characteristics that would require such reinforcement.

Figure 64:
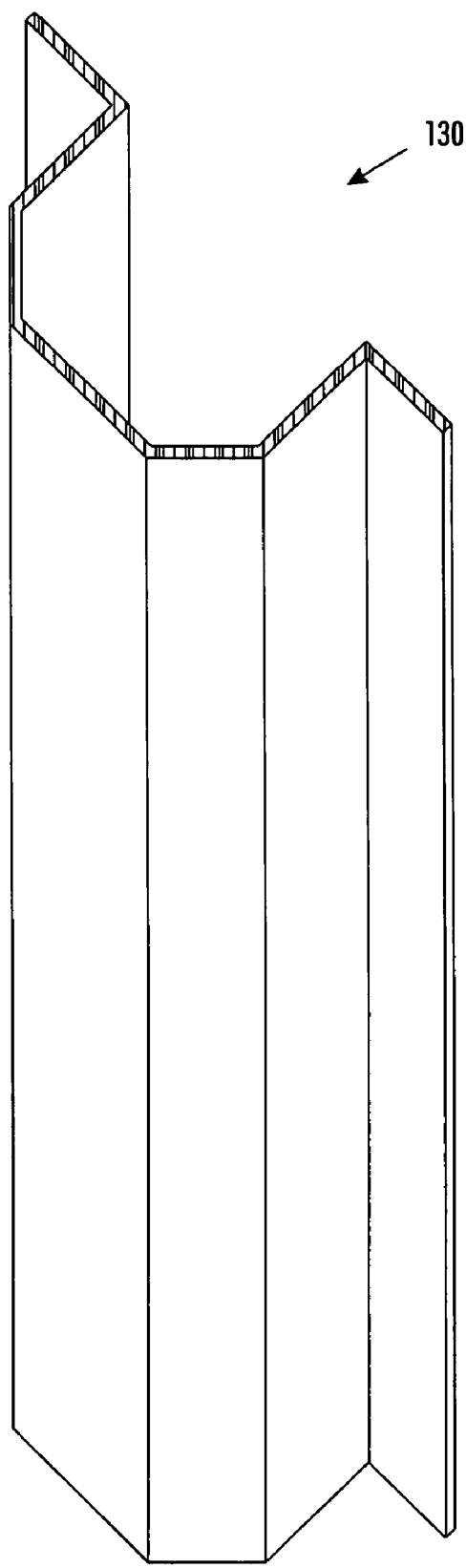
FIGS. 64–66 are perspective views of alternative column support components that may be used in accordance with an aspect of the present invention.
Figure 65:
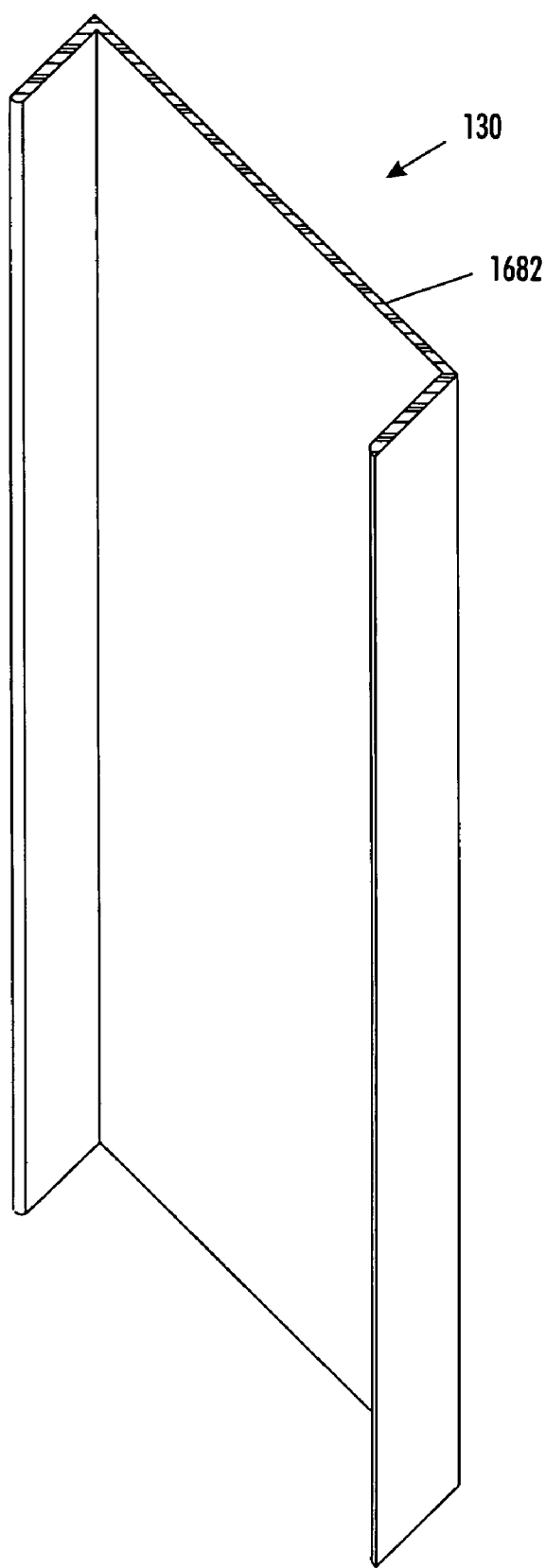
Figure 66:
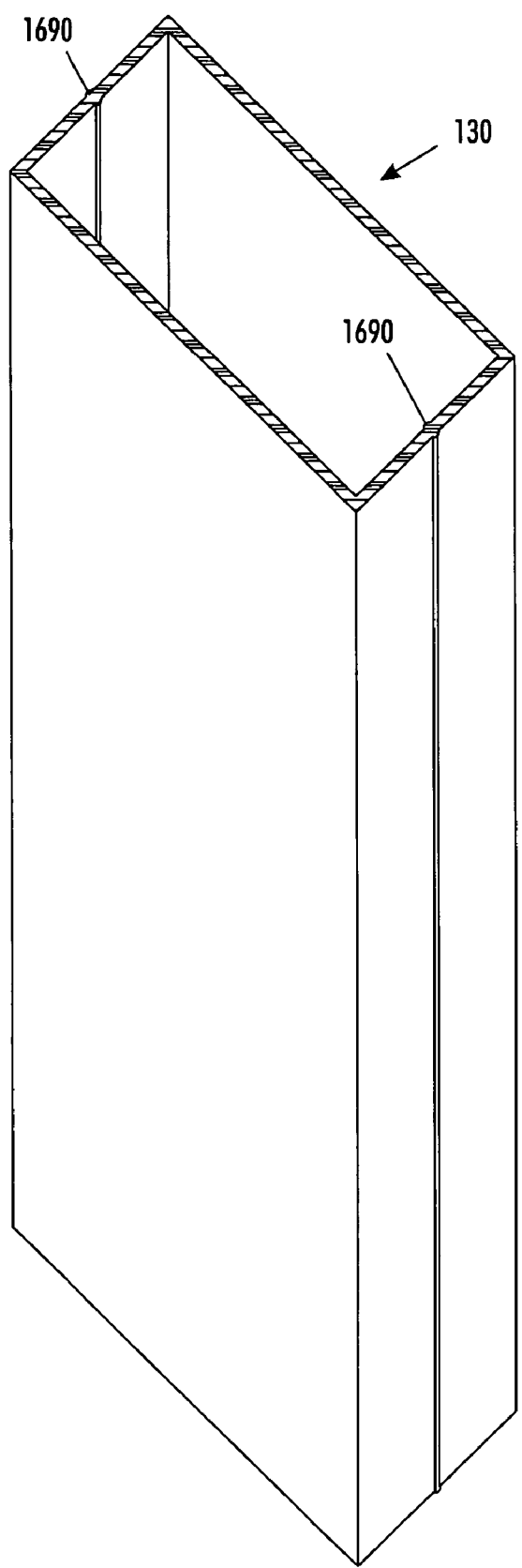

Although it is possible to provide support to the beam 120 using the various beam pocket designs described, it may also be preferable to provide additional support on the ends of the beam adjacent the wall. This would be similar to conventional construction where pilasters or columns are employed to provide additional support. FIGS. 64–66 illustrate, in perspective views, various alternative designs for the shape of extruded support members that may be used to provide such support. It is intended that such members may span the vertical distance between a reinforced floor and the bottom of a beam 120 or the bottom flange of a face-mounted beam pocket (e.g., FIG. 59). In FIG. 64, support member 130 comprises an extruded, member having a C-shaped cross section, with gluing flanges 1680 extending outward from the longitudinal edges thereof. In use, the member 130 would be cut to length prior to be installed against the wall panel interior face (310 as in FIG. 2). It may be preferable to glue or bond flat plates (not shown) at each end of the support member to provide a larger bearing surface and to enclose the ends. As illustrated in FIG. 65, the cross section of member 130 may be in the shape of a rectangular channel, in which the back of the channel, 1682 may be glued to the wall panel face. Alternatively, as illustrated in FIG. 66, a rectangular tube may be extruded, or constructed by gluing or bonding a pair of rectangular channels (bonding seam 1690), and used as a support member. It will also be appreciated that various alternative cross-sectional shapes may be employed for the support members 130, and that stand-alone support members may also be used (e.g., FIG. 66). Moreover, the various shapes depicted in FIGS. 64 through 66 may be used as pilaster-like reinforcements, as "covers," runs of ducts for plumbing, wiring or other mechanical systems that may need to be run along a surface of the wall. As illustrated by FIG. 65, the extrusion for one column cross-section may be the same as the header or top plate—with the intention that use common component profiles will decrease the cost of the components.

Figure 67:
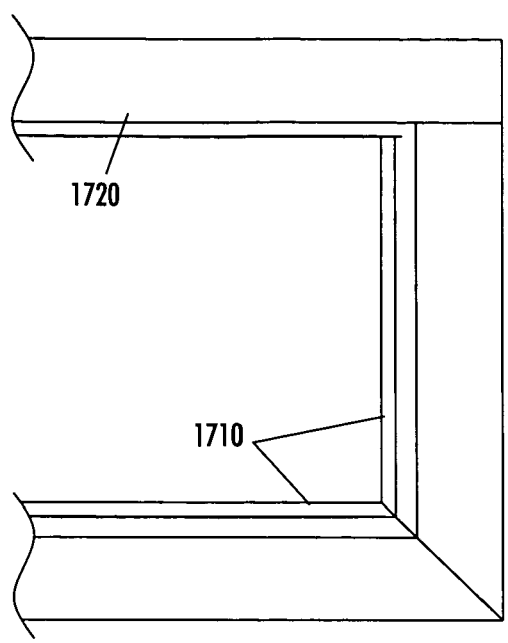
FIGS. 67 and 68 are, respectively, front and cross-sectional views of a window structure in accordance with aspects of the present invention.
Figure 68:
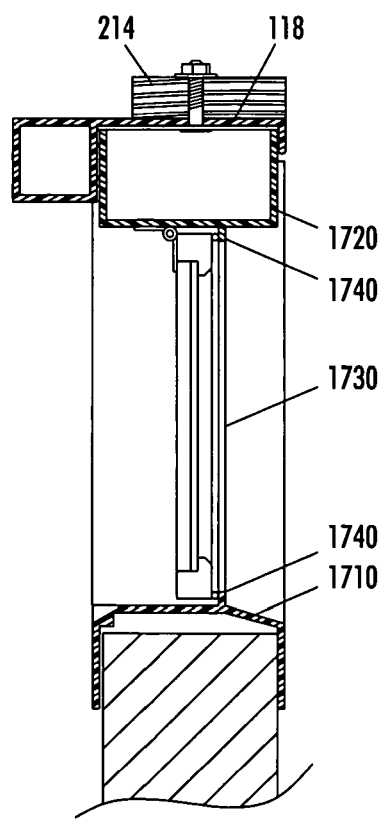
Figure 69:
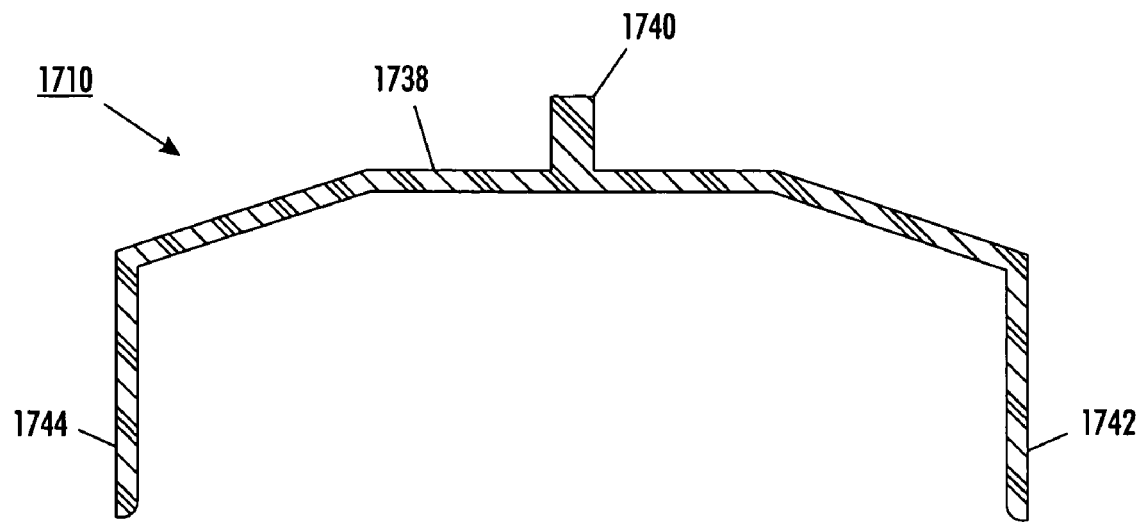
FIGS. 69–73 are illustrations of several alternative embodiments for window and door framing components to be used for the installation of windows and doors in the wall panels of FIGS. 1 and 2.
Figure 70:
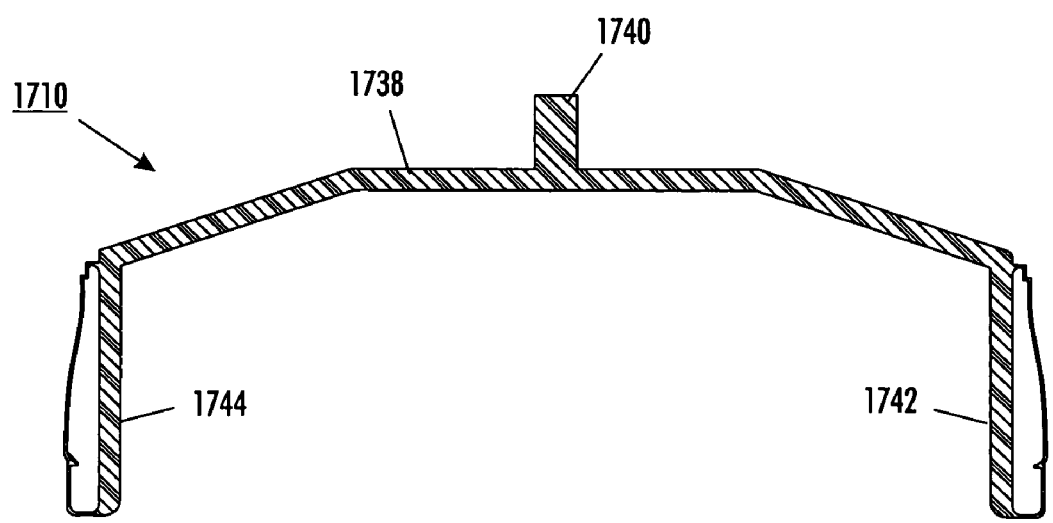

Turning to FIGS. 67 and 68, shown therein are front and cross-sectional views of a window structure, having sill and side members 1710 and header 1720. As illustrated by the cross-sectional view of FIG. 68, both pieces may be extruded for window 1730 and door (not shown) openings. This extrusion is mitered with 45-degree angles at the corners and is then bonded together to form the window/door frame. The block at the top of the left flange is there to maintain a square position and protruding tab or stop 1740 on the header and sides become the jam to which the window 1730 is fitted. It is further contemplated that the system may include an additional component, not shown, that would go under the cap 118 to support the wall load over the window.

As illustrated in FIGS. 69 through 73, the window or doorjamb members 1710, generally have interior and exterior flanges, 1742 and 1744 respectively, with a spanning web 1738 therebetween. Extending from the web 1738 is protruding tab 1740, that provides a stop or surface against which the window or door structure may be mounted. As depicted specifically in FIG. 70, the members 1710 may be produced with one or both flanges 1742 and 1744, made to show a molding-like surface, thereby making the member in decorative form with no trimming required to complete or finish-off the window or door. It will also be appreciated that, although not shown, the window or particularly the door member may be formed with interior flanges extending from the spanning web, so as to provide a structurally rigid member as characterized above with respect to the adjoining elements. Particularly at a door, such a design may be preferable to assure that loading against the wall in regions adjacent the door do not impact the integrity of the wall panel due to the installation of the door.

Figure 71:
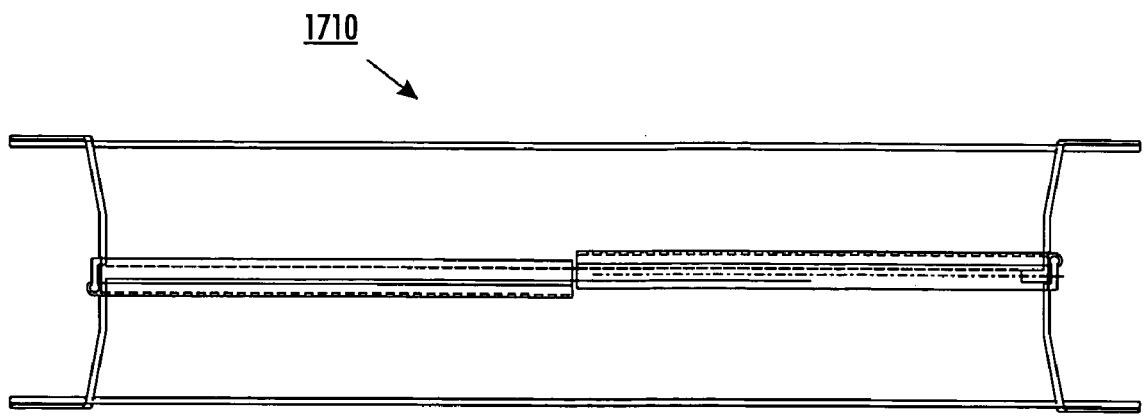
Figure 72:
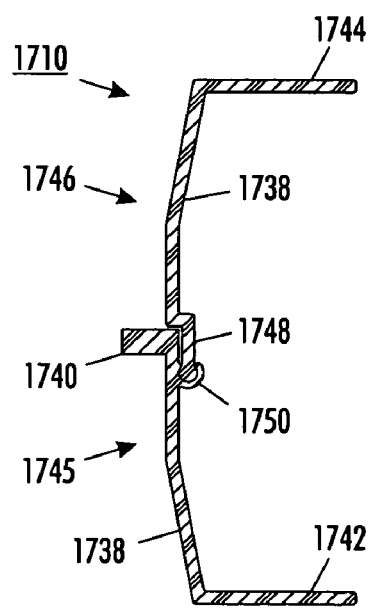

FIGS. 71 and 72 are illustrative examples of an alternative design for the window and doorjamb materials, where the parts may be extruded or formed in sections that are assembled. In particular, the illustrations show a sill or side member 1710. Member 1710 is of a similar shape to that previously described, but it is now formed from two pieces that are connected with one another. The first piece 1745 includes the interior flange 1742, part of the spanning web 1738 and the protruding tab 1740. The second piece 1746 includes the exterior flange 1744 and the remaining part of the spanning web 1738. To assemble the pieces to produce a sill or side member, the longitudinal tab 1748 is inserted into and bonded with the receiving groove 1750 using one of the previously described bonding means. It will be further understood that the two pieces 1745 and 1746 may be made of uniform design over their entire length, or as depicted in FIG. 71, may be made with a tab 1748 along a portion thereof and a groove 1750 along another portion thereof. In this way, the pieces may be more firmly bonded to one another. It will be understood, however, that while such a design might lead to easier assembly and installation of the components in a wall panel, it may require that the components are made to pre-defined sizes or lengths in order to assure that they are properly matched with interlocking groove/tab regions. It is further contemplated that the components depicted in FIGS. 71 and 72 are designed so as to be a single component, where one piece is simply reversed and then the two pieces snap together for assembly. Furthermore, such components may of a size suitable for plastic injection or similar molding methods.

Figure 73:
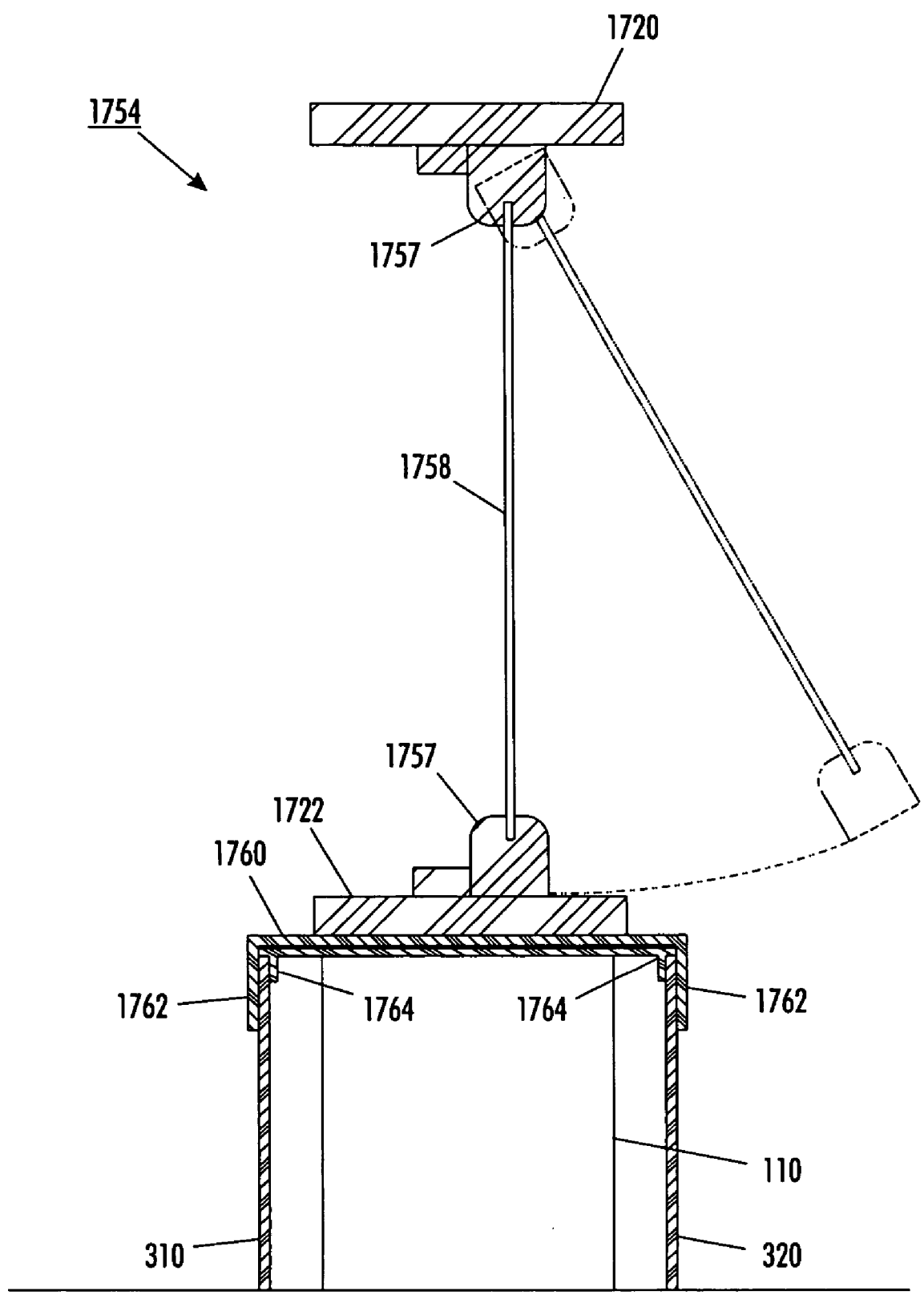

Referring next to FIG. 73, there is depicted a window structure 1754 located in a recess atop wall panel 110. Window 1754 includes a header 1720, a sill 1722 and sides (not shown in cut-away illustration). The sill and sides are preferably affixed to, or formed in conjunction with a web 1760, a pair of outside flanges 1762 and an associated pair of inside flanges 1764. Within window structure 1754, is a window 1756 having a frame 1757 and glass 1758. Window 1756 is intended to be attached to the header (or sill) with hinges so as to provide a means for opening the window as illustrated.

As previous discussed relative the various adjoining element configurations, the web 1760 and its associated flanges are intended to provide suitable reinforcement for the edges of the wall panel exposed when the window is cut therein.

More specifically, the U-shaped recess cut at the top of panel 110 for insertion of the window may have certain webs that are removed, cut or compromised structurally. Therefore, the web 1760, and associated interior flanges 1764 are intended to provide structural reinforcement to hold the panel faces 310 and 320 in their respective positions. As previously noted, the flanges may be bonded to the wall faces, in the region or groove defined between the respective inside and outside flanges. It will be appreciated that various alternative hinge, pivot or similar casement window designs may be employed with the aspects of the mounting structure described in FIG. 73. It will also be appreciated that the discussion above relative to window structure 1754 is equally applicable to a door or similar architectural openings and penetrations in the wall panels.

Figure 74:
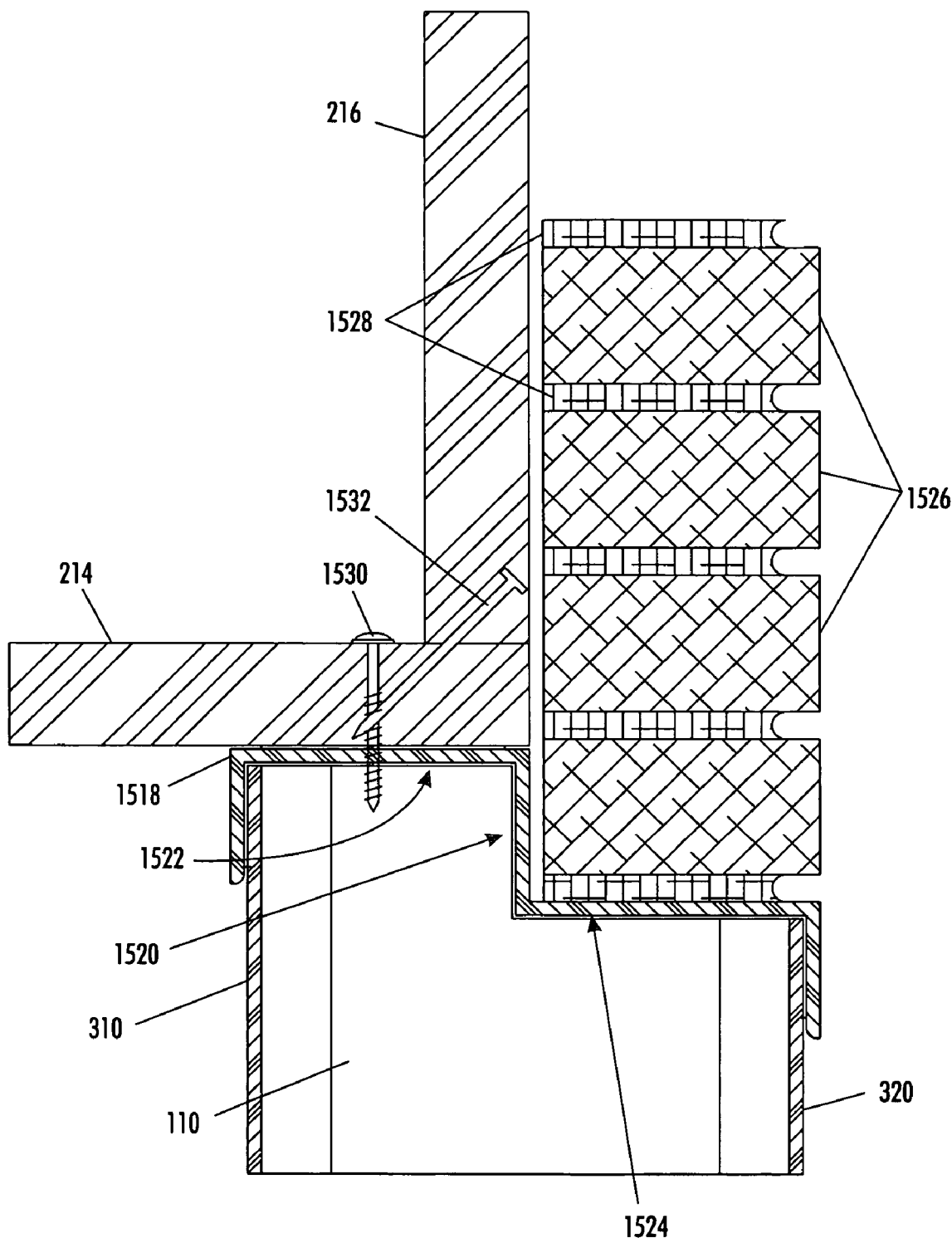
FIGS. 74–77 are cross-sectional views of the tops of wall panels incorporating alternative masonry ledges for the installation of a masonry face on the wall panel tops.

Attention is now directed at an alternative means for capping or finishing the top of a wall made in accordance with aspects of the present invention. In particular, attention is directed to FIGS. 74–77 where various alternative embodiments are illustrated for a brick or stone ledge to be provided atop wall panels 110. As previously depicted in FIGS. 20–23, various configurations for top plate 118 may be used. In FIG. 74, top plate 1518 includes a step or shoulder 1520 that provides two levels of horizontal support on top of wall panel 110. In order to accommodate such a top plate, wall panel 110 must be cut so that the top of the outer face 320 is at a height lower than the top of the inner face 310. Shoulder 1520 may of any height, depending upon the intended use, or amount of brick facing that is desired to cover the outer face of the wall panel.

To complete the top of the wall, atop the higher section 1522, a wooden sill 214 is preferably attached with screws or through bolts as previous described. To wooden sill 214 is attached a wooden faceplate 216 and a plurality of floor joists (not shown), using nails 1532 or similar fastening means and/or structural adhesives. In a preferred embodiment, wooden sill 214 is preferably attached to the top flat 1522 using not only screws but a structural adhesive such as Liquid Nails® or the like. Lower flat region 1524, thereby provides a ledge or flat portion upon which masonry work, such as bricks or stone 1526 and mortar 1528, may be supported. As is customary, such masonry work would preferably be tied to the wooden faceplate 216 and similar structure using what are commonly referred to in the trade as wall ties (not shown). As with the previously disclosed top plates, top plate 1518 may be formed of a reinforced polymer such as PVC, or of a metal or similar material suitable for meeting the loading requirements of the sill and masonry material. It will be appreciated that the top plate 1518 would include flanges 119 so provide a surface to be bonded to the faces of wall panel 110.

Figure 75:
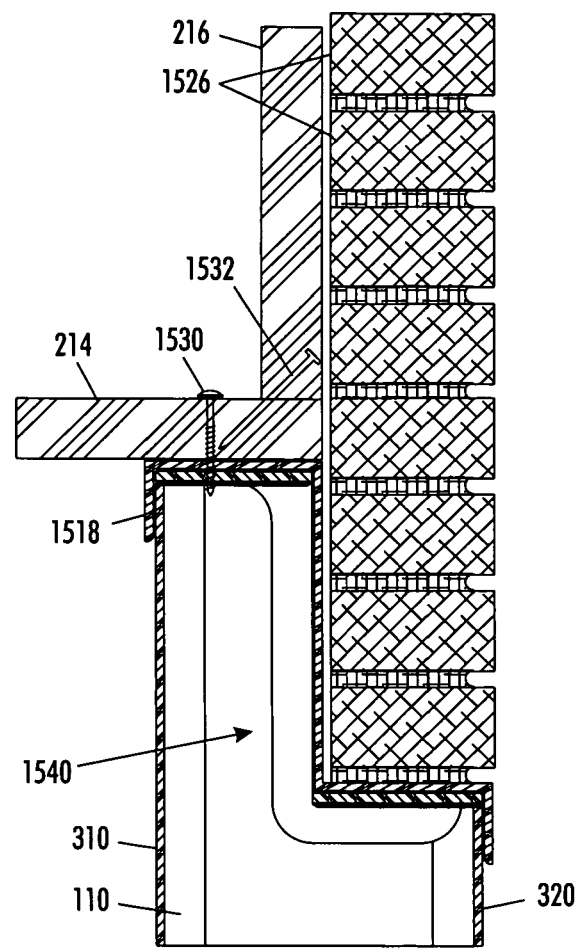
Figure 76:
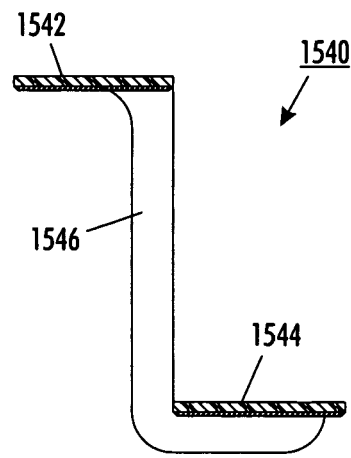
Figure 77:
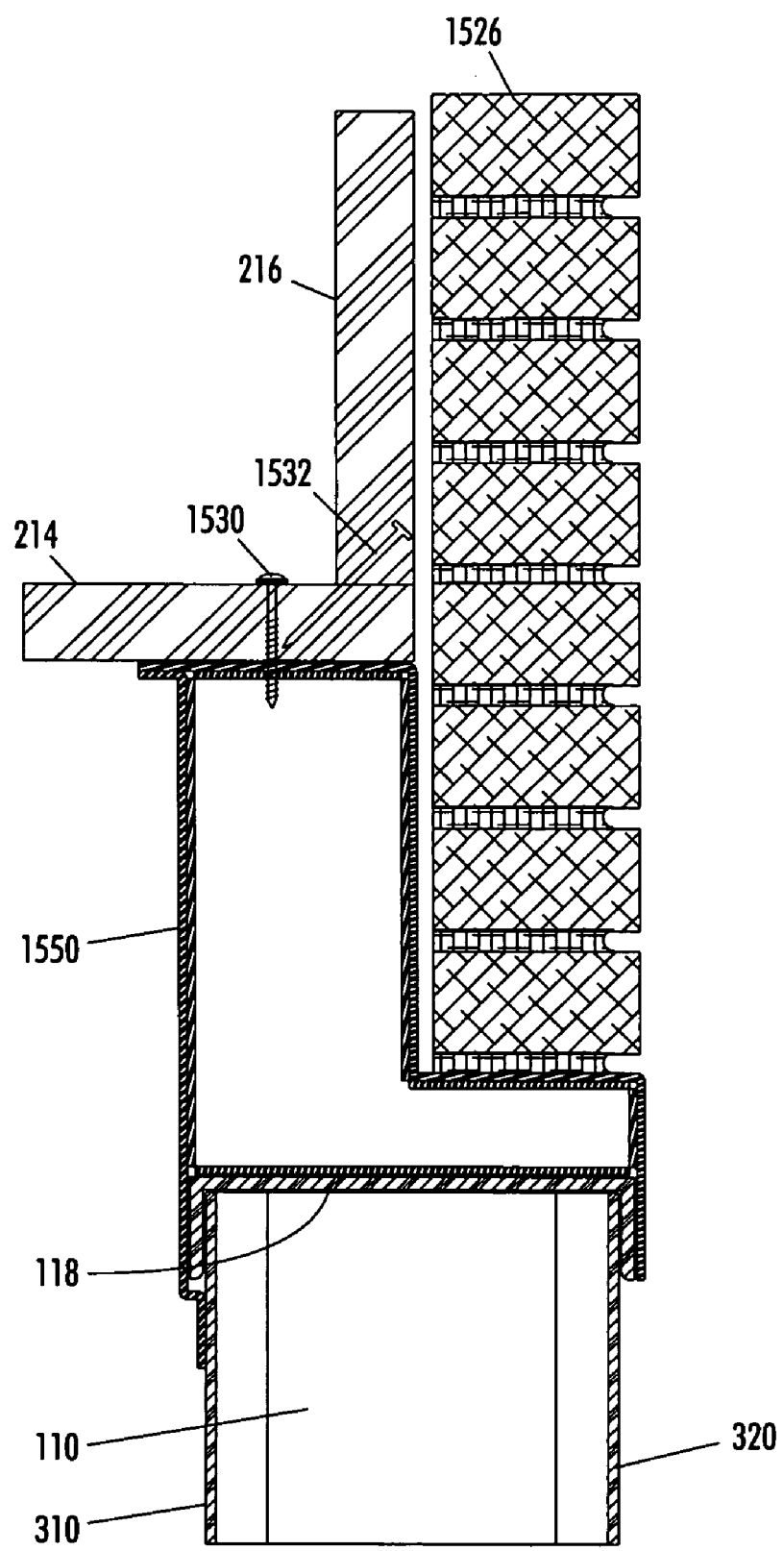

As illustrated in FIGS. 75 and 76, an alternative brick ledge may include a structural reinforcement member 1540—employed to assure that the cut wall panel 110 remains structurally capable of supporting the loading as larger distances between the top flat and bottom flat are used. In particular, the reinforcement member may have a top surface support 1542, a bottom surface support 1544 and a continuous web 1546 spanning the distance between the surface supports. In this way, reinforcement member 1540 serves to link the surfaces at the different heights, and transfers stresses that otherwise might tend to cause the faces of the wall panel to separate. As another alternative, illustrate in FIG. 77, instead of cutting the wall panel to produce a brick ledge, a stepped member 1550 may be employed instead. In particular, stepped member may be designed to be permanently affixed atop the wall panel 110, with or without a top plate 118 thereon. Member 1550 would be designed in such a manner, using materials (e.g., welded steel sheets) that may or may not include polymeric components, as to support the loading by the sill and masonry materials, but also to permanently attach to the wall panel, using adhesives or bonding means, possibly in conjunction with mechanical fastening means such as screws, bolts, clips and the like.

Figure 78:
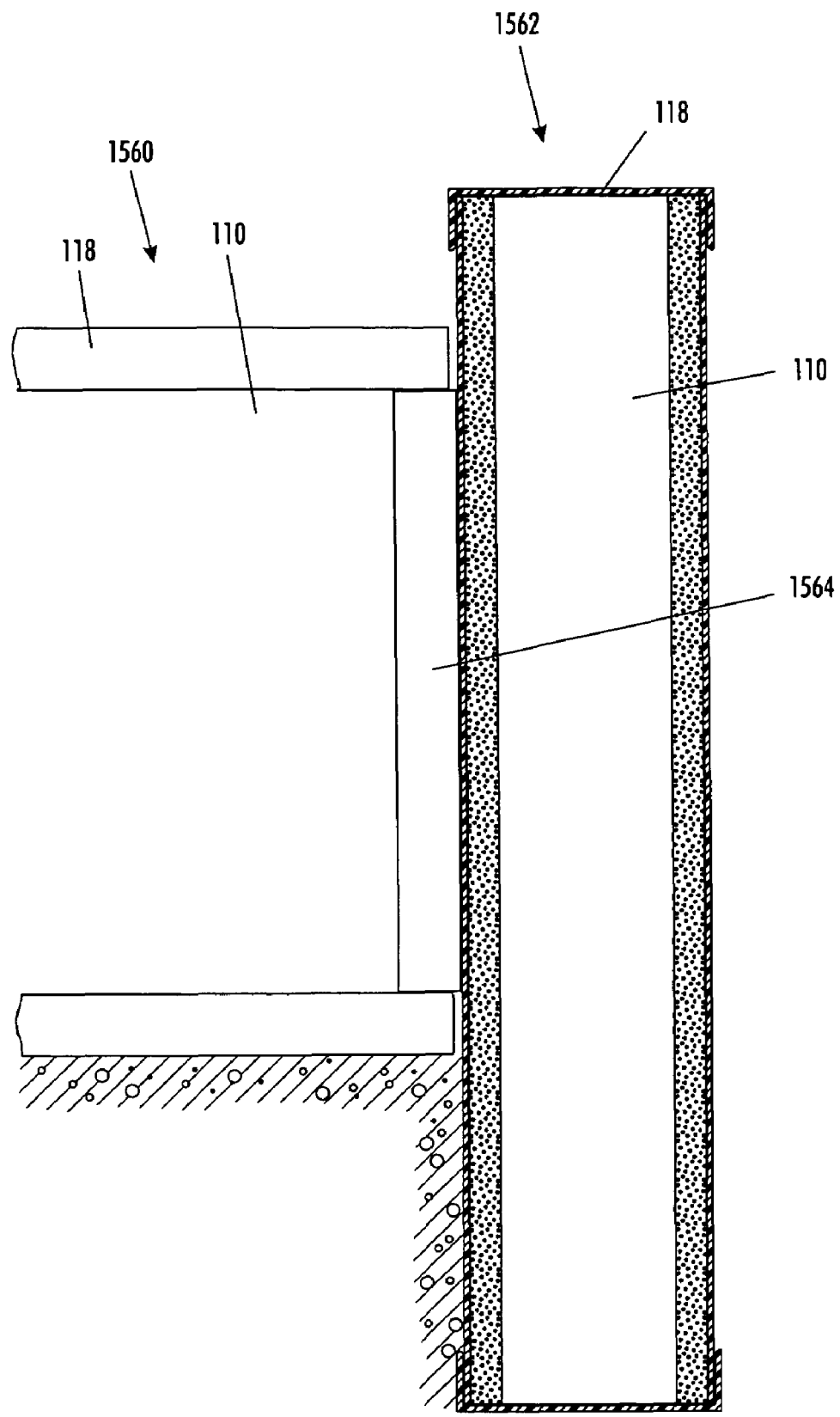
FIG. 78 is an orthogonal view of a means for integrating a short-wall with a full-height foundation wall.
Figure 79:
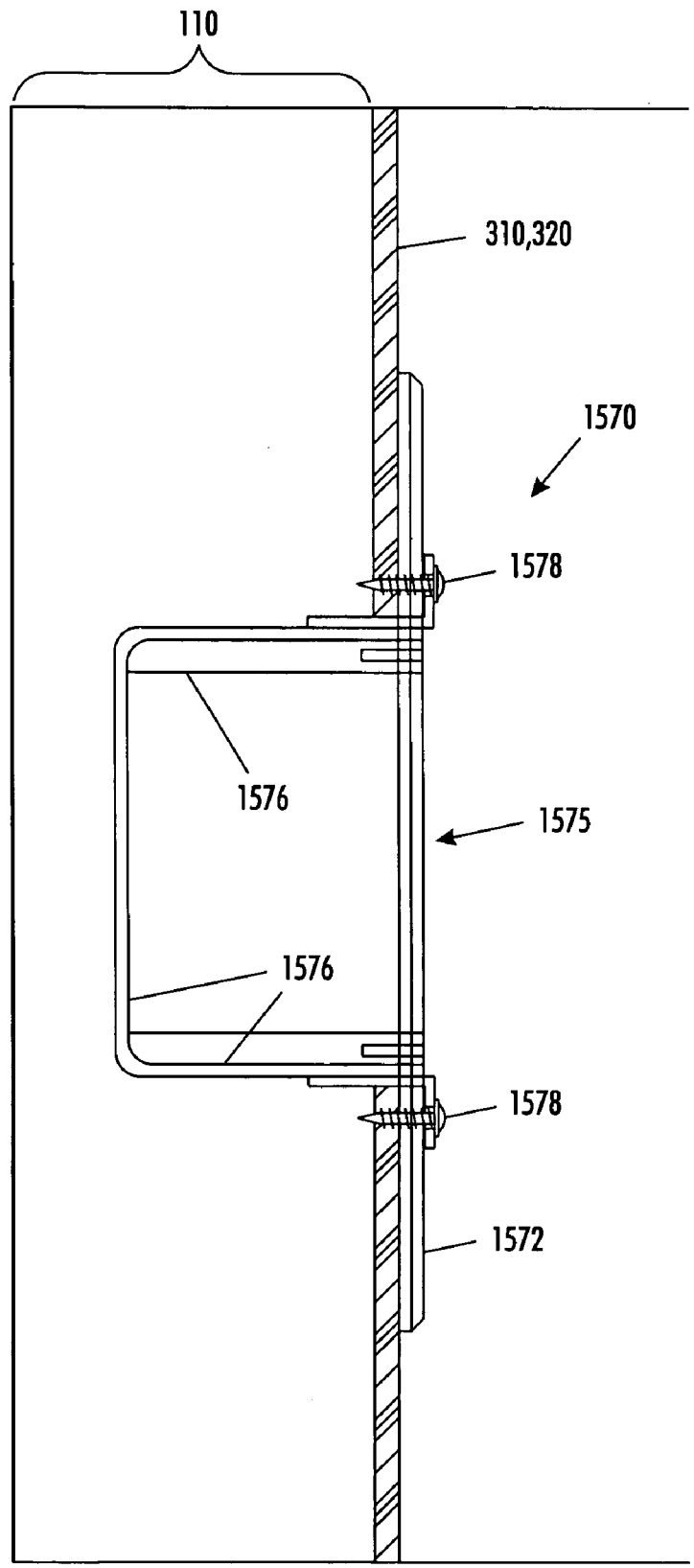
FIGS. 79–82 depict various views of alternative configurations for electrical box assemblies used in accordance with an aspect of the present invention.
Figure 80:
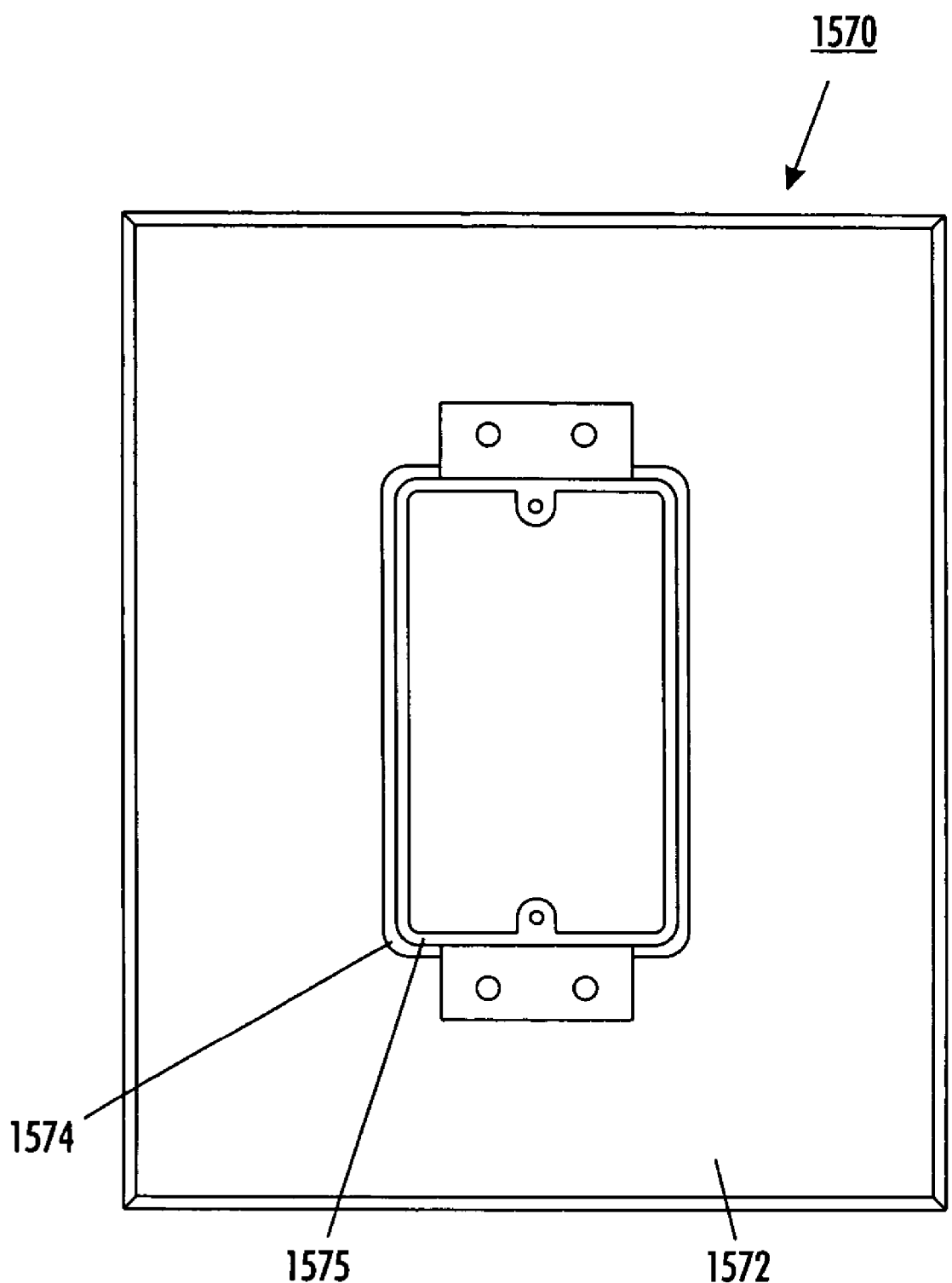

Referring next to FIG. 78, depicted therein is a means of connecting or integrating what is referred to as a "shortwall" with a full-height foundation. Such requirement is often found when a garage or similar structure that does not require a full foundation wall, as would a basement, is to be integrated with another part of the foundation. In the figure, the shorter wall 1560 is tied or integrated with the full-height foundation 1562 using an intertie member 1564. Intertie 1564 is preferably formed with a generally C-shaped design, again preferably including interior and exterior flanges (not shown), to receive the short wall 1560 therein. Intertie 1564 may be attached to a face of the wall panel 110 in the full-height foundation. The method of attaching the intertie member 1564 to either of the wall panels may include various bonding means with or without mechanical fasteners.

Figure 83:
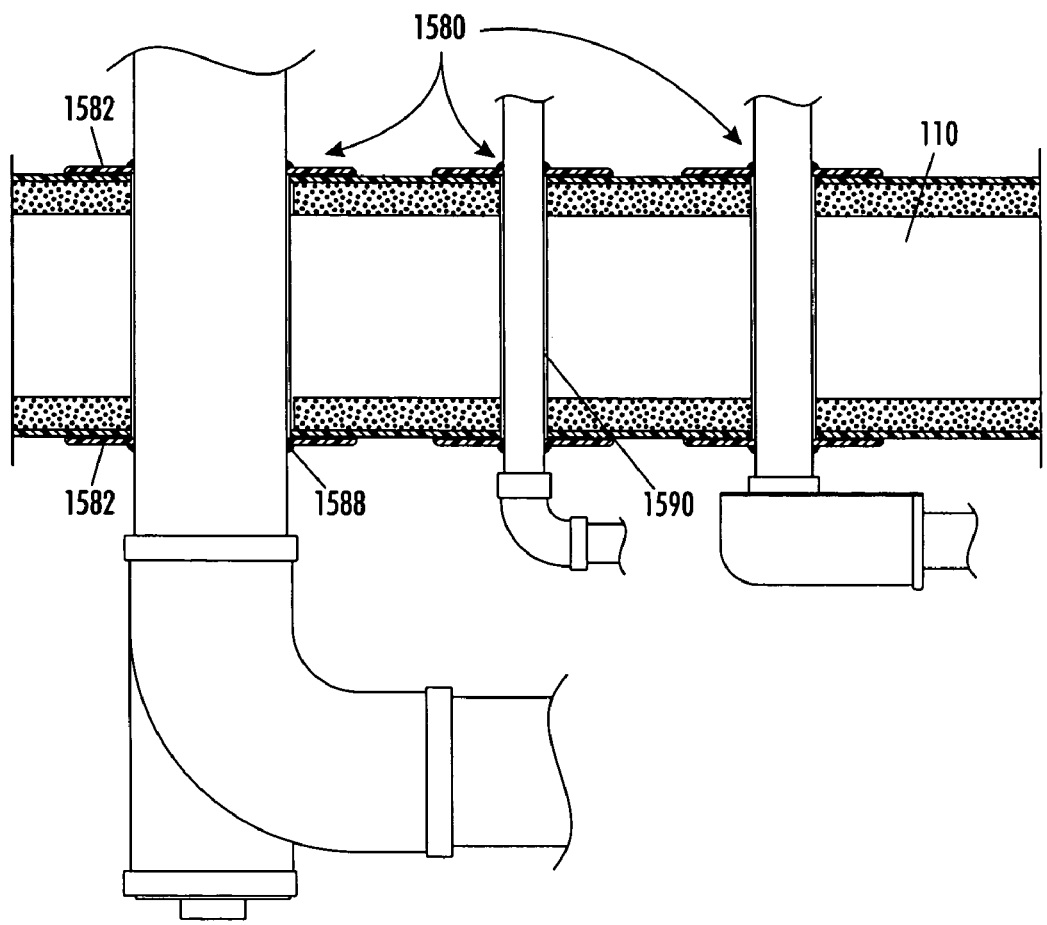
FIGS. 83 and 84 are, respectively, cross-sectional and orthogonal views of a pass-though for use with the wall panels of the present invention.
Figure 84:
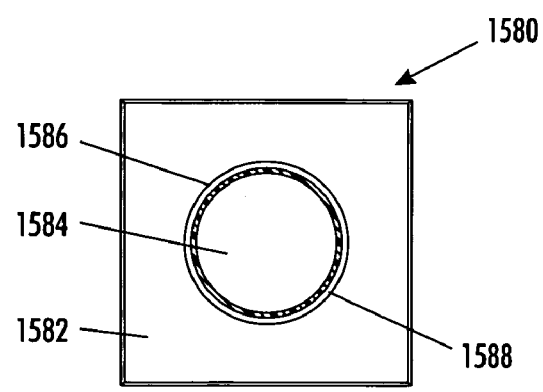
Figure 85:
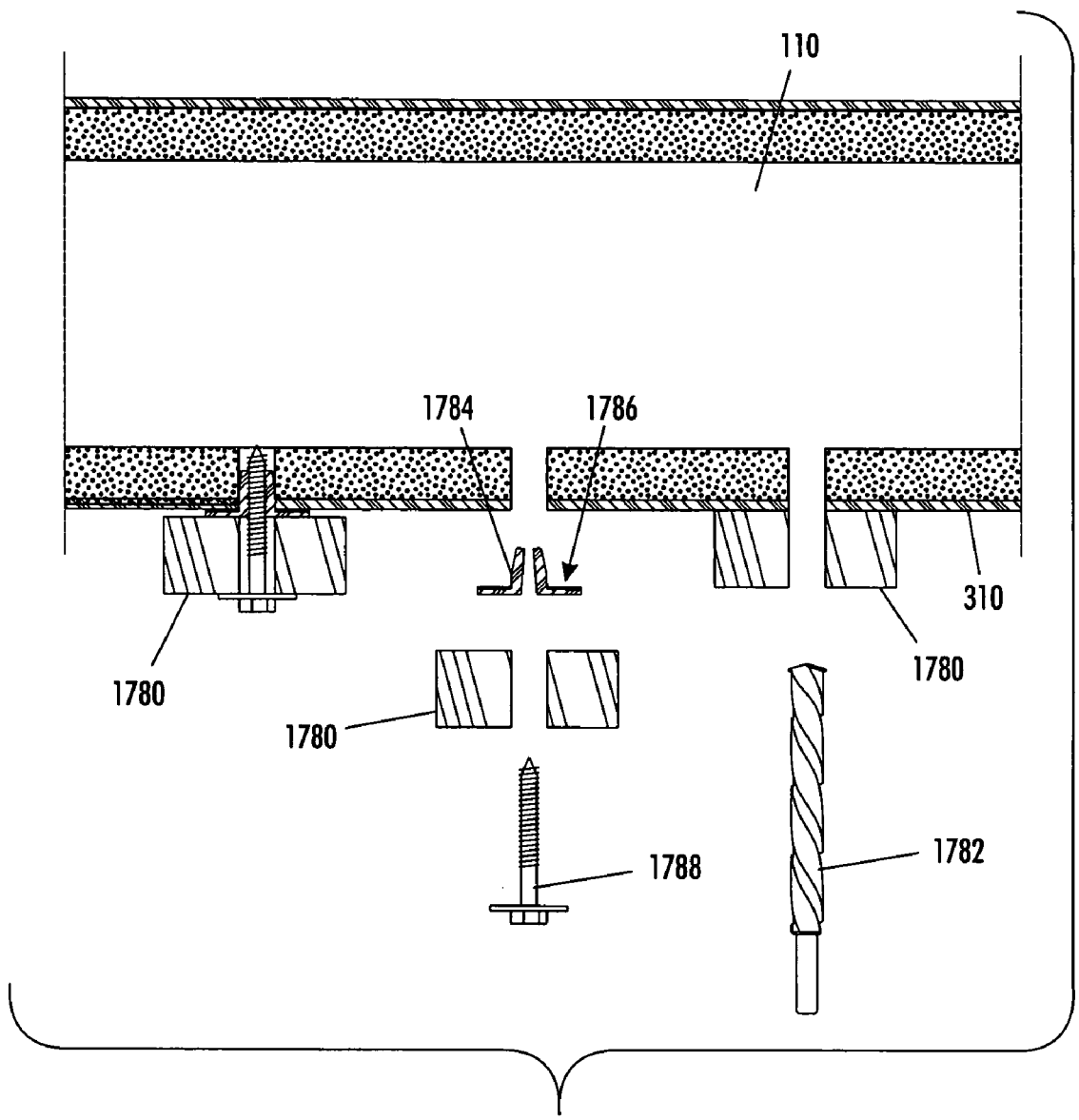
FIG. 85 is an illustration of an exemplary fastener for fastening materials to a wall panel face and steps for installing the fastener.

As has been described in association with the various aspects of the invention above, the nature of the polymeric wall panel is such that if or when the panel faces need to be penetrated (or webs are cut), the load-handling capability of the wall panel may be compromised if appropriate precautions are not taken. For example, it is known that penetrations or apertures in stressed panels may serve to concentrate stresses and thereby weaken the panel's ability to withstand stress. Accordingly, the present invention further contemplates components that are designed to provide expected features in foundation systems, yet maintain the structural integrity of the wall panels to which the features are attached or associated with. In particular, FIGS. 79–82 illustrate wall penetrations for electrical boxes, whereas FIGS. 83 and 84 illustrate pass-through mechanisms for through-wall penetrations of plumbing, HVAC, electrical and similar mechanical systems. FIG. 85 illustrates an exemplary fastener for use in fastening materials to the wall surface created by a face of a wall panel.

Figure 81:
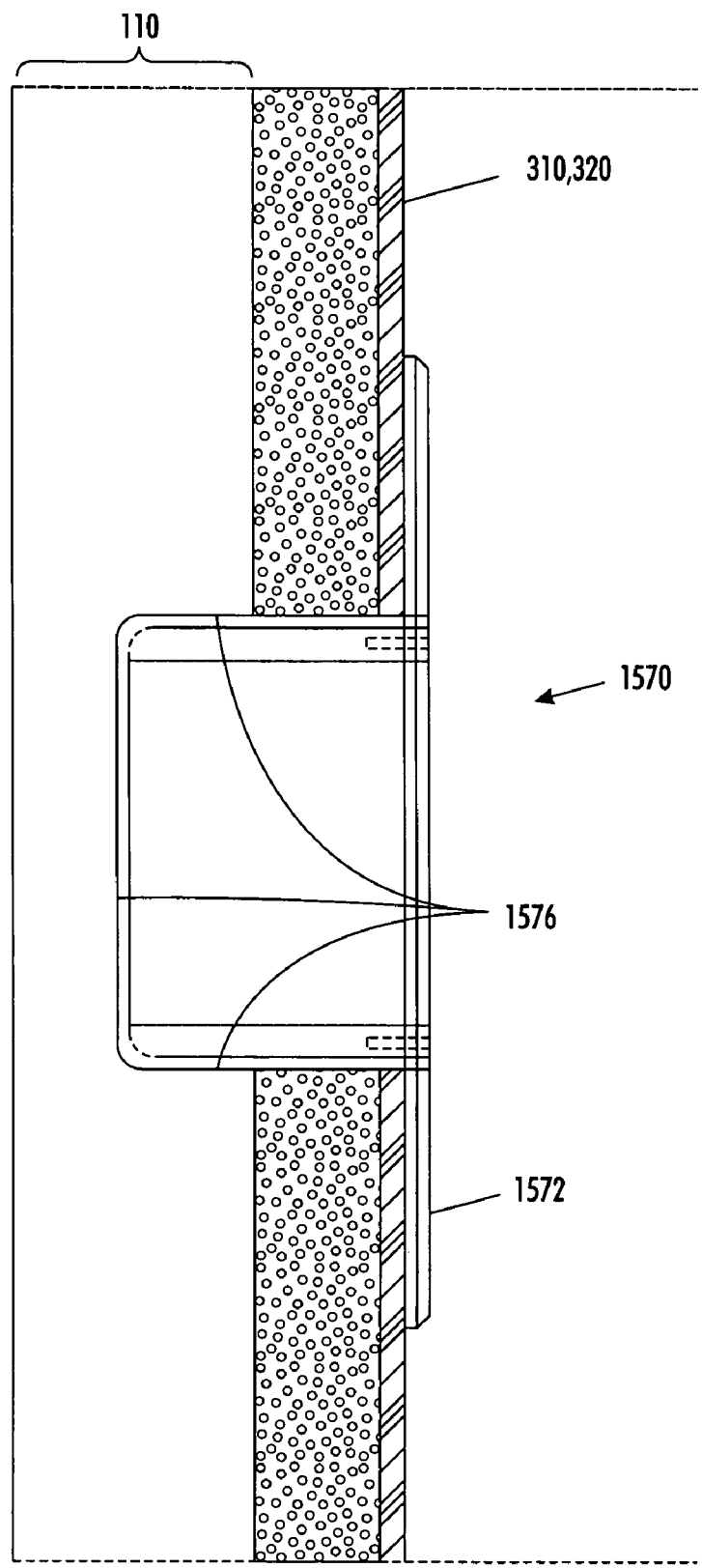
Figure 82:
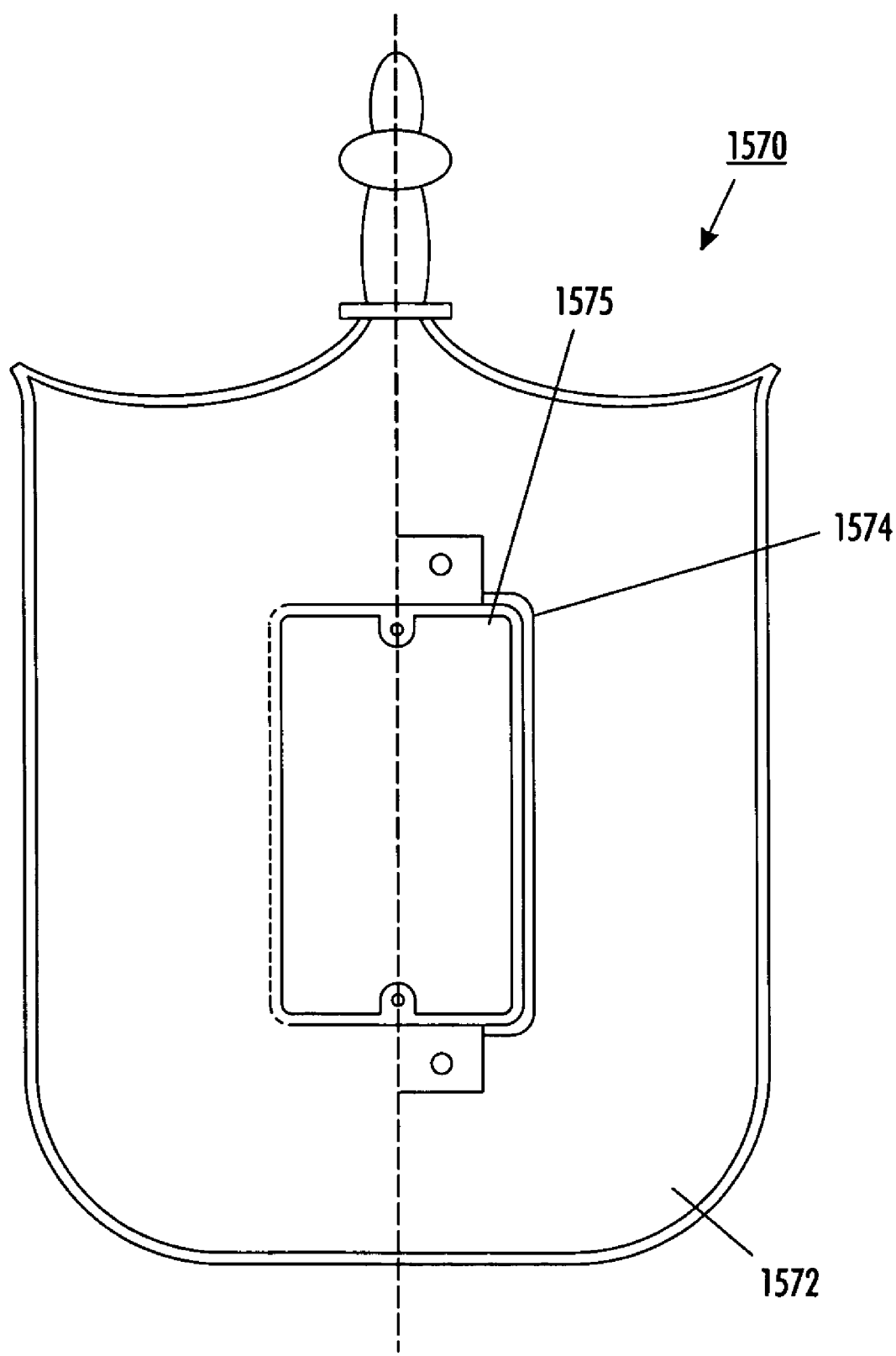

Turning to FIGS. 79–82, the electrical box assembly 1570 may be designed for self-contained use as illustrated in FIG. 81, or for use with conventional electrical wiring boxes 1574. In particular, the assembly 1570 may include a faceplate 1572 having an aperture 1574 therein. Within aperture 1574 may be mounted the conventional electrical junction box 1575 having walls 1576 that enclose the wiring connections and electrical component therein. Although an adhesive is believed preferable as a method of mounting the assembly, particularly the face plate, screws 1578 may be employed to anchor the box 1575 and/or to hold the face plate in contact with wall panel face 310, 320 while the adhesive or bonding means is curing or setting. In the embodiments described, the function of the faceplate is to reinforce the wall panel face around the region that has been penetrated (aperture 1574) so that the penetration does not result in a structural weakness.

The alternative, all-in-one electrical box assembly illustrated in FIG. 81 includes a faceplate 1572 and a box defined by walls 1576. The box may further include mounting tabs or similar means to enable one to mount an electrical component such as a switch or outlet within the box. As will be appreciated from a reference to FIG. 82, the faceplate 1572 and electric box assembly may be made in various styles, shapes, designs and sizes to accommodate the architectural requirements or specifications. It is also contemplated that an adaptive design may be developed where the size of the box accommodated (single, double, triple-gang) may be "adjustable" as a result of the faceplate and related components being assembled—much in the may in which conventional plastic cover plates for electrical products may currently be assembled for multi-gang boxes. As a result of the electrical box assemblies described herein, the open spaces or hollows within the wall panel 110 may be employed as conduit or wiring runs, including runs for not only electrical but telephone and similar communications cabling, thereby improving the functionality of the present invention over conventional concrete or similar masonry techniques where electrical and communications cabling required surface-mounted or embedded conduit.

Turning next to FIGS. 83 and 84, the present Invention further contemplates the need to penetrate both faces of a wall panel in order to provide mechanical system pass-throughs (e.g., plumbing, HVAC, electric service, etc.). Again, in order to avoid compromising the structural integrity of the wall panel 110, pass-throughs 1580 are preferably designed with a faceplate 1582 or flange that will be bonded or affixed to the wall panel faces 310 and 320. The faceplate includes an aperture 1584 through which the pipe 1586 or similar device passes. In one embodiment, the faceplate may include a gasket or seal 1588 around the periphery of the aperture that provides a positive, flexible interference with the outer surface of pipe 1586. It is also contemplated that a mechanical piping member (e.g., a drain pipe) could be manufactured with the flanges 1582 and a receiving bell, so that the components are integrated. In the embodiment in the middle of FIG. 83, the pass-through 1580 may also include a sleeve 1590 that serves to join the interior and exterior faceplates 1582. It is further contemplated that the sleeve may be threaded on both ends and have an internal means for rotating the sleeve, such that mating threads on the back side of each faceplate (not shown) may be engaged by the sleeve and upon rotation thereof the faceplates are drawn into contact with the faces of the wall panel. In this way, an enclosed penetration may be accomplished, and the installer will be further assured that the faceplates are in contact with and bonded to the wall panel faces.

Referring next to FIG. 85, depicted therein are a method and apparatus for mounting to the face of a wall panel in accordance with another aspect of the present invention. In particular, with a wall panel 110, having an interior face 310, it may be necessary to mount a furring strip 1780 bracket, etc. to the wall panel face. Again, to do so may require penetration of the wall panel face, using a drill bit 1782 or similar means. Once the face is penetrated, a fastener mount 1784 is inserted therein. Fastener mount 1784 is, again, preferably bonded to the face with bonding means that may be pre-applied to the fastener mount flange surface 1786. The bonding assures that the flange of the fastener mount acts to reinforce the region about the penetration. Once the fastener mount is applied, the furring strip is repositioned and fastened to the face using a screw 1788 or equivalent fastening means.

Having generally described the various components that may be used in the foundation system, and the types of polymeric materials that may preferably be employed, attention is now turned to a process by which the wall panels and similar components may be made efficiently and in such quantities so as to enable the large-scale production and use of the foundation system.

Figure 86:
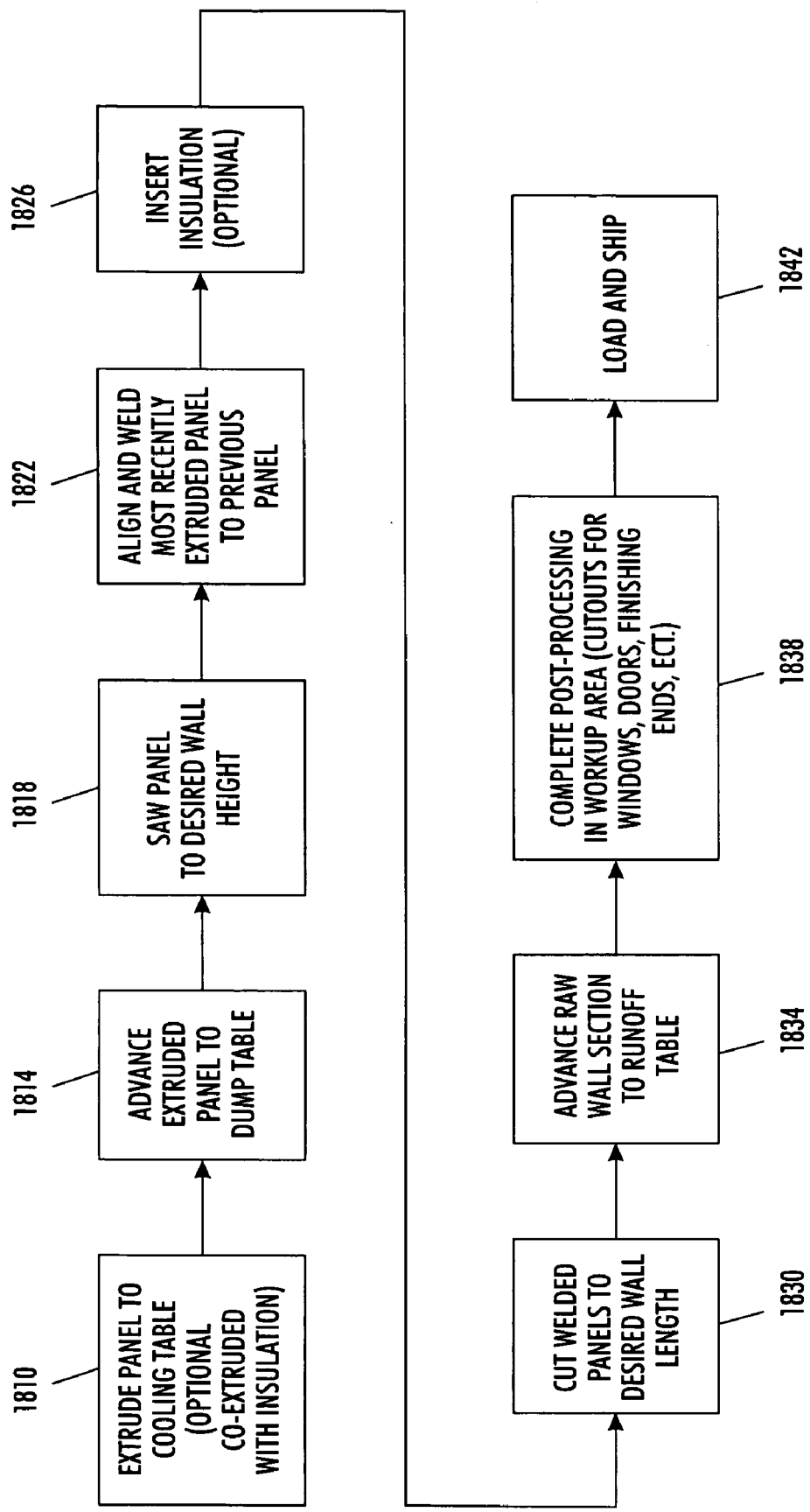
FIG. 86 is a flow diagram depicting various steps in the process for manufacturing the wall panels.
Figure 87:
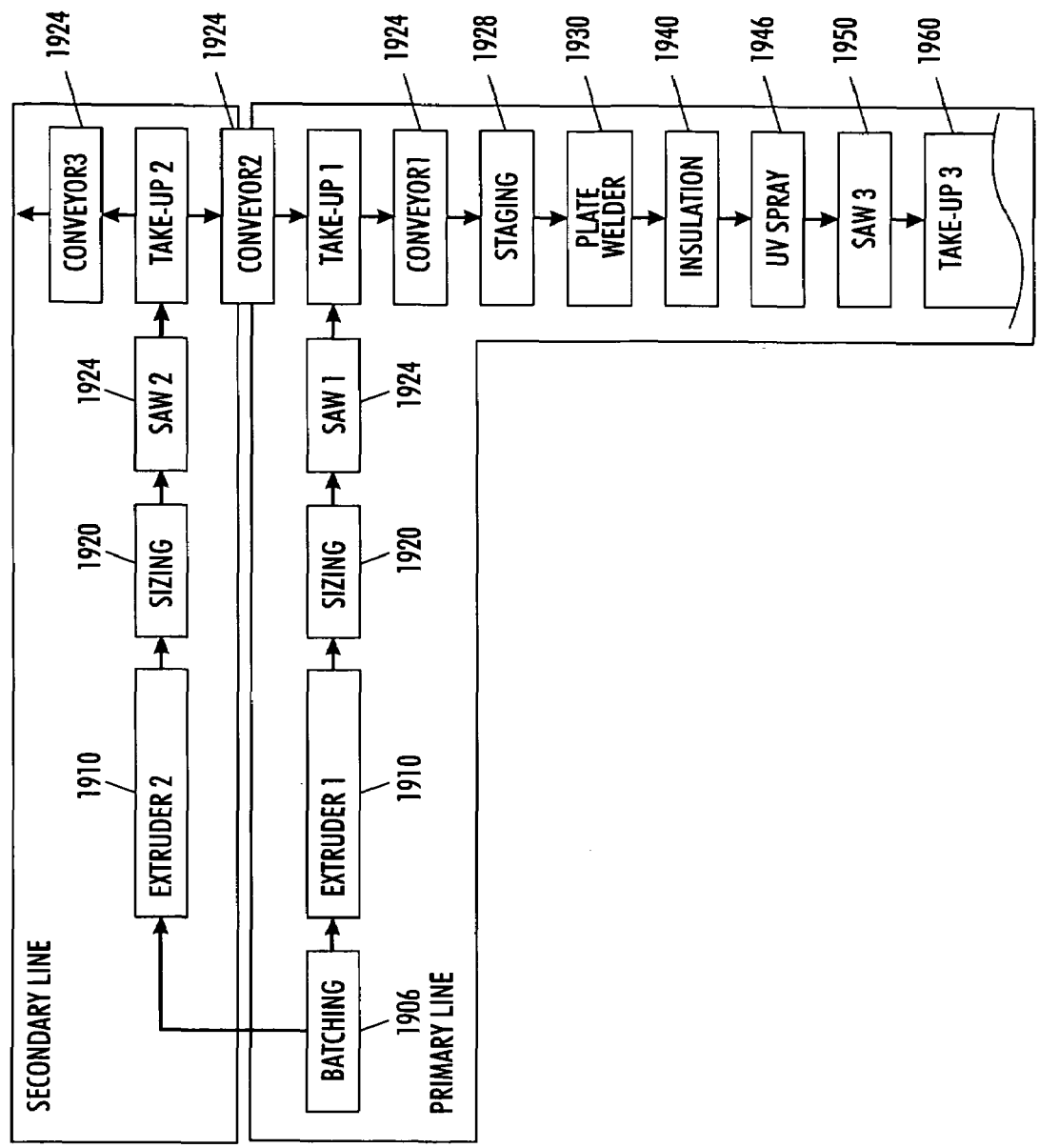
FIG. 87 illustrates a proposed manufacturing facility layout to produce wall panels in accordance with the process of FIG. 18.
Figure 88:
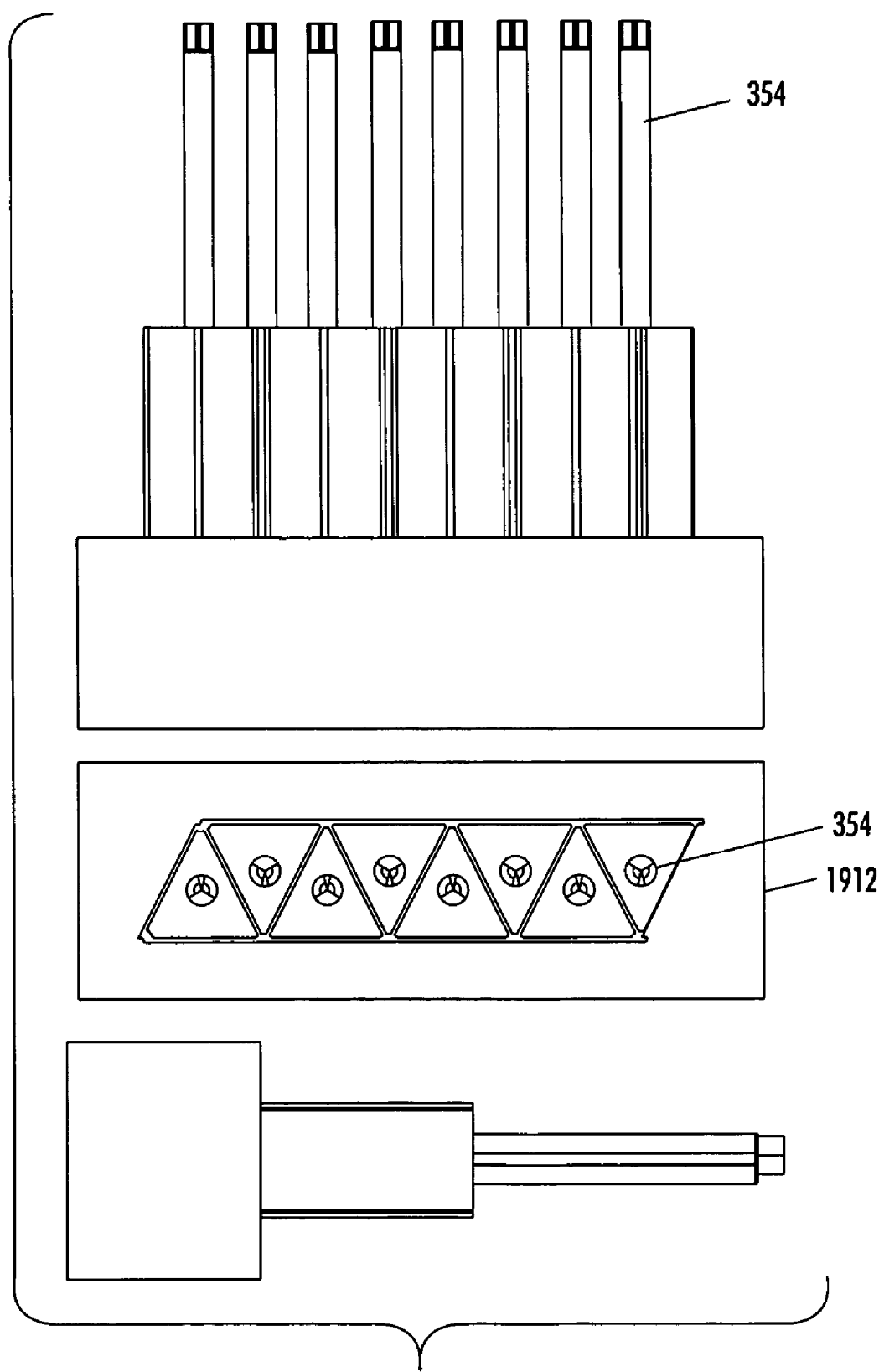
FIG. 88 is a detailed illustration of one station in the facility of FIG. 87.
Figure 89:
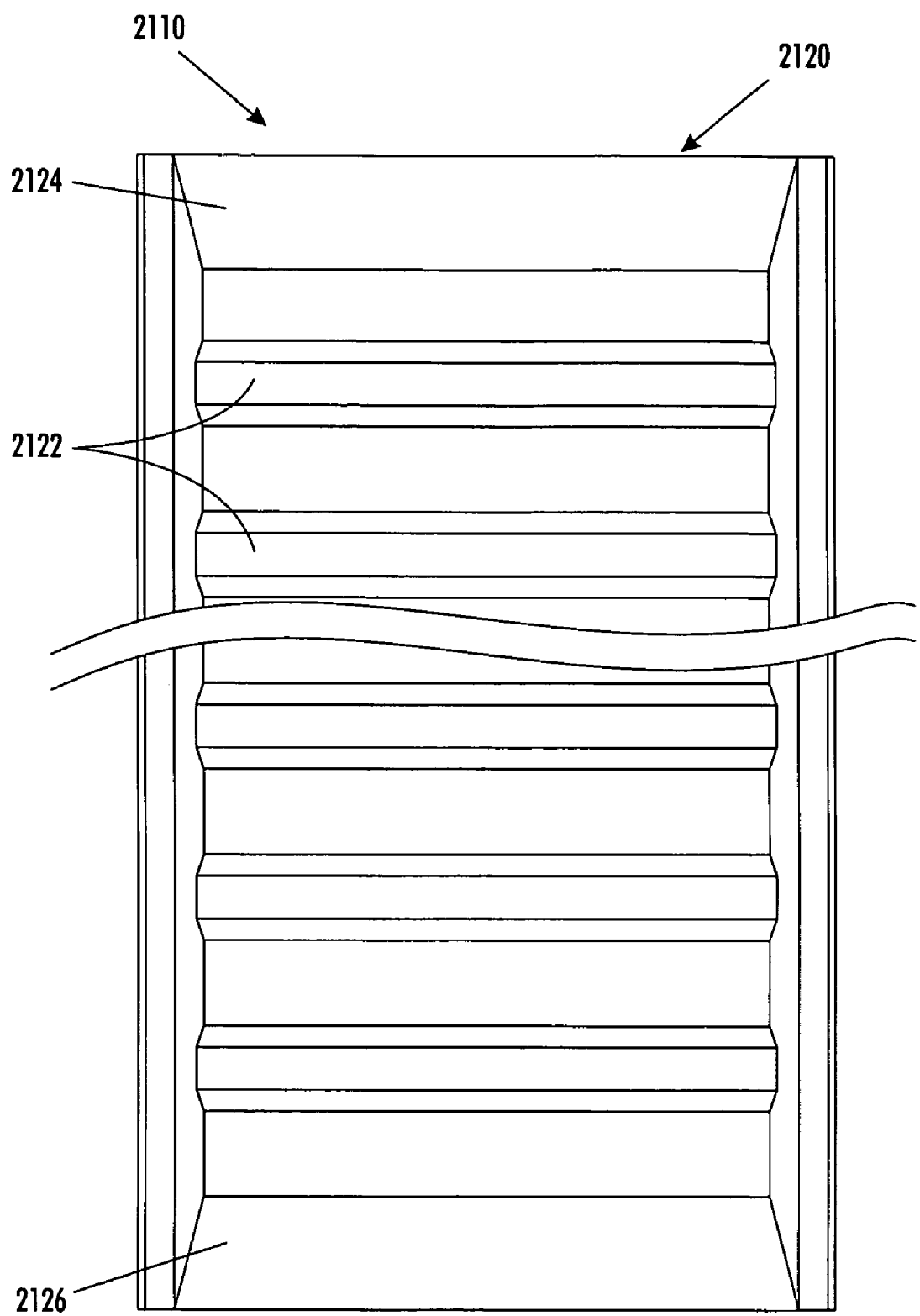
FIGS. 89 through 92 are illustrations of various views of an alternative wall panel embodiment in accordance with another aspect of the present invention.
Figure 90:
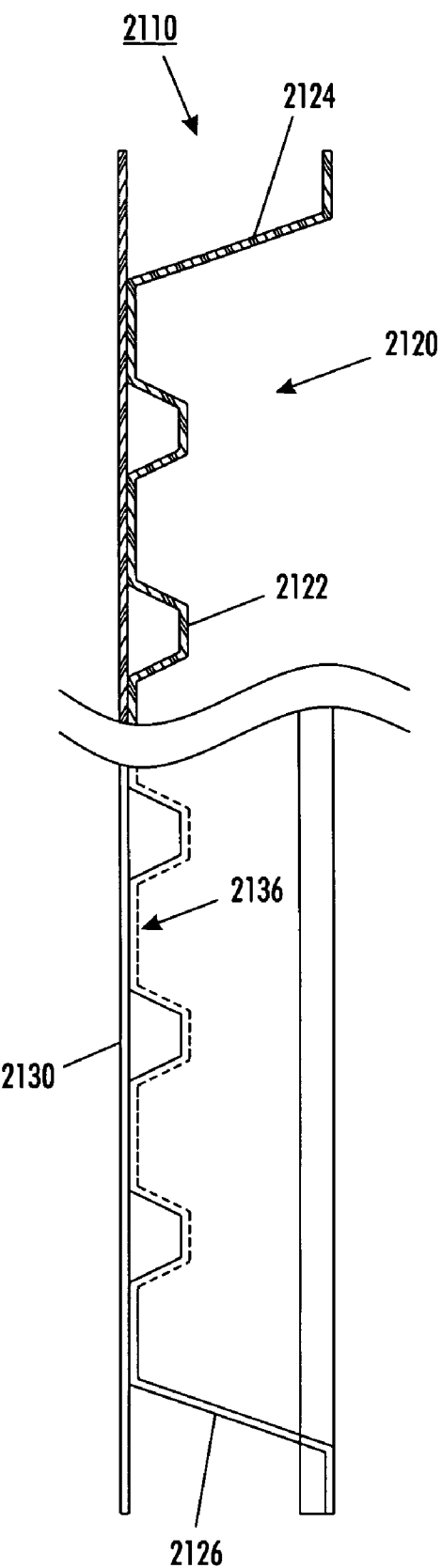

As noted previously, it is presently believed that the foundation system components may be extruded or pultruded in a manner enabling the production of large wall panel sections that may then be cut to a desired length to achieve a particular foundation height. Turning to FIGS. 86–88, a process and system for manufacturing the panels in accordance with an aspect of the present invention will now be described. Referring specifically to FIGS. 86 and 87 initially, FIG. 86 provides a general flow diagram representing the various stages of the wall panel manufacturing step, whereas FIG. 87 illustrates a proposed layout for the various pieces of manufacturing equipment.

As illustrated by Step 1810 of FIG. 86, the process begins with the extrusion of a wall panel in one of the cross-sectional configurations depicted and described previously or a similar configuration. As input to the extruder 1910, a batching system 1906 feeds the raw PVC or other polymeric stock, along with any desired additives. The extruder or extrusion press 1910 is preferably fitted with an extrusion die 1912 as generally illustrated in FIG. 88. As described herein, it is contemplated that the extrusion process may optionally be implemented as a co-extrusion process, wherein in addition to a PVC extrusion of the wall panel, it is also possible to extrude or spray into the extrudate, at essentially the same time, a urethane foam or alternative insulation material via a plurality of nozzles 354. However, co-extrusion may only be possible if the extruded polymer can be sufficiently cooled within a reasonable distance of the die and if there is adequate clearance to allow the co-extrusion equipment to be passed through the die and sizer. The extruded wall panel, or extrudate, is advanced out of the extrusion die onto a cooling or sizing table 1920. Once sufficiently cooled, and advanced along table 1920 at step 1814 to a desired foundation wall height, the extruded section may be cut using a saw 1924. The sawing operation represented by step 1818, which is described as sawing, may also be accomplished by any of a number of known cutting or parting operations, including but not limited to laser cutting, water jet cutting, heated knife or wire cutting, etc. As will be appreciated, the extrusion is a generally continuous manufacturing process, where it is believed desirable to avoid stopping the extrudate for cutting, clamping or other traditionally stationary operations. Accordingly, the sawing or parting operation would be required move or travel along with the extrudate while cutting the end thereof to a desired length (wall panel height).

Once cut to a desired length, the extruded wall panel is conveyed using one of a plurality of conveyors 1924 to staging table 1928 and may be aligned with a prior wall panel section, if available, where it is prepared for welding to the adjacent panel (Step 1822). As used herein the term welding is understood to represent not only plate welding, but may also include solvent welding, ultrasonic welding, friction stir welding, or other joining and bonding techniques intended to permanently affix the panels to one another. Additional joining techniques may include a snap fit locking system, an embedded glue strip, thermal plastic welding (similar to ultrasonic welding but the heat is generated by a heating element), or chemical bonding agents.

In the case of ultrasonic welding, the parameters of the welding are understood to be variable based upon the material properties and desired weld strength. It is also intended that the welding may occur at welding station or plate welder 1930 on both sides sequentially or simultaneously in order to expedite processing of the wall panel sections. In this manner, it will be understood that a separate welding device (e.g., ultrasonic head and horn) will be required for welding on either side of the wall panels. It is also contemplated that the sizing table and welding station include some form of clamping assembly or similar means so as to enable the adjacent panels to be held in a position suitable for aligning them and welding at the abutting joints. As previously noted, the regions adjacent the joint may be of a greater thickness so as to assure structural integrity of the welded joint. Welding and clamping may occur as the panel is moved through the assembly line. In other words, the welding device(s) may need to move with the panels as they are being welded in order to allow production and movement of the wall to continue. Basically the weld devices will locate on the seam or joint and then traverse the panel longitudinally until the weld is completed.

Once welded, or possibly at the same time as welding is occurring, advanced wall panel sections may have insulation sprayed or inserted in the hollow regions therein at station 1940 and optional step 1826—if not done concurrently during the extrusion process. After the wall panels are welded and insulated, a UV-resistant coating or layer may be applied, Step 1946, to one or both faces of the assembled wall panels Subsequently, they continue to be advanced along a sawing table 1950 where a panel trail edge end will be cut at a desired wall length, step 1830, using a saw or similar parting mechanism as described previously. It will be appreciated that depending upon the foundation configuration, lead and or trail end cuts may be made on the welded wall sections, and that the cuts may include straight cuts to enable squared-end wall panels as well as mitered end cuts to enable the use of the various alternative corner joints previously described. Other processes that may be performed after welding include laminating a protective material to a face surface, laminating a decorative panel to the face (e.g., vinyl stone, brick or stucco), cleaning of the panel edges, grooving the panel for engagement of the top plate or other components, and attaching the top plate or other components.

After being advanced (Step 1834) to the saw table 1950 and cut to desired wall length, the panel may be moved to a take-up area 1960, where as illustrated by step 1838, it is subjected to post processing operations to add window cutouts, doors, and other features desired for the foundation wall section. Here again, the various processing operations may be completed by operators using cutting equipment, or they may also be automated or semi-automated so as to increase the speed of production. It may also be that numerous work-up areas may be employed so a to facilitate continuous wall section production, and that cutting, fitting and preassembly operations may be completed by contractors, before or at the job site.

After the wall sections are completed for an entire foundation, the foundation system, including not only the wall sections but caps, sill plates and corner joints may be loaded and shipped as represented by step 1842. Unloading at a construction site may be accomplished with conventional construction equipment. In one embodiment, it is believed that it may be preferable to limit wall section lengths so as to reduce the need for more expensive handling and assembly equipment. As is apparent such a requirement will result in the use of the vertical joints depicted in FIGS. 34 and 35 to facilitate the creation of longer foundation walls.

After the excavation of the soil has taken place crushed stone 236 and the appropriate drainage system 240 is place in the excavated hole. The stone is leveled and tamped. Mitered sill pieces 114 are positioned on the tamped crushed stone and possibly locked in place with the anchor bolt 230. A bonding agent is placed on the sill and wall panel 110 that has had the cap 118, and any necessary component members bonded to it, is lowered onto the sill plate 114.

It is anticipated that the lifting and positioning of the wall panel will be handled with conventional equipment such as a crane, but this may also be accomplished with other equipment such as loader tractors, skid-steers, derricks or other lifting devices. Small wall sections could be placed by manual labor.

Once the initial wall panel 110 is positioned and bonded to the sill 114, additional wall sections are then readied for placement. A bonding agent is again placed on the sill 114 and also in the vertical members FIGS. 11–13. The wall panel is then lowered into the sill and aligned to the previously placed wall panel. This process is repeated until the foundation is completed.

A top sill 214 is then attached to the wall panels and floor joists or similar structural elements 218 are installed. A concrete floor 210 is then poured inside the building's foundation and allowed to cure. Backfilling of the foundation wall can proceed once the floor and upper floor are in place to hold the walls in position. As will be appreciated, the interior portion of the panels may be insulated and covered with a traditional covering such as a gypsum board (drywall) as is well known for conventional construction.

Having described one embodiment of the present invention, attention is now turned to an alternative embodiment to the wall structure previously described. In particular, the wall structures depicted in FIGS. 89 to 92 are intended to illustrate a wall panel system including a fiberglass panel with a laminated polymeric or fiberglass face. In particular, referring to FIGS. 89 and 90, there is shown a panel 2110 that includes a fiberglass structural member 2120 having a plurality of linear channels 2122 spaced apart from one another over the panel width or height. At the tops and bottoms of the channel are larger flanges 2124 and 2126 that serve to expand the effective thickness of the wall and allow the panel to be employed with conventional structural members (e.g., framing lumber, etc.). Along an outer face of each wall panel is a faceplate 2130 that may be formed in place or more likely laminated to the outer channel surfaces 2136 after the wall panel is initially formed.

Figure 91:
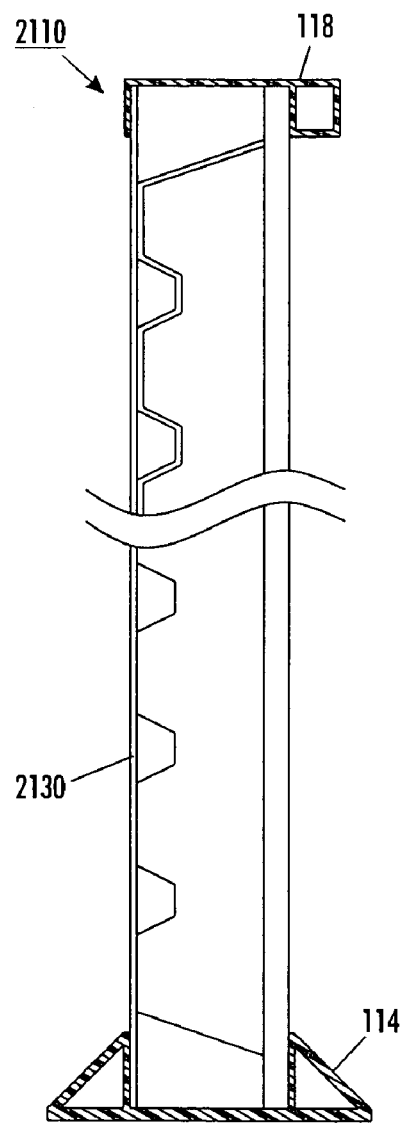
Figure 92:
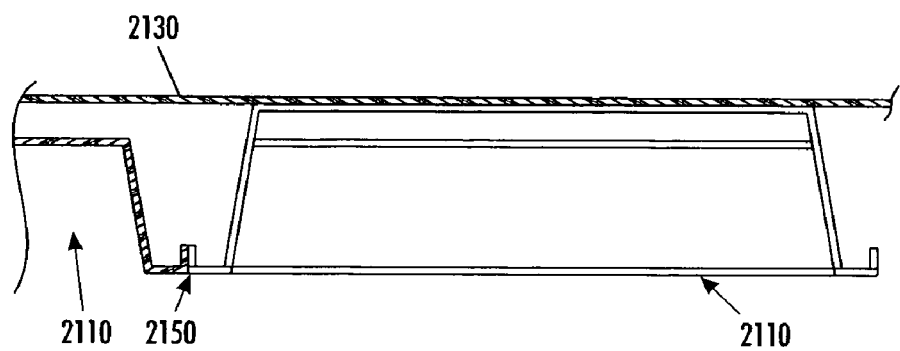

As illustrated in FIG. 91, and as will be appreciated from the previous description, the alternative wall panel configuration may be employed for use in a foundation system, including sill plates 114 and top plates 118. Accordingly, the alternative wall panel structure may be used to produce a foundation wall system in support of a building in the same manner as the previously described wall panel system made from extrusions. Referring next to FIG. 92, the present invention would also use adjoining panels to create longer wall lengths. FIG. 92 illustrates how two adjacent panels 2110 may be abutted along their edges and may be chemically or otherwise bonded or affixed to one another at region 2150. In order to avoid gaps or seams along an outer bonding joint, the panels may be coated at the joints, or the outer laminate may be applied in the field so as to reduce the likelihood of a gap through which water or fill might protrude into the wall cavity.

Figure 93:
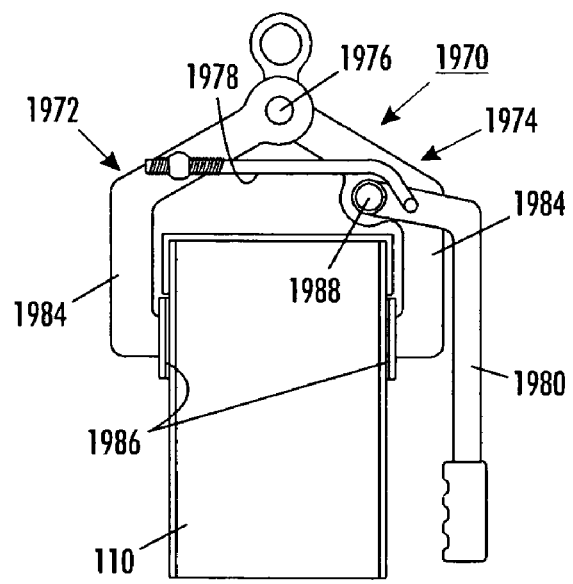
FIGS. 93–95 are orthogonal views of a linkage-type clamping mechanism that may be employed in accordance with an aspect of the present invention to lift and move a wall panel.
Figure 94:
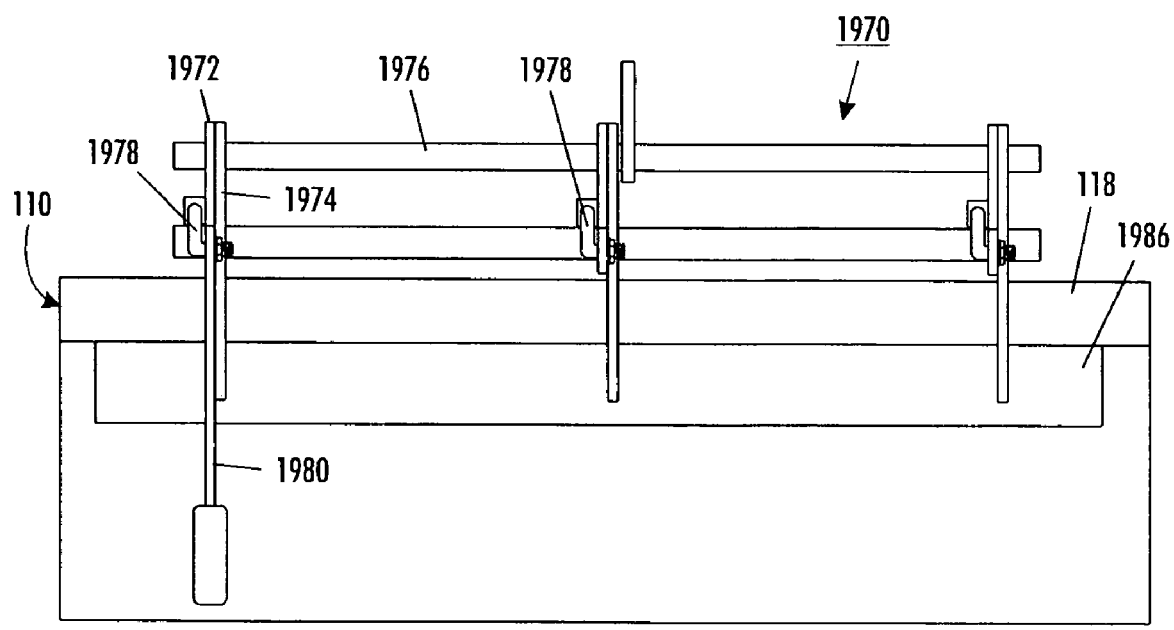
Figure 95:
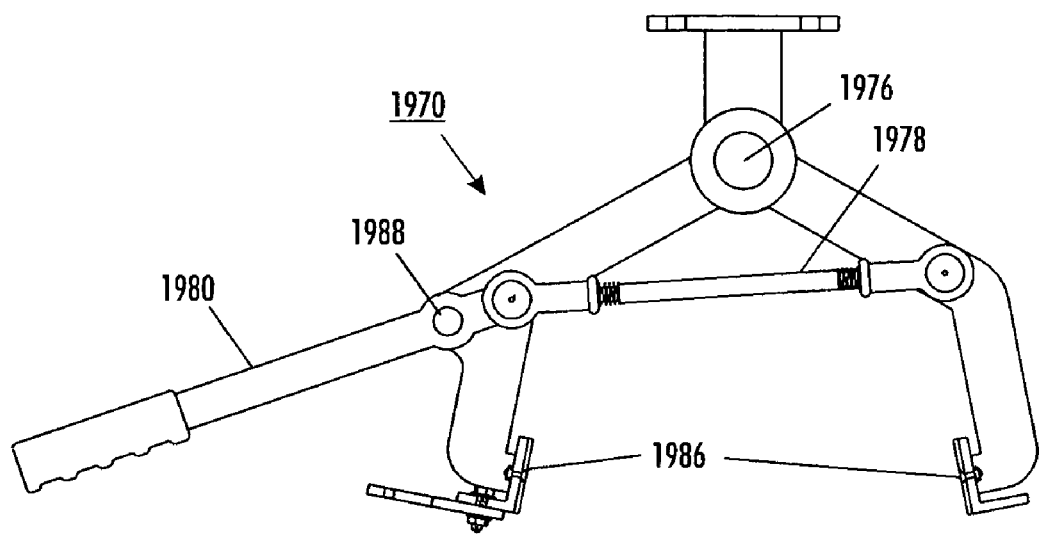

As noted above with respect to the assembly and installation of wall panel sections, it is necessary to lift and transport such sections, either during the manufacturing and delivery operations, or during installation. In accordance with yet another aspect of the present invention, the wall panel sections may be lifted using a linkage-type clamping mechanism as depicted in FIGS. 93–95. Turning to FIGS. 93–95, the clamping mechanism 1970 preferably includes a first clamp member 1972 pivotably connected to a second clamp member 1974 at a pivot point 1976, which is preferably a shaft to drive more clamp members, and a linkage 1978. Linkage 1978 is preferably connected to a handle or similar clamp actuating means 1980, which may be remotely controlled. Each clamp member 1972 and 1974 includes a C-shaped bracket 1984 and a generally planar clamping surface 1986, which is used to compressively contact the respective faces of wall panel 110 when handle 1980 is moved to cause the clamping surfaces to move toward one another. Thus, the clamping surfaces apply pressure to the faces and clamp the wall section securely. The clamp mechanism 1970 utilizes a cam action where the direct line of the linkage 1978 moves past the centerline created between pivot point 1988 and the pivot point of the linkage 1978. This reverses the release direction that the clamping pressure would normally take forcing the linkage 1978 to stop at the pivot point 1988. In order to release the clamp, the linkage must be brought past the centerline by manually lifting handle 1980. In this way the handle is "locked" in the clamped state until it is lifted upward and away from the wall panel. As illustrated in FIGS. 93 and 94, the wall panel has a top plate installed thereon, where the top plate further provides a lip against which the clamp surfaces 1986 may ride so as to assure that the wall section will not be dropped once it is clamped.

Referring also to FIG. 95, as the handle is moved about a pivot point 1988, the linkage 1978 causes the two clamp members to move toward one another. The handle and linkage are designed to provide a positive clamping force, that is not released simply when pressure is removed from the handle. In fact, it is preferable that the clamping force remains, unless or until the handle is manually "released" from the clamped position. The clamp depicted in FIG. 95 requires secondary motion to release it—other than simply raising the handle past the linkage pivot point. First the handle 1980 must be moved inward to clear a latch hook, then it must be moves it sideways to clear the latch hook, and finally it may be moved outward and upward to open the clamp. This latching method is difficult to accidentally release. As is further illustrated in FIGS. 94, the clamping mechanism may span all or a portion of the wall section width, so as to provide support and a distributed application of the lifting force to the wall panel. Although not shown specifically, it will be apparent that the clamping mechanism 1970 may be attached to a lifting device such as an overhead crane, a backhoe, a bucket loader or various lifting devices that may be suitable for lifting the wall panel from one surface to place it or install it on another surface. As a further alternative design, mechanism 1970 may also employ adjustable clamping surfaces 1986 on one or both of the clamp brackets, to facilitate clamping and lifting of wall sections having varying thickness or assure that no interference is caused by the top plate of the wall section.

In view of the description and illustrations of FIGS. 93–95, it will be apparent that the methodologies described above relative to manufacture and installation of wall panels as foundations may include lifting a wall panel(s) using the linkage-type clamping type device, where the wall segment is retained by applying pressure to the faces of the wall panel over an area, as opposed to a particular point. Moreover, the clamping device may be temporarily clamped to the faces while the wall segment is being lifted or moved. Moreover, operation of the clamping mechanism 1970 is believed to be improved by previously affixing a top cap 118 on wall segment 110, the top cap having flange members extending along the first and second faces of the wall panel, such that the linkage-type device contacts the wall panel below the flanges and abuts the flanges to further prevent slippage of the wall segment from within the clamp mechanism. Using the clamping mechanism described, it may be possible for a backhoe or similar piece of common construction equipment to move and position wall panels at a construction site in preparation for their installation. Such a process may include lifting the wall panel from a first elevation using an excavation device; and lowering the wall panel, with the excavation device, to a foundation or support at a second elevation lower than the first elevation.

In recapitulation, the present invention is a polymeric panel system and method for production thereof, enabling the rapid construction of a building such as a structural foundation. The polymeric foundation system includes polymeric wall panels and other components. The walls include two parallel faces separated by a 10 series of web elements, where the webs and faces of the wall panels are all formed of a similar polymer material such as polyvinyl chloride (PVC). The wall panels and other components are preferably extruded so as to enable the rapid production of sections of wall panels, where the panels may be cut to length and then affixed to adjacent panels to form a foundation wall. The method of affixing adjacent panels may include welding, gluing or other techniques and may be performed on the job site or in a pre-fabrication facility. Furthermore, the wall panels may be co-extruded with an insulating material inserted in the voids between the parallel faces so as to provide improved thermal performance of the foundation as well.

It is, therefore, apparent that there has been provided, in accordance with the present invention, a method and apparatus for the production and use of polymeric materials in a foundation system. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for constructing a below-grade foundation, comprising:
   providing a pre-fabricated wall panel having a hollow frame member with first and second faces generally parallel to one another, said faces being connected by a plurality of ribs spanning a space therebetween, said first and second faces and ribs consisting essentially of a polymeric material;
   placing said pre-fabricated wall panel at least partially below-grade such that at least one of said faces of said wall panel is in contact with soil and bears sustained lateral soil loading, where said pre-fabricated wall panel concurrently bears sustained compressive loading from additional structural elements supported by said wall panel;
   placing a sill comprising a polymeric material on a below-grade surface, said sill being suitable for receiving a lower end of the wall panel, said sill having a generally continuous interior surface supporting both faces and the ribs of the wall panel and thereby distributing a wall panel compressive load over an area greater than a cross-sectional area defined by the lower end of the wall panel;
   anchoring, at least temporarily, the lower end of the wall panel to the below-grade sill; and
   affixing to a top of the wall panel a top plate for attaching the additional structural elements thereto.

2. The method of claim 1, further comprising the steps of:
providing a second pre-fabricated wall panel; and
attaching said second pre-fabricated panel to the first panel.

3. The method of claim 2, wherein the step of attaching said second pre-fabricated panel to the first panel includes attaching the panels with an adjoining member.

4. The method of claim 1, wherein said wall panel includes an extruded hollow frame member cut to length to produce wall panels of varying heights.

5. The method of claim 1, further comprising the steps of:
affixing to the wall panel a foundation component that is at least partially formed using a polymeric material, wherein said foundation component is placed at least partially below-grade in association with a wall panel.

6. The method of claim 5, wherein the foundation component is selected from the group consisting of:
a window frame member;
an expansion joint;
a vertical seam;
wall/column supports;
an electrical box assembly;
a window frame;
a door frame;
a beam pocket;
a mechanical device pass-through;
a vertical end cap; and
a masonry ledge.

7. The method of claim 1, further comprising the steps of:
cutting at least one vertical edge of the wall panel so as to provide a wall panel of a desired length; and
affixing to the wall panel an adjoining member that is at least partially formed using a polymeric material, wherein said adjoining member is placed at least partially below-grade in association with the wall panel.

8. The method of claim 7, wherein the adjoining member is selected from the group consisting of:
an expansion joint;
a vertical seam; and
wall/column supports.

9. The method of claim 7, wherein the adjoining member includes an angled corner member.

10. The method of claim 1, where receiving a lower end of the wall panel occurs prior to placing the sill on the below grade surface.

11. A wall panel system for use below-grade, comprising:
a first face, at least a portion of one surface of which is maintained in contact with soil;
a second face; and
a plurality of ribs spanning a space between said first and second faces and holding said first and second faces in a generally parallel relationship,
said wall panel faces and ribs being formed of a polymeric material suitable for exposure to below-grade soil, wherein said panel system is capable of withstanding sustained lateral loading applied to at least the first face thereof as well as a compressive load applied to an upper end of the wall panel; and
a sill, comprising a polymeric material, located on a below-grade horizontal surface, said sill receiving a lower end of the wall panel therein, said sill having a generally continuous interior surface supporting both faces and the ribs of the wall panel and thereby distributing the compressive load to the horizontal surface over an area greater than that defined by the lower end of the wall panel.

12. The wall panel system of claim 11, wherein said plurality of ribs are attached to said first face and said second face at an acute angle, and wherein at least two ribs intersect at least one of said faces at positions adjacent one another.

13. The wall panel system of claim 12, wherein the acute angle is within the range of about 20 degrees to about 85 degrees.

14. The wall panel system of claim 11, wherein the polymeric material includes a reinforcing fiber additive.

15. The wall panel system of claim 11, wherein the polymeric material includes polyvinyl chloride.

16. The wall panel system of claim 11, further comprising a foundation component permanently affixed to at least one wall panel face to form a structural foundation.

17. The wall panel system of claim 16, wherein the foundation component is selected from the group consisting of:
a window frame member;
an expansion joint;
a vertical seam;
a horizontal seam;
wall/column supports;
an electrical box assembly;
a window frame;
a door frame;
a mechanical device pass-through; and
a masonry ledge.

18. The wall panel system of claim 11, further including a faceplate affixed to the face of the wall panel, wherein said faceplate has an aperture therein providing access to an electrical wiring box.

19. The wall panel system of claim 11, further including a pass-through penetrating both faces of the wall panel, said pass-through include a faceplate bonded to each of the first and second faces to maintain the structural integrity of the wall panel.

20. A below-grade foundation wall system, comprising:
at least one wall panel, at least a portion of which is formed using a polymeric material;
a sill comprising a polymeric material, said sill receiving a lower end of the wall panel therein, said sill having a generally continuous interior surface supporting both faces and the ribs of the wall panel and thereby distributing a compressive load applied to an upper end of the wall panel to a below-grade horizontal surface over an area greater than that defined by the lower end of the wall panel;
a foundation component, also at least partially formed using a polymeric material, positioned in contact with said at least one wall panel and said sill to form a structural foundation, wherein at least a portion of the foundation component is permanently affixed to the wall panel; and
soil backfilled against at least an outer surface of said at least one wall panel, wherein said wall panel withstands a sustained lateral load applied over at least a portion of the wall panel by said soil, and where said wall panel concurrently supports the compressive load, such that said foundation wall system is suitable for use below grade.

21. The foundation wall system of claim 20, wherein the foundation component is selected from the group consisting of:
a window frame member;
an expansion joint;
a vertical seam;
a horizontal seam;

wall/column supports;
an electrical box assembly;
a window frame;
a door frame;
a mechanical device pass-through; and
a masonry ledge.

22. A method for producing a load-bearing, foundation, comprising:
   placing a sill comprising an extruded polymeric material on a below-grade, generally horizontal, surface;
   providing a first extruded wall panel section and a second wall panel section, wherein at least the first wall panel section includes a hollow frame member with first and second face sheets generally parallel to one another and connected by a plurality of alternating vertical ribs spanning a space therebetween at an acute angle with respect to the face sheets, and wherein at least two ribs intersect at least one of said faces at positions adjacent one another;
   positioning the second wall panel section adjacent an edge of the first extruded wall panel section;
   placing a lower end of each of said first and second wall panel sections into a sill, said sill being suitable for receiving the lower end of each wall panel section, said sill having a generally continuous interior surface supporting both faces and the ribs of the wall panel and thereby distributing a compressive load applied to the wall panel sections over an area greater than a cross-sectional area defined by the lower end of the wall panel sections; and
   permanently affixing the second wall panel section to the edge of the first extruded wall panel section so as to produce a wall of the foundation.

23. The method of claim 22, wherein said method of permanently affixing the second wall panel to the edge of the first wall panel includes a process selected from the group consisting of:
   ultrasonic welding;
   solvent welding;
   gluing with an adhesive;
   plate welding;
   friction stir welding;
   thermal bonding; and
   extruder/wire feed welding.

24. The method of claim 22, wherein said extruded hollow frame member is cut to produce wall panels of varying heights.

25. The method of claim 24, wherein an insulating material is co-extruded within hollow regions of the hollow frame member.

26. The method of claim 24, wherein an insulating material is subsequently applied within hollow regions of the hollow frame member.

27. The method of claim 25, wherein the insulating material is placed in contact with at least one of the first and second face sheets of the hollow frame member.

28. The method of claim 26, wherein the insulating material only partially fills the hollow frame member, and where the insulating material is placed in contact with at least one of the first and second face sheets of the hollow frame member.

29. The method of claim 22, wherein the step of positioning a second wall panel adjacent an edge of the first wall panel includes:
   aligning an end portion of the second face from the second panel with an end portion of the first face projecting from the first panel; and
   aligning an end portion of the second face from the first panel with an end portion of the first face projecting from the second panel, thereby causing the respective faces of the adjacent panels to be generally coplanar.

30. The method of claim 22, further comprising the step of installing the wall in a below-grade location as at least a part of a foundation.

31. The method of claim 30, wherein the step of installing the wall further comprising the steps of:
   lifting the wall panel from a first elevation using an excavation device; and
   lowering the wall panel, with the excavation device, to a foundation structure at a second elevation lower than the first elevation.

32. The method of claim 22, further comprising the steps of:
   preparing the suitable, generally horizontal surface in a below-grade location;
   applying a top plate along a top edge of the wall panel;
   placing a floor against an interior lower edge of the wall panel and sill plate; and
   backfilling against at least a portion of an exterior lower portion of the wall panel.

33. The method of claim 32, further comprising the steps of:
   attaching a second level sill to said top plate; and
   installing a deck on said second level sill.

34. The method of claim 32, further comprising the step of permanently affixing the wall panel to the sill plate.

35. The method of claim 34, further comprising the step of permanently affixing the top plate to the wall panel.

36. The method of claim 32, further comprising the steps of inserting an adjoining element between the first and second panels.

37. The method of claim 36, wherein the adjoining element comprises an angled corner having at least a first flange extending parallel and adjacent to at least one face of the panel so as to produce an overlap therebetween.

38. The method of claim 36, wherein the adjoining element comprises a 180-degree joint.

39. The method of claim 36, wherein the adjoining element comprises an expansion joint.

40. The method of claim 36, wherein at least one of the wall panels is permanently attached to the adjoining element along at least a portion of the edge of the wall panel.

41. The method of claim 40, wherein the adjoining element is permanently attached to the wall panel using an adhesive.

42. The method of claim 36, wherein the adjoining element comprises:
   an interior flange adjacent and parallel to the first sheet of the wall panel so as to produce an overlap therebetween;
   an exterior flange adjacent and parallel to the second sheet of the wall panel so as to produce an overlap therebetween; and
   at least one web extending between the interior flange and the exterior flange.

43. The method of claim 22, further comprising:
   applying a linkage-type device at a position offset from the ends of at least one of said wall panels, said linkage-type device being suitable for applying pressure to the first and second faces of said wall panel over an area spanning a plurality of ribs to avoid damage to the panel;
   lifting the at least one of said wall panels using the linkage-type device.

44. The method of claim 43, further comprising the step of temporarily clamping the linkage-type device to the first and second faces of the wall panel.

45. The method of claim 43, further comprising the steps of:
- affixing a top cap on the wall panel, said top cap having flange members extending along the first and second faces of the wall panel; and
- temporarily clamping the linkage-type device to the first and second faces of the wall panel below the flanges of the top cap.

46. A wall system comprising:
- at least one extruded wall panel, said extruded wall panel including a hollow frame member with first and second planar sheet faces generally parallel to one another and connected by a plurality of ribs spanning a space therebetween, said wall panel faces and ribs being formed of a polymeric material;
- an extruded sill comprising a polymeric material, said extruded sill resting on a generally horizontal below-grade surface and receiving a lower end of the wall panel therein, said sill having a generally continuous interior surface supporting both faces and the ribs of the wall panel and thereby distributing a compressive load applied to an upper end of the wall panel to the below-grade surface over an area greater than that defined by the lower end of the wall panel; and
- a polymeric foundation component positioned adjacent to said at least one wall panel to form a structural foundation, wherein the polymeric foundation component is permanently affixed to the wall panel,
- where said structural foundation is placed at least partially below-grade and in contact with soil backfilled against at least one face of said wall panel, and wherein the at least one face of said wall panel and foundation component, in combination, concurrently bear sustained lateral loads from the soil backfilled against at least one face of said wall panel and foundation component.

47. The wall system of claim 46, wherein the polymeric foundation component is selected from the group of extruded members consisting of:
- a window sill;
- a window trim member;
- a door trim member;
- an expansion joint;
- a vertical seam;
- a horizontal seam;
- wall/column supports;
- an electrical box assembly;
- a window frame;
- a door frame;
- a mechanical device pass-through; and
- a masonry ledge.

48. The wall system of claim 46, wherein said wall panel is formed using an extrusion process to produce the hollow frame member, and where the extruded hollow frame member is cut to produce wall panels of varying heights.

49. The wall system of claim 48, further comprising a co-extruded insulating material within hollow regions of the hollow frame member.

50. The wall system of claim 49, wherein the co-extruded insulating material only partially fills the hollow frame member, and where the insulating material is placed in contact with at least one of the first and second faces of the hollow frame member.

51. The wall system of claim 46, wherein an insulating material is applied, after extrusion, within hollow regions of the hollow frame member.

52. The wall system of claim 46, further comprising:
- compacted material including stone, said compacted material forming a generally horizontal surface in a below-grade location;
- a sill suitable for receiving a lower edge of the wall panel, said sill plate being anchored to the horizontal surface;
- a top plate applied to a top edge of the wall panel;
- a floor abutting an interior, lower edge of the wall panel and sill; and
- backfill soil, abutting at least a portion of an exterior, lower edge of the wall panel to complete a foundation.

53. The wall system of claim 52, wherein said wall panel is permanently affixed to the sill plate.

54. The wall system of claim 52, wherein said top plate is permanently affixed to the wall panel.

55. The wall system of claim 46, further comprising an adjoining element between the at least one first wall panel and a second wall panel.

56. The wall system of claim 55, wherein the adjoining element comprises an angled corner having at least a first flange extending parallel and adjacent to at least one face of the panel.

57. The wall system of claim 55, wherein the adjoining element comprises a seam.

58. The wall system of claim 55, wherein the adjoining element comprises an expansion joint permitting thermal expansion and contraction of the first wall panel and the second wall panel.

59. The wall system of claim 55, wherein the wall panel is permanently attached to the adjoining element along at least a portion of the side of the wall panel.

60. The wall system of claim 55, wherein the adjoining element is permanently attached to the wall panel using an adhesive.

61. The wall system of claim 55, wherein the adjoining element comprises:
- an interior flange adjacent and parallel to the first planar sheet face of the wall panel;
- an exterior flange adjacent and parallel to the second planar sheet face of the wall panel; and
- at least one web extending between the interior flange and the exterior flange.

62. The wall system of claim 55, wherein the adjoining element comprises an I-shaped joint, including:
- a pair of interior face flanges;
- a pair of exterior face flanges; and
- a web member separating the interior and exterior flanges, wherein the opposing interior and exterior flanges, in combination with the web, form a C-shaped region to receive a wall panel therein.

63. The wall system of claim 55, wherein the adjoining element comprises a mitered-corner joint, consisting essentially of:
- a pair of interior face flanges;
- a pair of exterior face flanges; and
- a web member separating the interior and exterior flanges, wherein the opposing interior and exterior flanges, in combination with the web, form a pair of three-sided regions having an angled wall panel edge inserted therein.

64. The wall system of claim 55, wherein the adjoining element comprises a corner joint, including:
- an interior face flange;
- a pair of exterior face flanges; and a web member separating the interior and exterior flanges, wherein opposing interior and exterior flanges, in combination with the web, form a C-shaped region to receive a wall panel therein.

65. The wall system of claim 55, wherein the adjoining element further comprises a removable cover, attachable to the adjoining element in a manner so as to produce an enclosed region adjacent a surface of the wall panel.

66. The wall system of claim 46, wherein a relationship between a thickness of the first and second sheet faces relative to an overall thickness of the wall panel is such that the thickness of the face sheets is less than $\frac{1}{16}$ the overall wall thickness.

67. The wall system of claim 46, wherein a cross-sectional thickness of the ribs is less than a minimum cross-sectional thickness of either sheet face.

68. The wall system of claim 46, wherein a ratio of wall panel thickness to spacing between ribs is approximately 1:1.

69. The wall system of claim 46, wherein the arrangement of the ribs relative to the face sheets produces a cross-section having a series of adjacent triangles of a generally isosceles shape.

70. The wall system of claim 69, wherein a rib is oriented at an angle of about 60-degrees to each face sheet.

71. A wall system comprising:
   at least one wall panel, said wall panel including a hollow frame member with first and second sheet faces generally parallel to one another and connected by a plurality of ribs spanning a space therebetween, said wall panel faces and ribs being formed of a polymeric material;

a polymeric foundation component positioned adjacent to said at least one wall panel to form a structural foundation, wherein the polymeric foundation component is permanently affixed to the wall panel, where said structural foundation is placed at least partially below-grade, such that at least one face of said wall panel and foundation component, in combination, concurrently bear sustained lateral and compressive loads; and an adjoining element between the at least one first wall panel and a second wall panel, wherein the adjoining element comprises a vertical joint, including a first member having a web and a pair of interior surface flanges to fit within and between the hollow frame member, and a second member having a web and at least one interior flange and one opposing, exterior flange, wherein the opposing interior and exterior flanges, in combination with the web, form a C-shaped region to receive a wall panel having the first member affixed therein.

* * * * *